(12) United States Patent
Yamamoto

(10) Patent No.: US 12,386,159 B2
(45) Date of Patent: Aug. 12, 2025

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Hiroshi Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 507 days.

(21) Appl. No.: 17/637,073

(22) PCT Filed: Aug. 24, 2020

(86) PCT No.: PCT/JP2020/031787
§ 371 (c)(1),
(2) Date: Feb. 21, 2022

(87) PCT Pub. No.: WO2021/039696
PCT Pub. Date: Mar. 4, 2021

(65) Prior Publication Data
US 2022/0291488 A1    Sep. 15, 2022

(30) Foreign Application Priority Data
Aug. 29, 2019  (JP) ................. 2019-157435

(51) Int. Cl.
*G02B 15/14*   (2006.01)
*G02B 13/18*   (2006.01)
*G02B 15/16*   (2006.01)

(52) U.S. Cl.
CPC ......... *G02B 15/1425* (2019.08); *G02B 13/18* (2013.01); *G02B 15/16* (2013.01)

(58) Field of Classification Search
CPC .... G02B 15/1425; G02B 13/18; G02B 15/16; G02B 15/177; G02B 15/1465; G02B 15/14; G03B 5/00
(Continued)

(56) References Cited

U.S. PATENT DOCUMENTS

| 2017/0068079 A1 | 3/2017 | Kawamura et al. |
| 2018/0210179 A1 | 7/2018 | Kawamura et al. |

FOREIGN PATENT DOCUMENTS

| JP | 2015-028530 A | 2/2015 |
| JP | 2017-122745 A | 7/2017 |
| JP | 2018005165 A * | 1/2018 |

OTHER PUBLICATIONS

JP2015028530—English translation (Year: 2015).*
(Continued)

*Primary Examiner* — Thomas K Pham
*Assistant Examiner* — Kuei-Jen L Edenfield
(74) *Attorney, Agent, or Firm* — Potomac Law Group, PLLC

(57) ABSTRACT

A variable-power optical system (ZL) comprises a first lens group (G1) having a negative refractive power and a succeeding lens group (GR), which are disposed on an optical axis in that order from the object side. When varying magnification from wide angle to telephoto, the space between the adjacent lens groups changes. The succeeding lens group (GR) comprises: a first focusing lens group (G3) having a positive refractive power; and a second focusing lens group (G5) having a positive refractive power. When focusing from infinity to a proximate distance, the first focusing lens group (G3) moves toward the object side, and the second focusing lens group (G5) moves toward the image side.

17 Claims, 37 Drawing Sheets

(58) Field of Classification Search
USPC .................................................. 359/676–695
See application file for complete search history.

(56) References Cited

OTHER PUBLICATIONS

English translation of JP2018005165 (Year: 2018).*
International Preliminary Report on Patentability for International Patent Application No. PCT/JP2020/031787, Mar. 10, 2022.
Office Action issued Oct. 18, 2022, in Japanese Patent Application No. 2021-542875.
Office Action issued May 22, 2023, in Chinese Patent Application No. 202080060124.2.
International Search Report from International Patent Application No. PCT/JP2020/031787, Nov. 10, 2020.

* cited by examiner

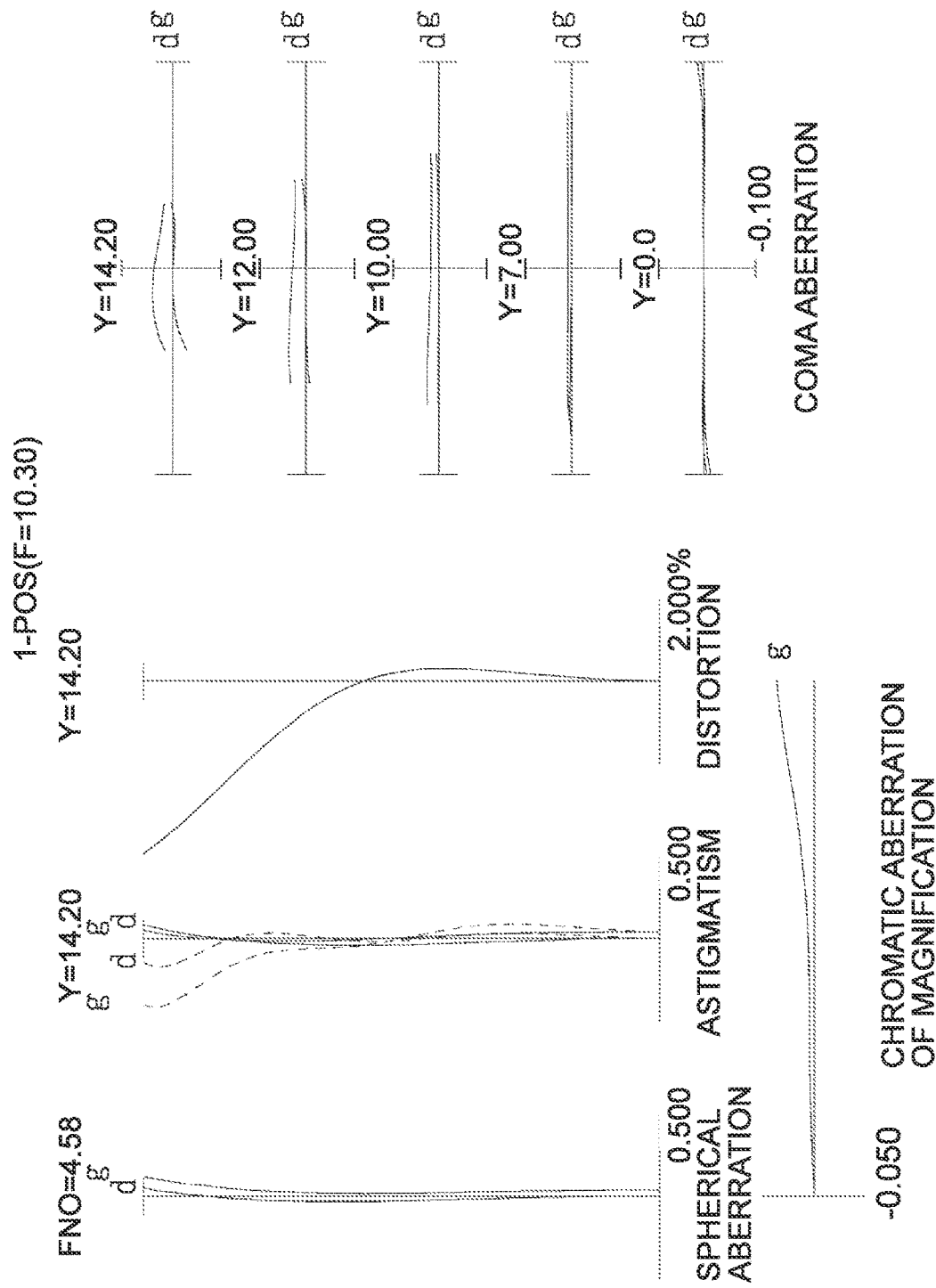

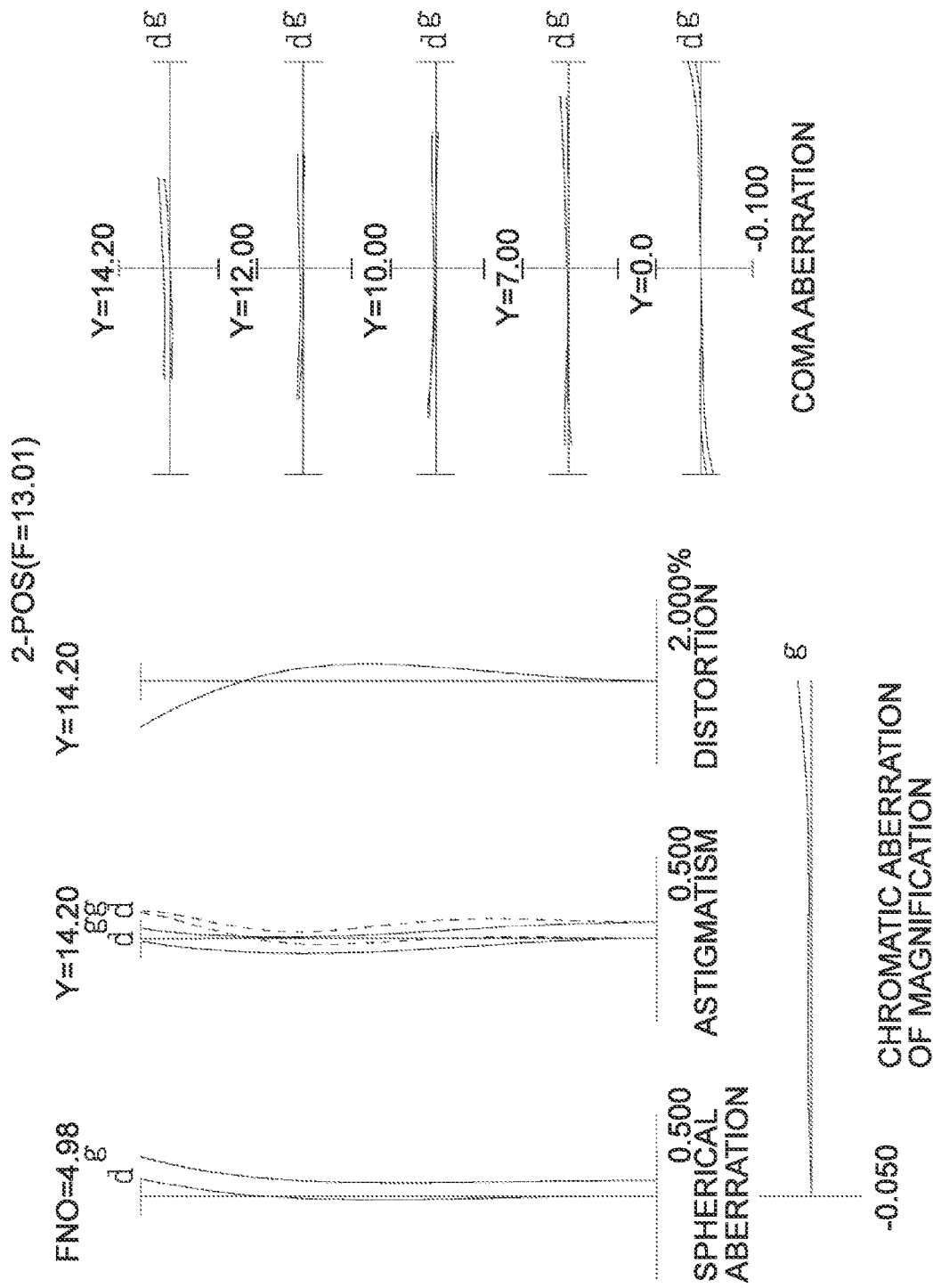

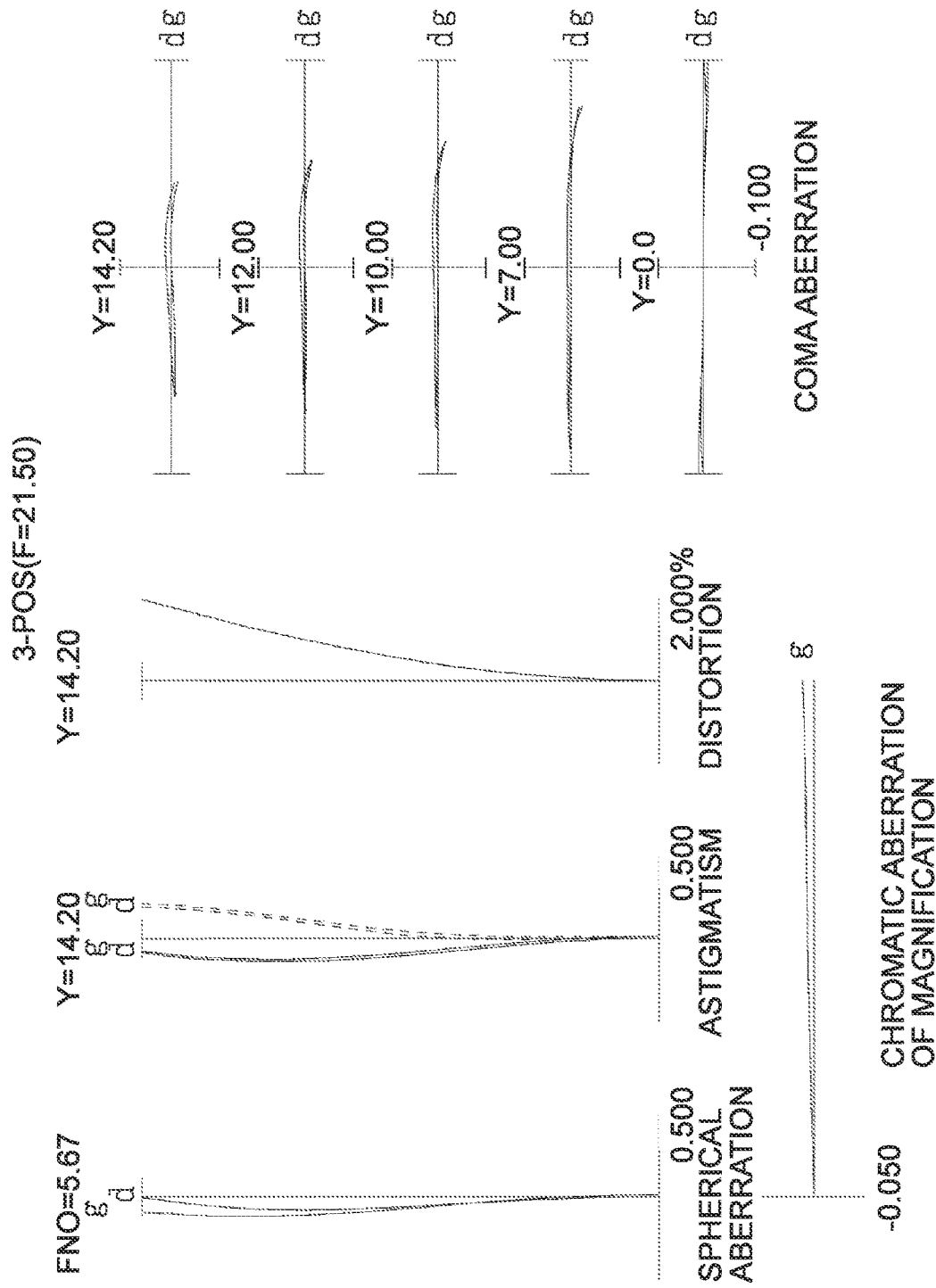

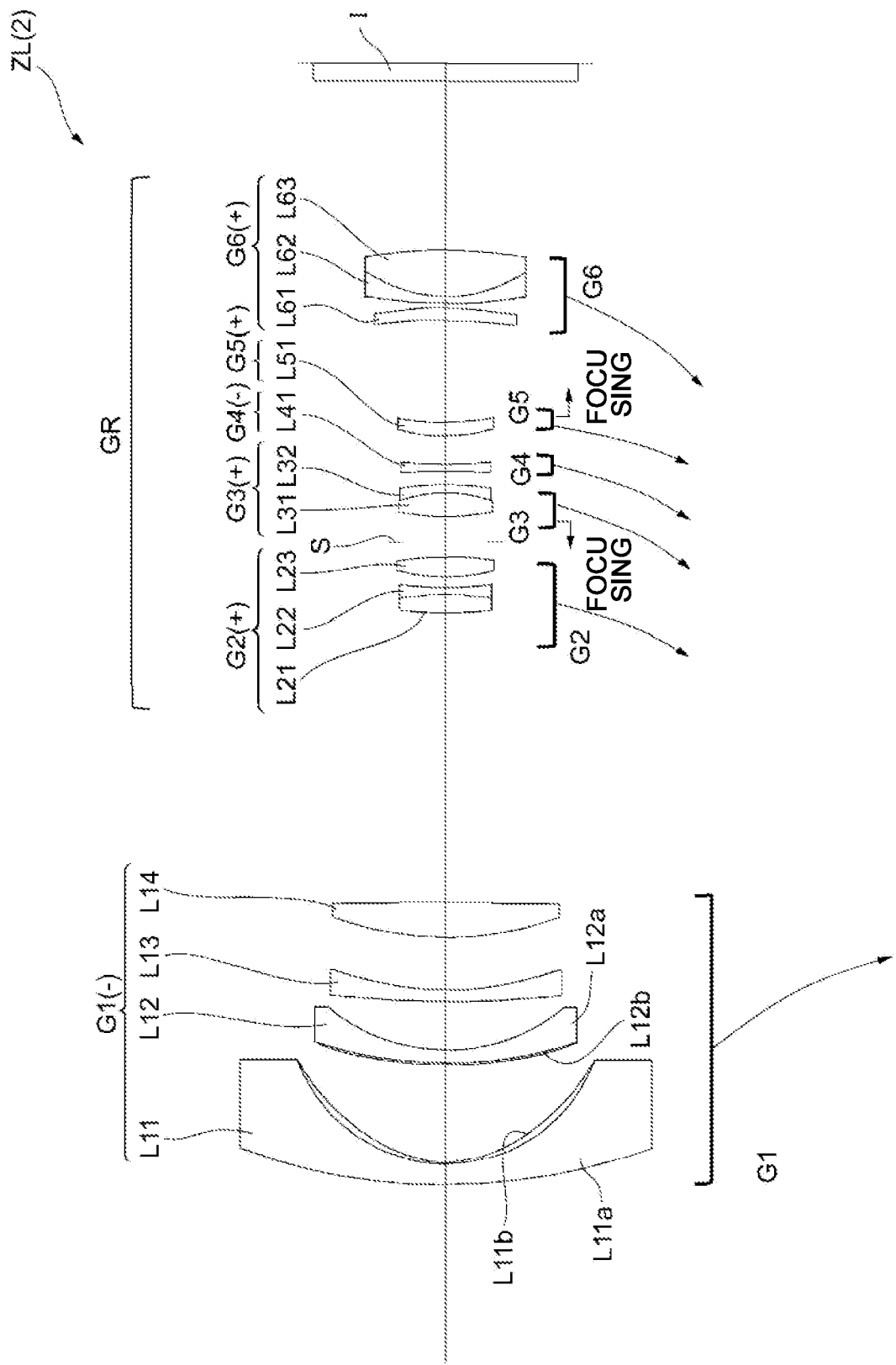

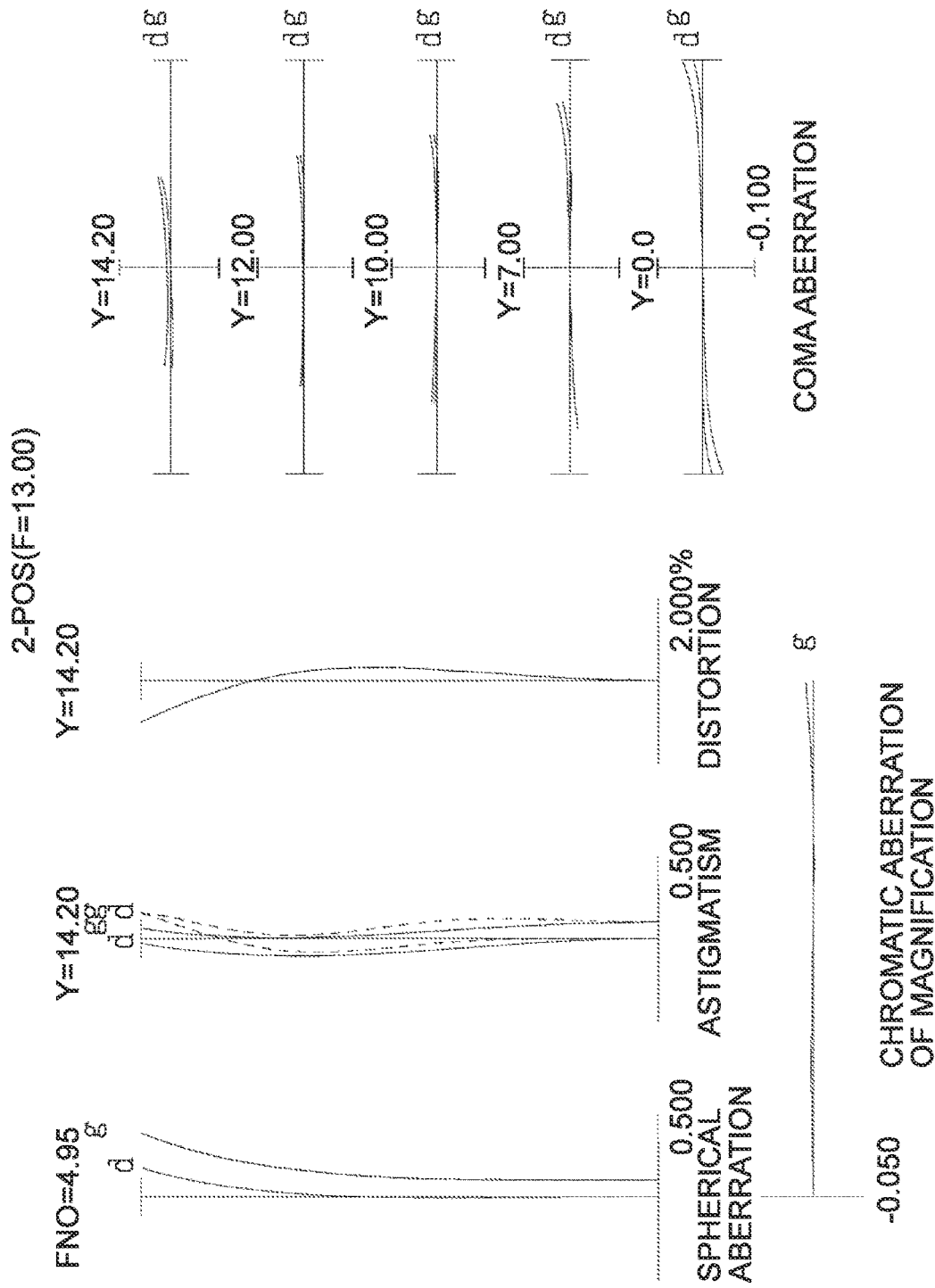

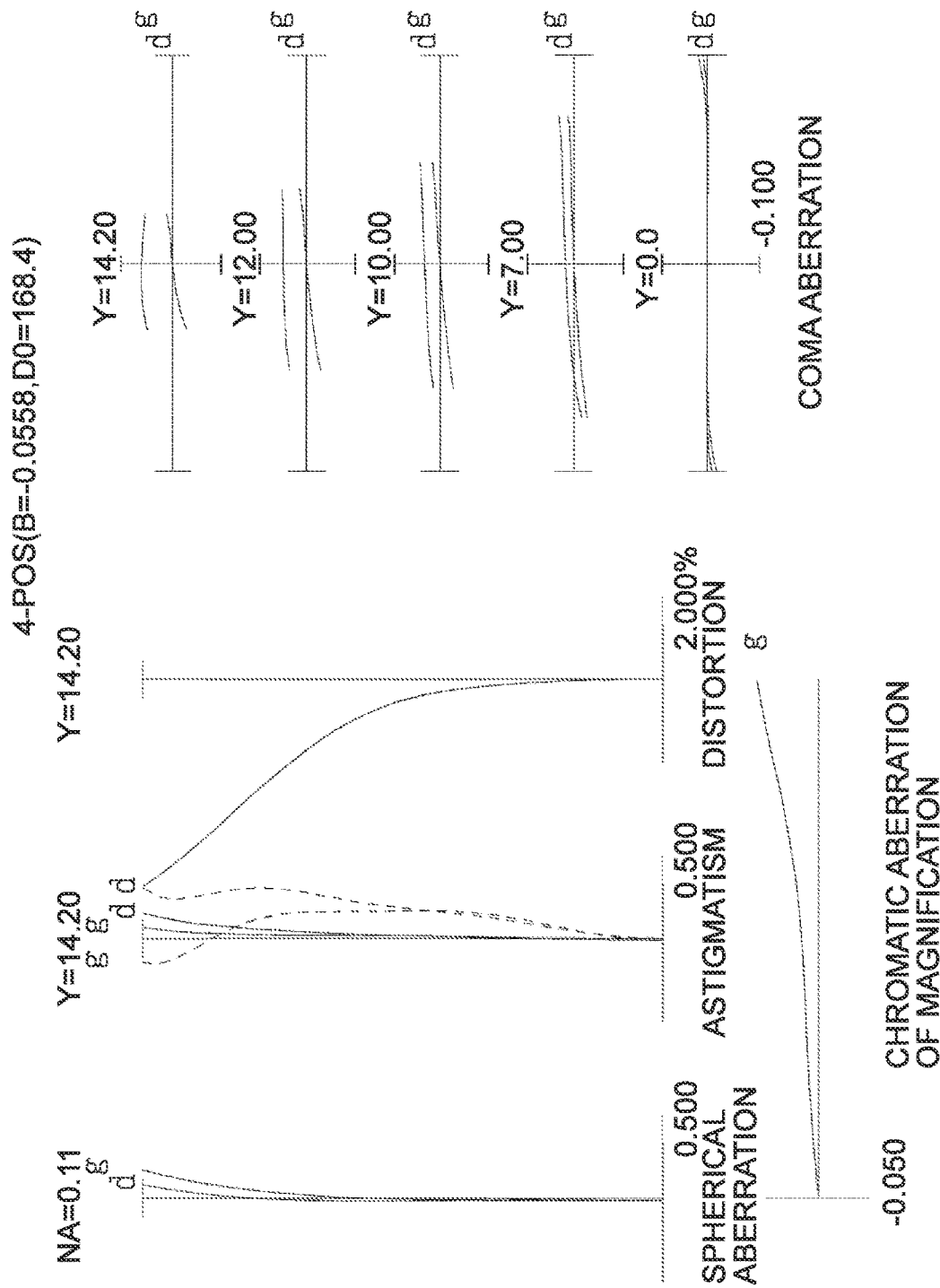

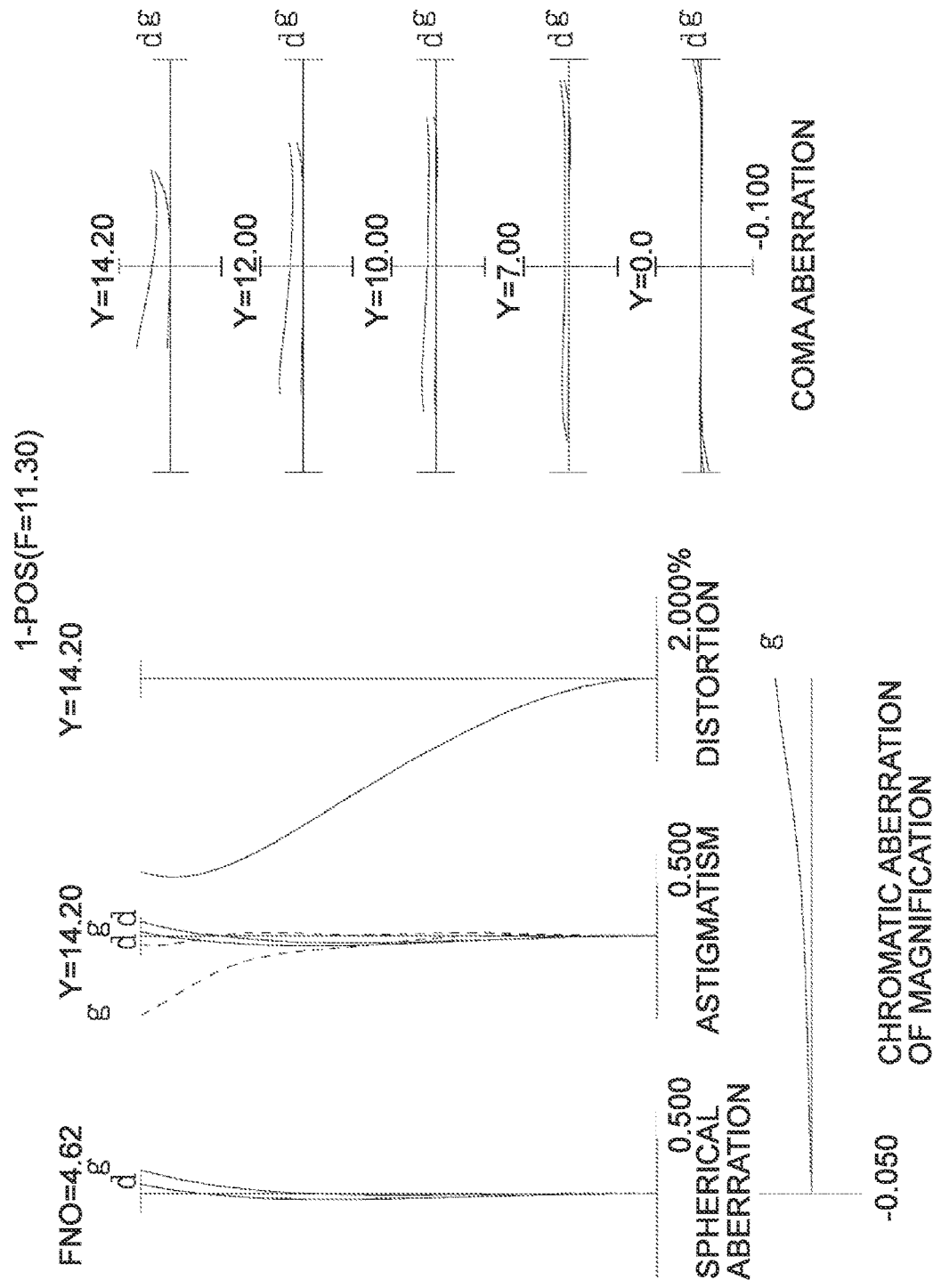

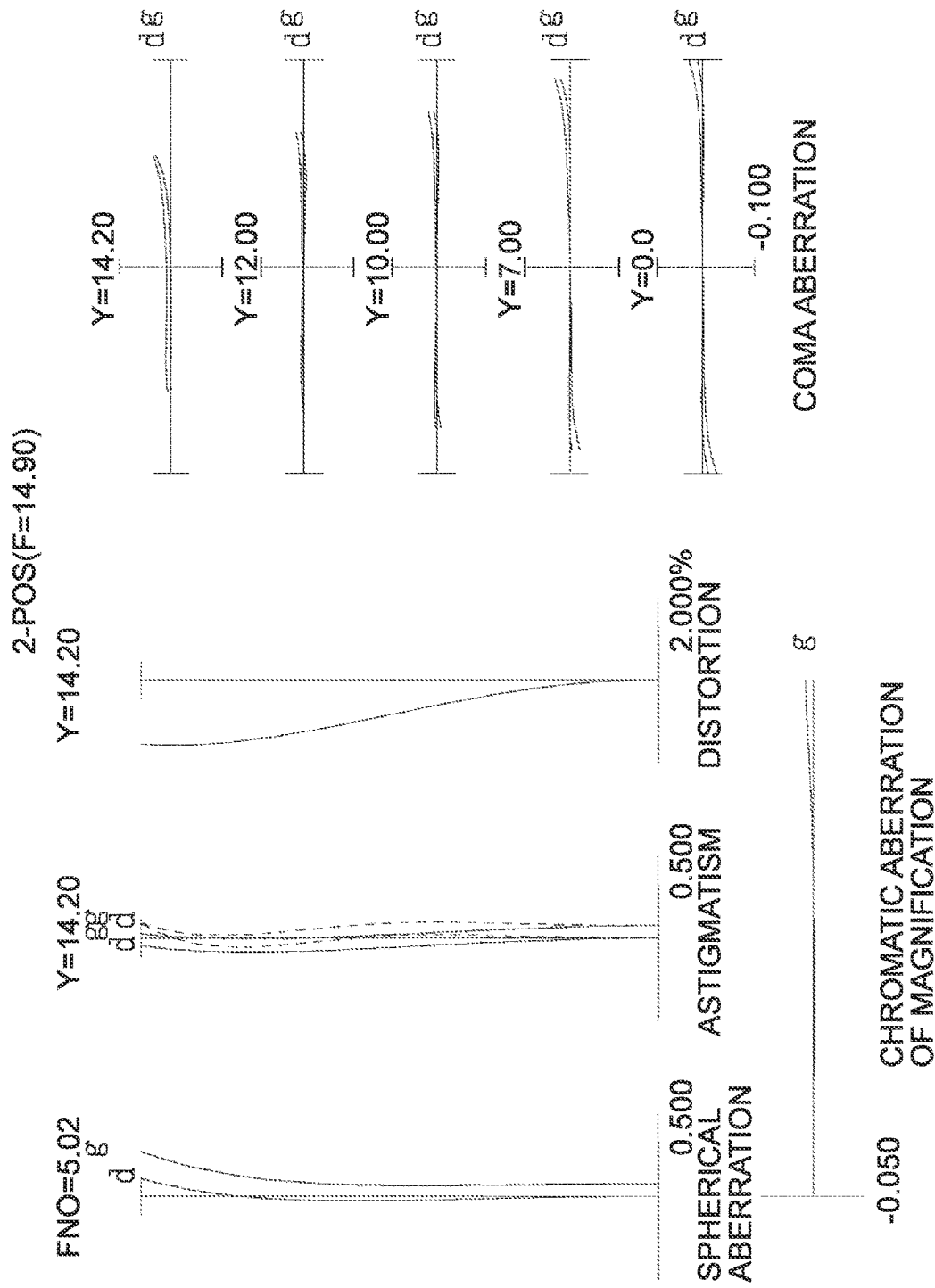

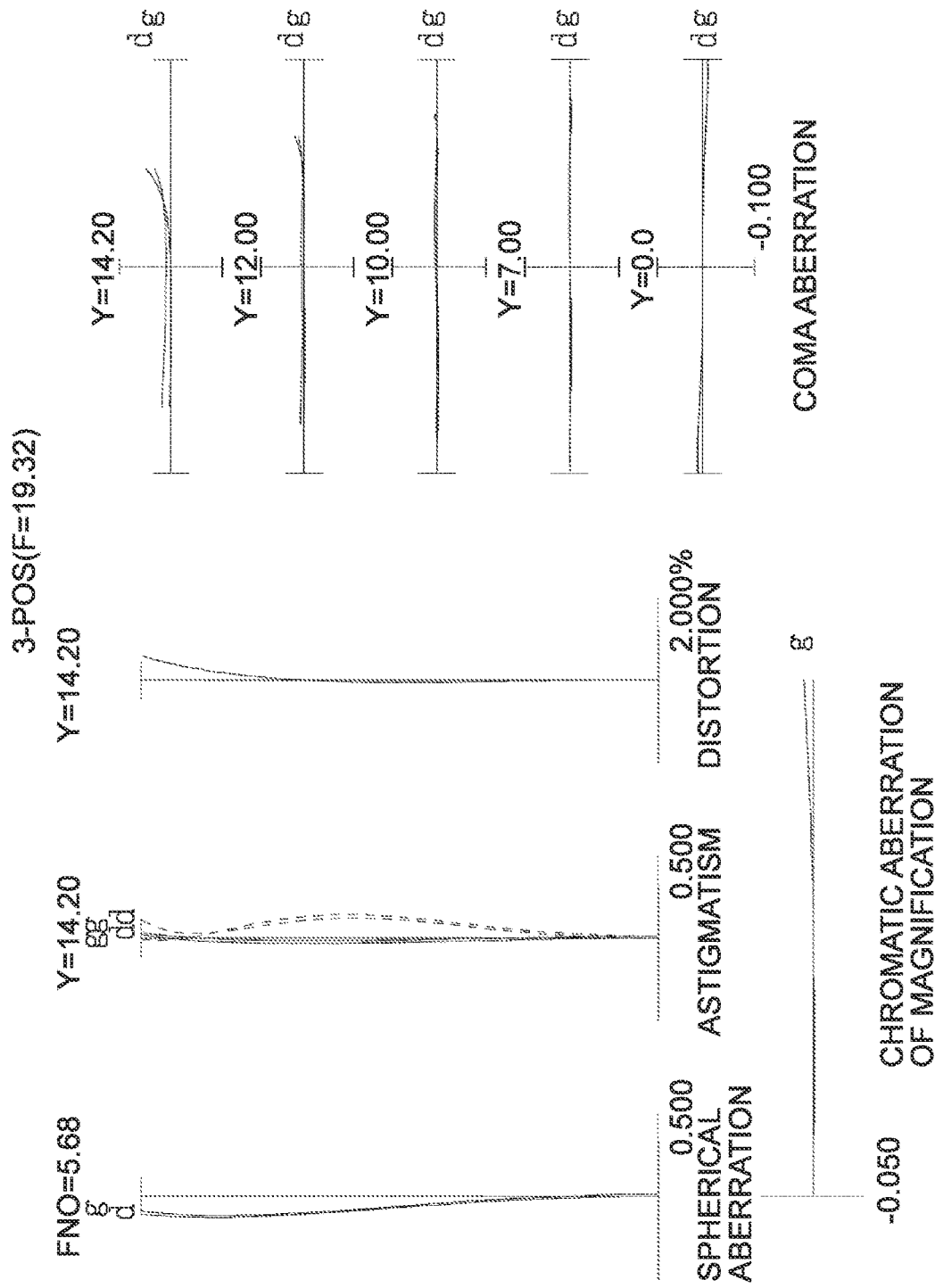

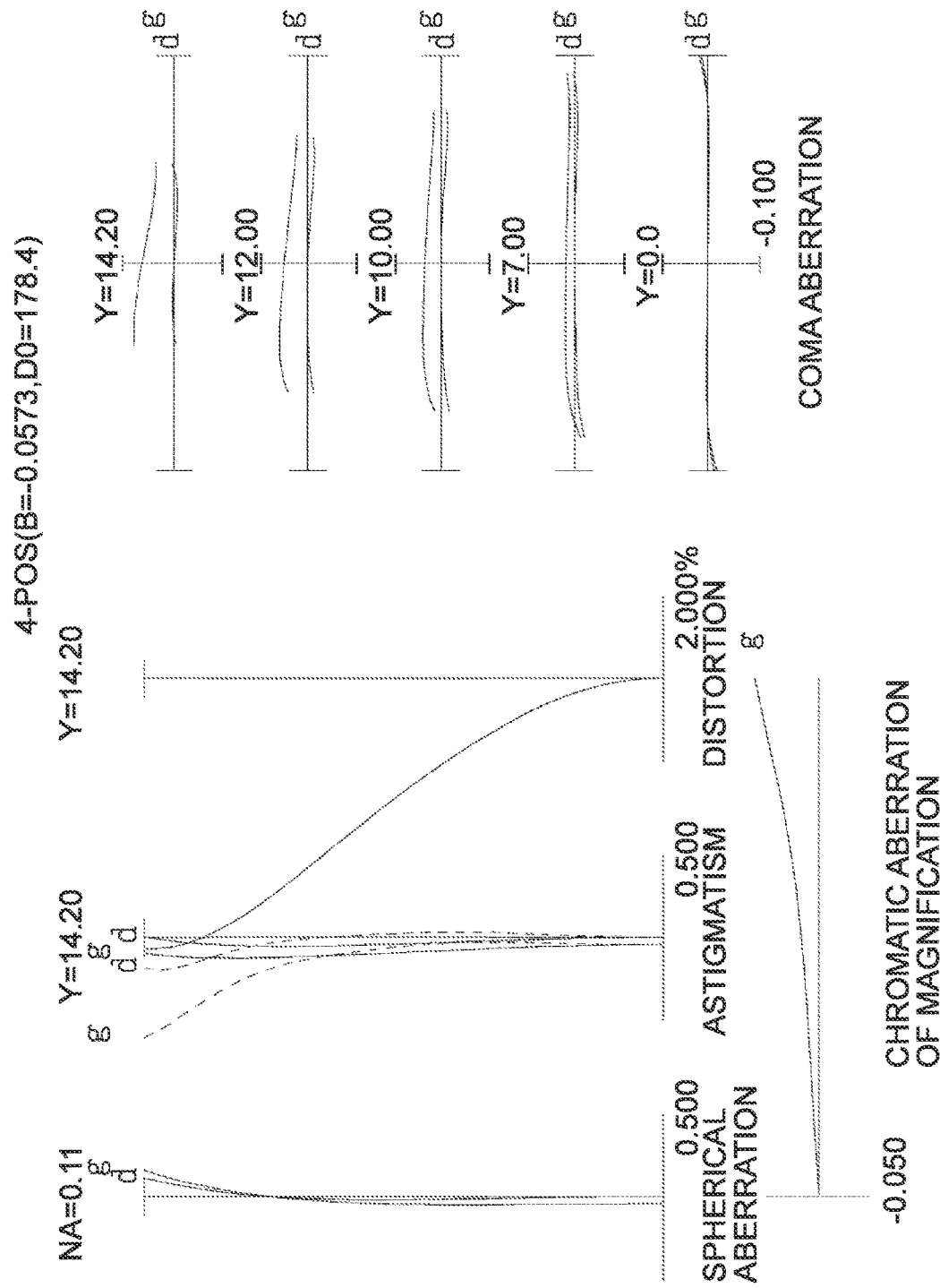

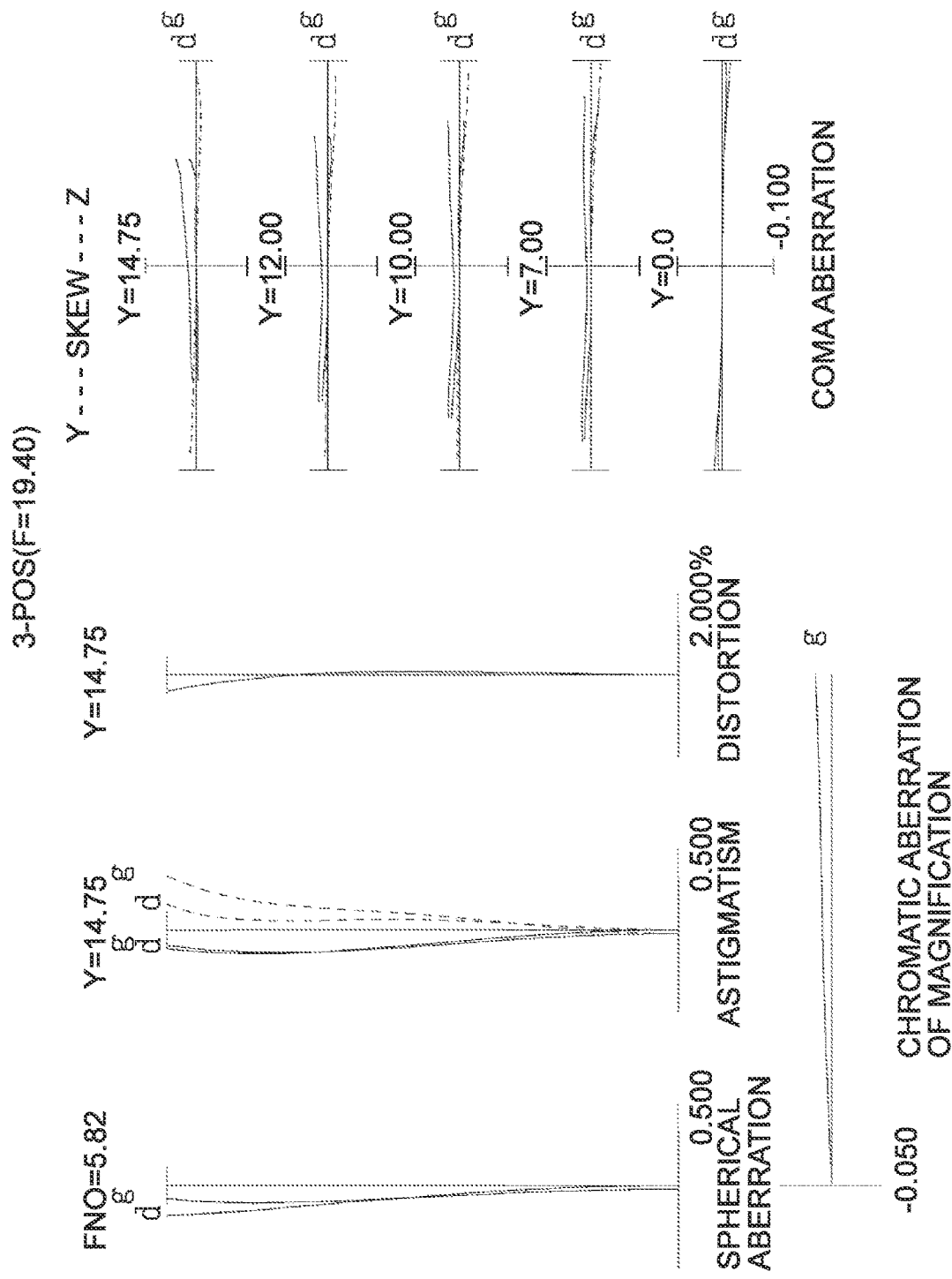

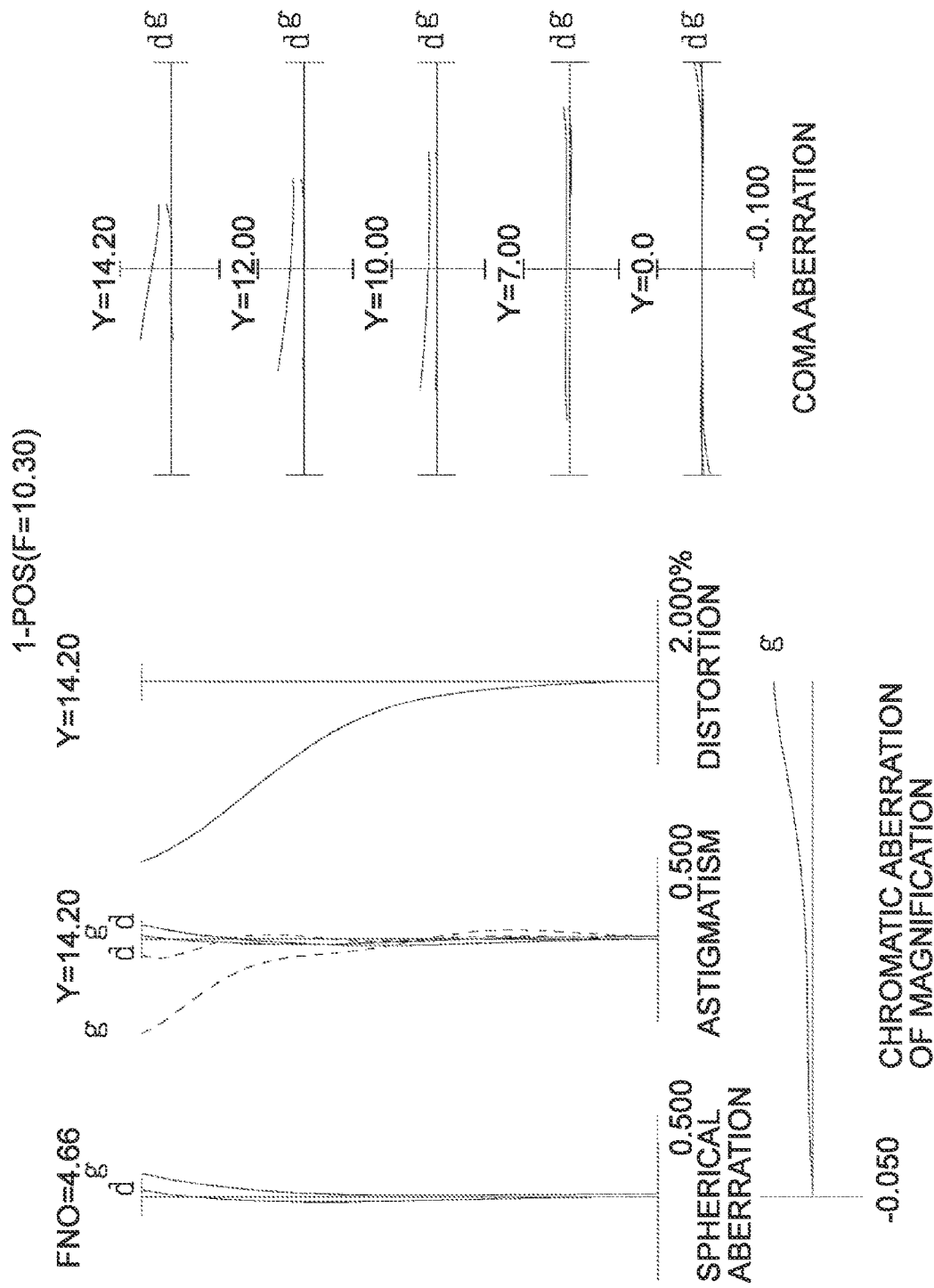

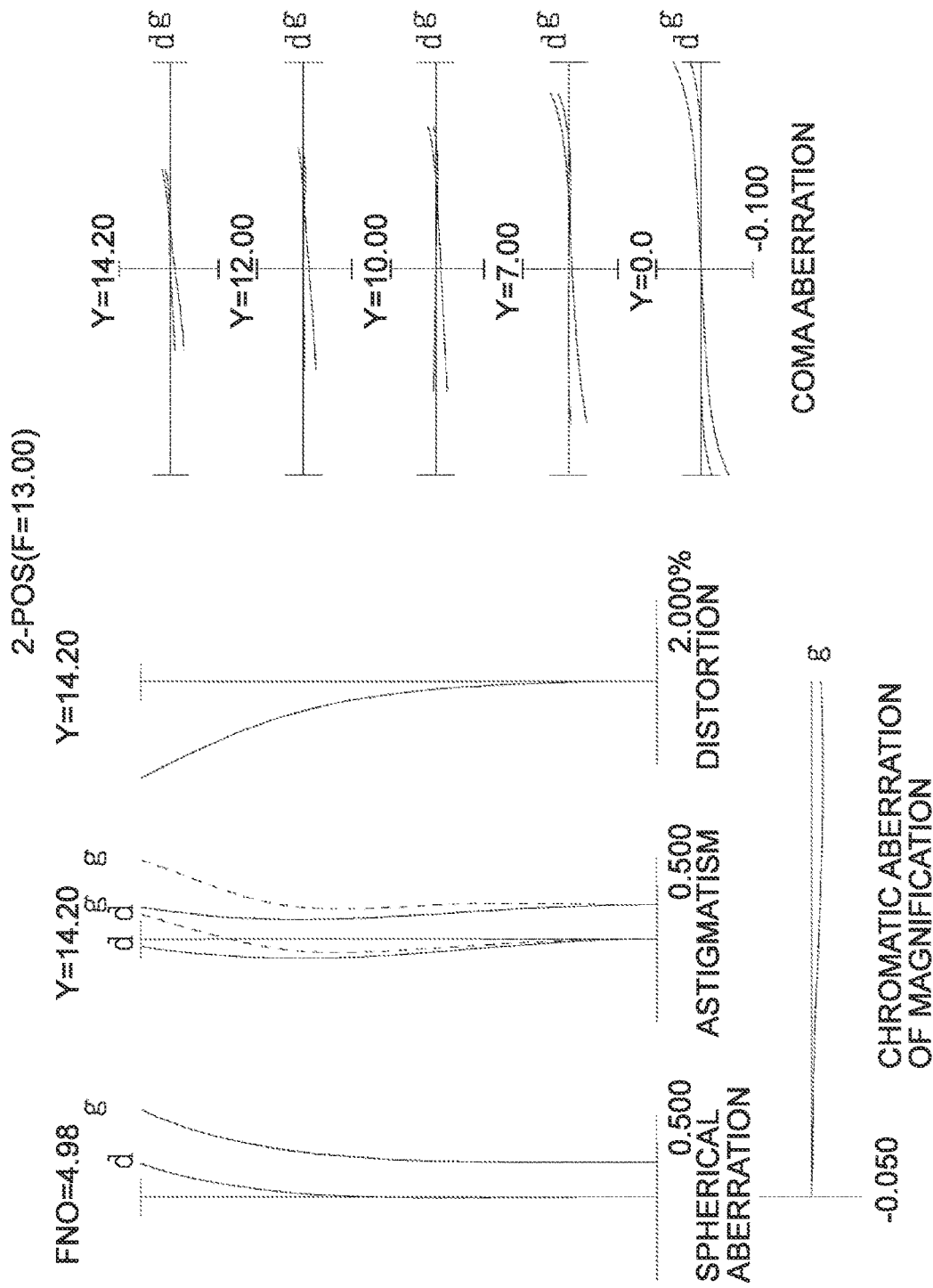

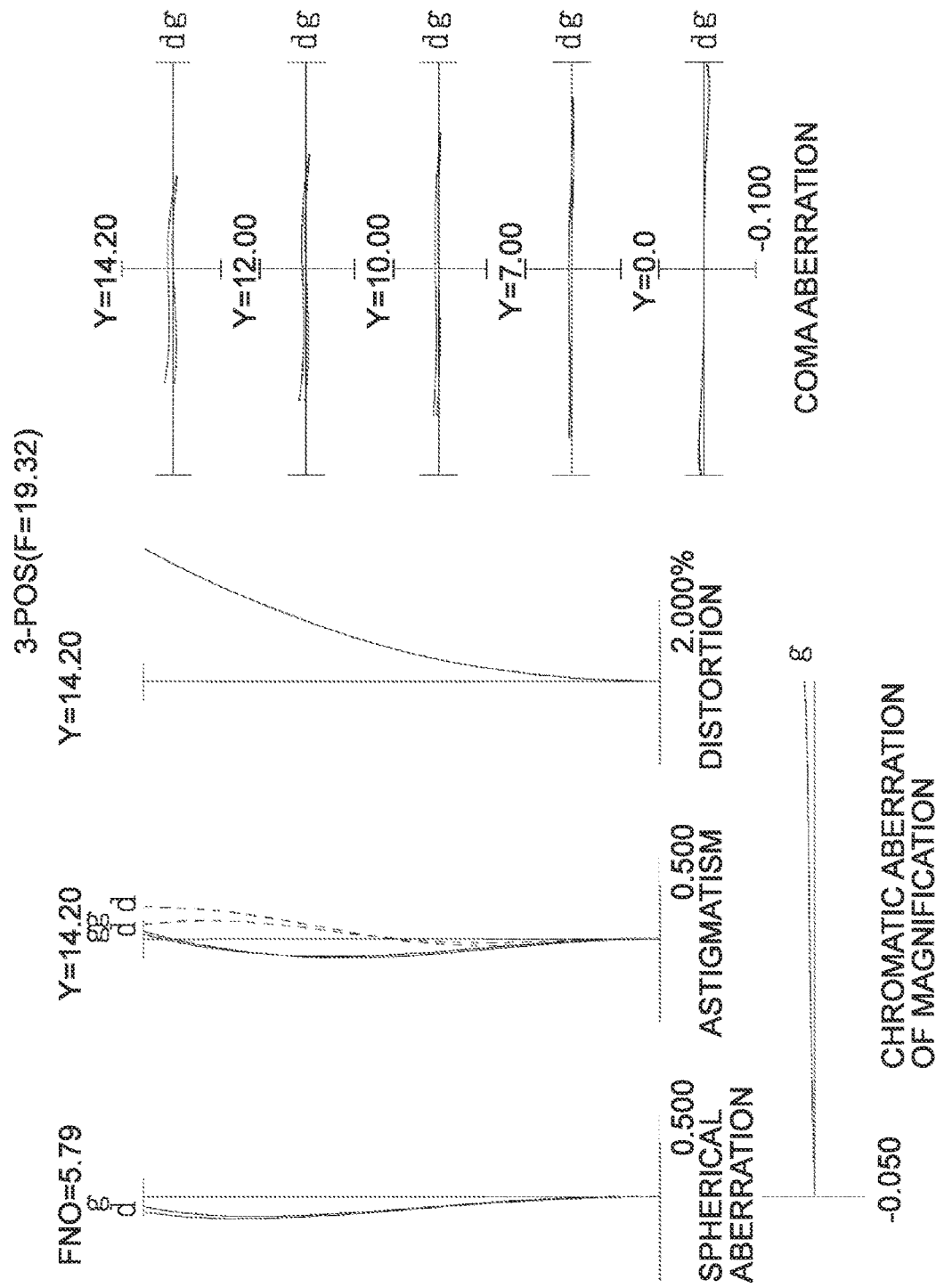

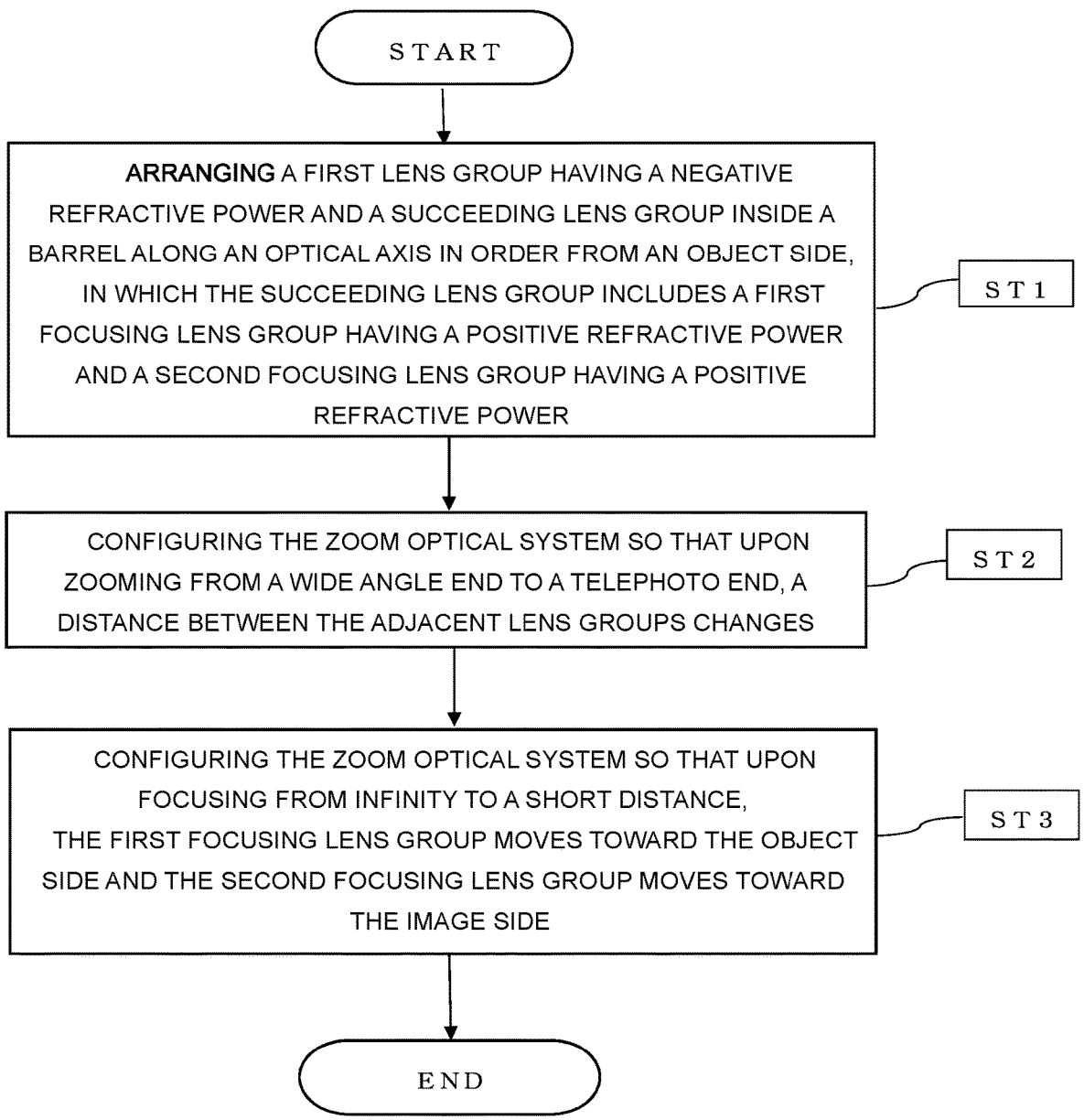

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus using the zoom optical system and a method for manufacturing the zoom optical system.

TECHNICAL BACKGROUND

Conventionally, zoom optical systems suitable for photographic cameras, electronic still cameras, video cameras and the like have been proposed (e.g., see PATENT DOCUMENT 1). However, weight reduction of focusing lens groups of the conventional zoom optical systems is insufficient and it has been difficult to suppress fluctuations in various aberrations including spherical aberrations upon focusing on an object from infinity to a short distance.

PRIOR ARTS LIST

Patent Document

PATENT DOCUMENT 1: Japanese Laid-Open Patent Publication No. 2015-28530(A)

SUMMARY OF THE INVENTION

A zoom optical system according to the present invention comprises a first lens group having a negative refractive power and a succeeding lens group, which are disposed on an optical axis in order from an object side, wherein a distance between the adjacent lens groups changes upon zooming from a wide angle end to a telephoto end, the succeeding lens group comprises a first focusing lens group having a positive refractive power and a second focusing lens group having a positive refractive power, the first focusing lens group moves toward the object side and the second focusing lens group moves toward an image side upon focusing from infinity to a short distance.

An optical apparatus according to the present invention is constructed by including the above-described zoom optical system.

A method for manufacturing a zoom optical system according to the present invention is a method for manufacturing a zoom optical system comprising a first lens group having a negative refractive power and a succeeding lens group, which are disposed on an optical axis in order from an object side, wherein the succeeding lens group comprises a first focusing lens group having a positive refractive power and a second focusing lens group having a positive refractive power. The method is configured to dispose each lens inside a lens barrel so that; a distance between the adjacent lens groups changes upon zooming from a wide angle end to a telephoto end, and the first focusing lens group moves toward an object side and the second focusing lens group moves toward an image side upon focusing from infinity to a short distance.

BRIEF DESCRIPTION OF THE DRAWINGS

FIG. 2A, FIG. 2B, and FIG. 2C are various aberration diagrams upon focusing on infinity in a wide angle end state, an intermediate focal length state and a telephoto end state respectively of the zoom optical system according to the first example;

FIG. 4 is a diagram illustrating a lens configuration of a zoom optical system according to a second example;

FIG. 5A, FIG. 5B, and FIG. 5C are various aberration diagrams upon focusing on infinity in a wide angle end state, an intermediate focal length state and a telephoto end state respectively of the zoom optical system according to the second example;

FIG. 6A, FIG. 6B, and FIG. 6C are various aberration diagrams upon focusing on a short-distance object in a wide angle end state, an intermediate focal length state and a telephoto end state respectively of the zoom optical system according to the second example;

FIG. 8A, FIG. 8B, and FIG. 8C are various aberration diagrams upon focusing on infinity in a wide angle end state, an intermediate focal length state and a telephoto end state respectively of the zoom optical system according to the third example;

FIG. 9A, FIG. 9B, and FIG. 9C are various aberration diagrams upon focusing on a short-distance object in a wide angle end state, an intermediate focal length state and a telephoto end state respectively of the zoom optical system according to the third example;

FIG. 11A, FIG. 11B, and FIG. 11C are various aberration diagrams upon focusing on infinity in a wide angle end state, an intermediate focal length state and a telephoto end state respectively of the zoom optical system according to the fourth example;

FIG. 14A, FIG. 14B, and FIG. 14C are various aberration diagrams upon focusing on infinity in a wide angle end state, an intermediate focal length state and a telephoto end state respectively of the zoom optical system according to the fifth example;

FIG. 17 is a flowchart illustrating a method for manufacturing a zoom optical system according to the present embodiment.

DESCRIPTION OF THE EMBODIMENTS

Figure 16:
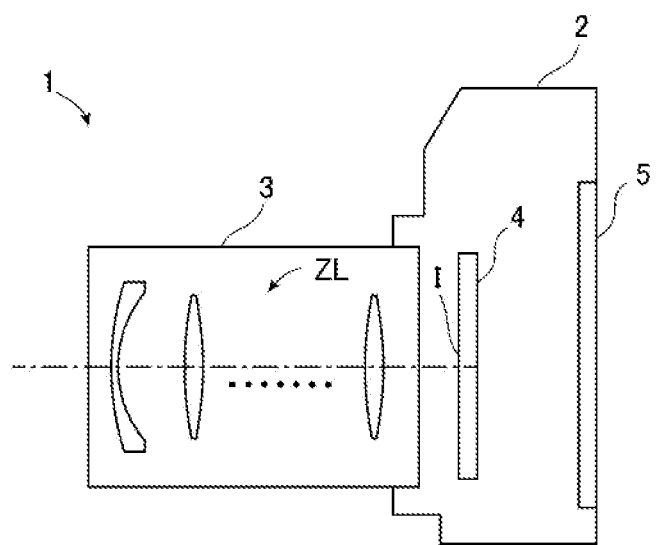
FIG. 16 is a diagram illustrating a camera configuration provided with a zoom optical system according to the present embodiment.

Hereinafter, preferable embodiments according to the present invention will be described. First, a camera (optical apparatus) provided with a zoom optical system according to the present embodiment will be described based on FIG. 16. As shown in FIG. 16, a camera 1 is constructed of a body 2 and a photographing lens 3 mounted on the body 2. The body 2 is provided with an image pickup device 4, a body control part (not shown) that controls operation of the digital camera and a liquid crystal operation screen 5. The photographing lens 3 comprises an optical system ZL consisting of a plurality of lens groups and a lens position control mechanism (not shown) that controls a position of each lens group. The lens position control mechanism is constructed of a sensor that detects the position of each lens group, a motor that moves the lens group back and forth along an optical axis and a control circuit or the like that drives the motor.

Light from an object is collected by the optical system ZL of the photographing lens 3 and reaches an image surface I of the image pickup device 4. The light reaching the image surface I from the object is photoelectrically converted by the image pickup device 4 and recorded in a memory (not shown) as digital image data. The digital image data recorded in the memory can be displayed on the liquid crystal screen 5 according to a user's operation. Note that the camera may be a mirrorless camera or a single-lens reflex type camera having a quick return mirror.

Figure 1:
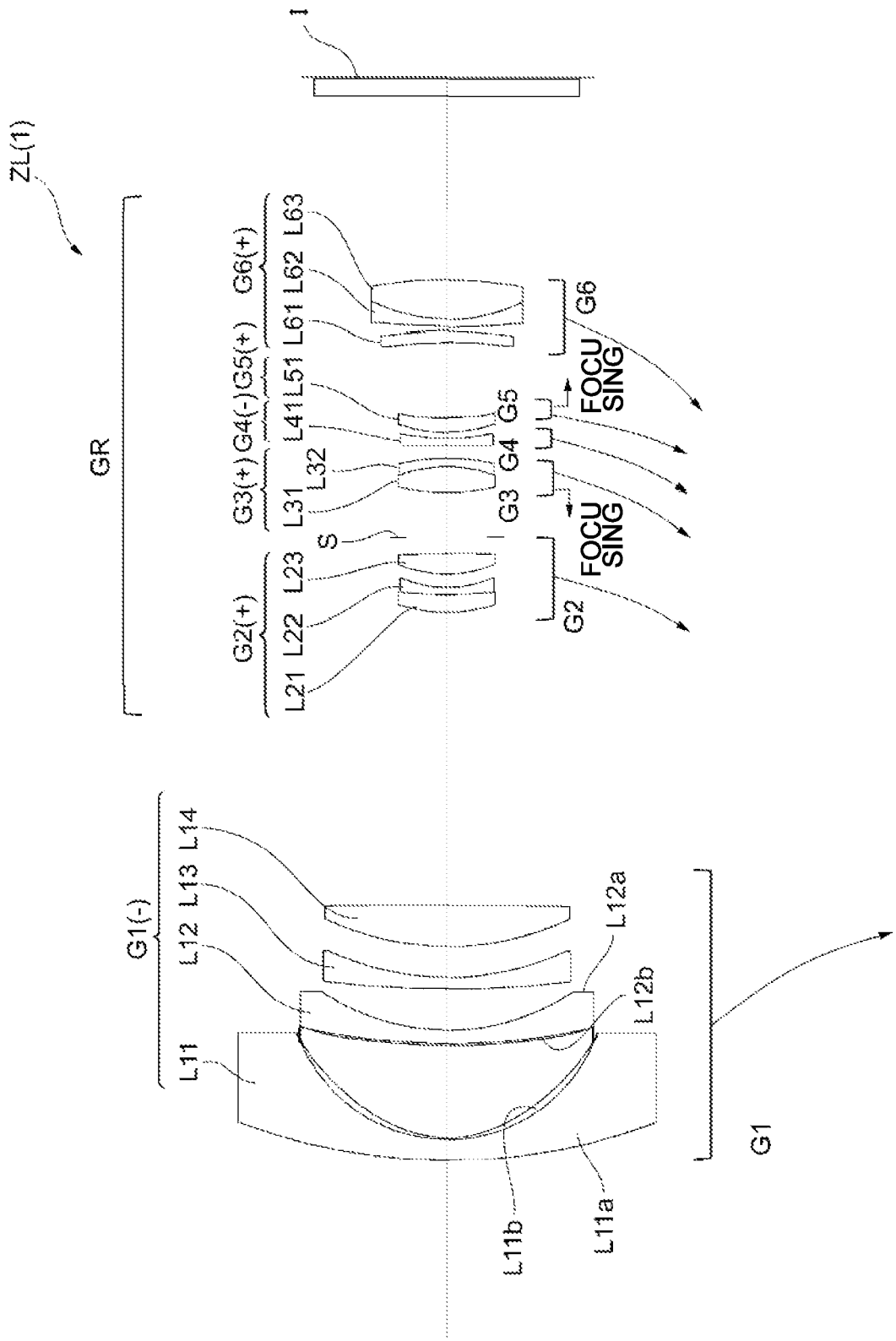
FIG. 1 is a diagram illustrating a lens configuration of a zoom optical system according to a first example.

Next, the zoom optical system (photographing lens) according to the present embodiment will be described. A zoom optical system ZL (1) as an example of the zoom optical system (zoom lens) ZL according to the present embodiment comprises a first lens group G1 having a negative refractive power and a succeeding lens group GR, which are disposed on an optical axis in order from an object side as shown in FIG. 1 and the succeeding lens group GR comprises a first focusing lens group having a positive refractive power (e.g., constructed of a third lens group G3) and a second focusing lens group having a positive refractive power (e.g., constructed of a fifth lens group G5). A distance between the adjacent lens groups changes upon zooming from a wide angle end to a telephoto end. Upon focusing from infinity to a short distance, the first focusing lens group moves toward an object side and the second focusing lens group moves toward an image side as shown by arrows together with characters "focusing" in FIG. 1.

In this way, upon focusing from infinity to a short distance, configuring the zoom optical system so that the first focusing lens group moves toward the object side and the second focusing lens group moves toward the image side, it is possible to satisfactorily correct a curvature of field generated upon focusing from infinity to a short distance without increasing the size of the focusing lens groups.

The zoom optical system preferably satisfies the following conditional expression (1):

$$0.01 < (-MVF1)/MVF2 < 30.0 \quad (1)$$

where

MVF1: an amount of movement of the first focusing lens group upon focusing on an object from infinity to a short distance MVF2: an amount of movement of the second focusing lens group upon focusing on an object from infinity to a short distance.

where the movement to the image side is set as positive.

Although the above-described conditional expression (1) defines a ratio of moving distances of the two focusing lens groups upon focusing, satisfying the conditional expression (1) makes it possible to satisfactorily correct a curvature of field generated upon focusing from infinity to a short distance while securing a predetermined photographing distance. In order to ensure the effects of the present embodiment, an upper limit value of the conditional expression (1) is preferably set to, for example, 28.00, 25.00, 23.00, 20.00, 18.00, 15.00, 13.00, 10.00, 8.00, 5.00, 3.00, 2.00, 1.80, 1.50, 1.20, and further 1.00. Moreover, a lower limit value of the conditional expression (1) is preferably set to, for example, 0.05, 0.10, 0.15, 0.18, 0.20, 0.25, 0.28, 0.30, 0.33, 0.35, and further 0.38.

Furthermore, the above-described zoom optical system preferably satisfies the following conditional expression (2):

$$0.20 < ff1/ff2 < 1.70 \quad (2)$$

where ff1: focal length of first focusing lens group
ff2: focal length of second focusing lens group The above-described conditional expression (2) defines the ratio of focal lengths of the two focusing lens groups, and satisfying the conditional expression (2) makes it possible to satisfactorily correct a curvature of field generated upon focusing from infinity to a short distance. In order to ensure the effects of the present embodiment, an upper limit value of the conditional expression (2) is preferably set to, for example, 1.65, 1.60, 1.55, 1.50, 1.40, 1.30, 1.20, 1.15, 1.10, 1.05, 1.00, and further 0.97. A lower limit value of the conditional expression (2) is preferably set to, for example, 0.23, 0.25, 0.28, 0.30, 0.33, 0.35, 0.38, 0.40, 0.42, and further 0.44.

The above-described zoom optical system preferably satisfies the following conditional expression (3):

$$0.15 < (-f1)/ff1 < 1.30 \quad (3)$$

where f1: focal length of first lens group

The above-described conditional expression (3) defines a ratio of focal lengths of the first lens group G1 and the first focusing lens group, and satisfying the conditional expression (3) makes it possible to satisfactorily correct a curvature of field generated upon focusing from infinity to a short distance while securing a predetermined photographing distance. In order to ensure the effects of the present embodiment, an upper limit value of the conditional expression (3) is preferably set to, for example, 1.25, 1.20, 1.15, 1.10, 1.05, 1.00, 0.95, 0.90, 0.85, 0.80, 0.75, 0.70, 0.68, 0.65, and further 0.63. Moreover, a lower limit value of the conditional expression (3) is preferably set to, for example, 0.18, 0.20, 0.23, 0.25, 0.28, 0.30, 0.33, 0.35, and further 0.38.

The above-described zoom optical system preferably satisfies the following conditional expression (4):

$$0.10 < (-f1)/ff2 < 0.95 \quad (4)$$

The above-described conditional expression (4) defines the ratio of focal lengths of the first lens group G1 and the second focusing lens group, and satisfying the conditional expression (4) makes it possible to satisfactorily correct a curvature of field generated upon focusing from infinity to a short distance while securing a predetermined photographing distance. To ensure the effects of the present embodiment, an upper limit value of the conditional expression (4) is preferably set to, for example, 0.90, 0.80, 0.75, 0.70, 0.65, 0.60, 0.58, 0.55, 0.53, and further 0.50. A lower limit value of the conditional expression (4) is preferably set to, for example, 0.13, 0.15, 0.18, 0.20, 0.21, and further 0.23.

In the above-described zoom optical system, the second focusing lens group preferably consists of one convex lens. Configuring the zoom optical system in this way makes it possible to satisfactorily correct a curvature of field generated upon focusing from infinity to a short distance without increasing the size of the focusing lens groups.

In the above-described zoom optical system, the first focusing lens group preferably consists of a cemented lens consisting of a convex lens and a concave lens. Adopting such a configuration makes it possible to satisfactorily correct chromatic aberration of magnification generated upon focusing from infinity to a short distance without increasing the size of the focusing lens groups.

In the above-described zoom optical system, the succeeding lens group comprises a second lens group and a third lens group having a positive refractive power disposed in order from an object side and preferably satisfies the following conditional expression (5)

$$0.10 < (-f1)/f2 < 1.20 \quad (5)$$

The above-described conditional expression (5) defines a configuration of the succeeding lens group and defines a ratio of focal lengths of the first lens group G1 and the second lens group G2, and satisfying the conditional expression (5) makes it possible to satisfactorily correct various aberrations including a spherical aberration upon zooming from a wide angle end to a telephoto end. To ensure the effects of the present embodiment, an upper limit value of the conditional expression (5) is preferably set to, for example, 1.15, 1.10, 1.05, 1.00, 0.95, 0.90, 0.85, 0.80, 0.75, 0.73, and further 0.70. Furthermore, a lower limit value of the conditional expression (5) is preferably set to, for example, 0.15, 0.20, 0.23, 0.27, 0.30, 0.32, and further 0.35.

In the above-described zoom optical system, the first lens group preferably comprises three negative lenses disposed in order from the object side. Such a configuration makes it possible to satisfactorily correct a coma aberration or curvature of field in a wide angle end state.

The above-described zoom optical system preferably satisfies the following conditional expression (6):

$$-0.80 < \beta WF1 < 0.80 \quad (6)$$

where, $\beta WF1$: lateral magnification of the first focusing lens group upon focusing on an infinity object in a wide angle end state.

The conditional expression (6) defines a range of lateral magnification of the first focusing lens group upon focusing on an infinity object in a wide angle end state. Satisfying the conditional expression (6) makes it possible to suppress fluctuations in various aberrations including a spherical aberration upon focusing on an object from infinity to a short distance.

When the corresponding value of the conditional expression (6) is out of the defined range, declination of an axial light beam increases and it is more difficult to correct a spherical aberration. Moreover, when symmetry is poor with respect to a principal light beam, it is more difficult to correct a distortion or a coma aberration.

To ensure the effects of the present embodiment, an upper limit value of the conditional expression (6) is set to, for example, 0.78, 0.75, 0.73, 0.70, 0.68, 0.65, 0.63, 0.60, 0.58, and further 0.55, and it is thereby possible to further ensure the effects of the present embodiment. On the other hand, a lower limit value of the conditional expression (6) is set to, for example, −0.75, −0.70, −0.65, −0.60, −0.55, −0.50, −0.45, −0.40, −0.38, −0.35, −0.33, −0.31, −0.25, −0.20, and further −0.10, it is thereby possible to further ensure the effects of the present embodiment.

The above-described zoom optical system preferably satisfies the following conditional expression (7):

$$-0.80 < \beta WF2 < 0.80 \quad (7)$$

where, $\beta WF2$: lateral magnification of the second focusing lens group upon focusing on an infinity object in a wide angle end state.

The conditional expression (7) defines a range of lateral magnification of the second focusing lens group upon focusing on an infinity object in a wide angle end state. When lateral magnification of the second focusing lens group satisfies the conditional expression (7), it is possible to suppress fluctuations in various aberrations including a spherical aberration upon focusing on an object from infinity to a short distance.

When the corresponding value of the conditional expression (7) is out of the defined range, declination of an axial light beam increases and it is more difficult to correct a spherical aberration. Moreover, when symmetry is poor with respect to a principal light beam, it is more difficult to correct a distortion or a coma aberration.

To ensure the effects of the present embodiment, an upper limit value of the conditional expression (7) is set to, for example, 0.78, 0.75, 0.73, 0.70, 0.68, 0.65, 0.63, 0.60, 0.58, 0.55, 0.53, and further 0.50, and it is thereby possible to further ensure the effects of the present embodiment. On the other hand, a lower limit value of the conditional expression (7) is set to, for example, −0.78, −0.75, −0.73, −0.70, −0.50, −0.40, −0.30, −0.20, and further −0.10, and it is thereby possible to further ensure the effects of the present embodiment.

The above-described zoom optical system preferably satisfies the following conditional expression (8):

$$(\beta WF1 + (1/\beta WF1))^{-2} < 0.25 \quad (8)$$

where, $\beta WF1$: lateral magnification of the first focusing lens group upon focusing on an infinity object in a wide angle end state.

The conditional expression (8) defines a range of lateral magnification of the first focusing lens group upon focusing on an infinity object in a wide angle end state in a form different from the conditional expression (6). When lateral magnification of the first focusing lens group satisfies the conditional expression (8), it is possible to suppress fluctuations in various aberrations including a spherical aberration upon focusing on an object from infinity to a short distance.

When the corresponding value of the conditional expression (8) is out of the defined range, declination of an axial light beam increases and it is more difficult to correct a spherical aberration. Moreover, when symmetry is poor with respect to a principal light beam, it is more difficult to correct a distortion or a coma aberration.

To ensure the effects of the present embodiment, an upper limit value of the conditional expression (8) is set to, for example, 0.24, 0.23, 0.22, 0.20, 0.18, and further 0.16, and it is thereby possible to further ensure the effects of the present embodiment.

The above-described zoom optical system preferably satisfies the following conditional expression (9):

$$(\beta WF2 + (1/\beta WF2))^{-2} < 0.25 \quad (9)$$

where, $\beta WF2$: lateral magnification of the second focusing lens group upon focusing on an infinity object in a wide angle end state.

The conditional expression (9) defines a range of lateral magnification of the second focusing lens group upon focusing on an infinity object in a wide angle end state in a form different from the conditional expression (7). When the lateral magnification of the second focusing lens group satisfies the conditional expression (9), it is possible to suppress fluctuations in various aberrations including a spherical aberration upon focusing on an object from infinity to a short distance.

When the corresponding value of the conditional expression (9) is out of the defined range, declination of an axial light beam increases and it is more difficult to correct a spherical aberration. Moreover, when symmetry is poor with respect to a principal light beam, it is more difficult to correct a distortion or a coma aberration.

To ensure the effects of the present embodiment, an upper limit value of the conditional expression (9) is set to, for example, 0.24, 0.23, 0.22, 0.20, 0.18, and further 0.16, and it is thereby possible to further ensure the effects of the present embodiment.

Next, a method for manufacturing the above-described optical system will be outlined with reference to FIG. 17. According to the present manufacturing method, a first lens group having a negative refractive power and a succeeding lens group are disposed inside a barrel along an optical axis in order from an object side (step ST1). Note that at this time, the succeeding lens group comprises a first focusing lens group having a positive refractive power and a second focusing lens group having a positive refractive power. Next, the zoom optical system is configured so that upon zooming from a wide angle end to a telephoto end, a distance between the adjacent lens groups changes (step ST2). Moreover, the zoom optical system is configured so that upon focusing from infinity to a short distance, the first focusing lens group moves toward the object side and the second focusing lens group moves toward the image side (step ST3).

According to the zoom optical system, the camera (optical apparatus) provided with this zoom optical system and the zoom optical system manufactured by the above-described manufacturing method according to the present embodiment, it is possible to reduce the weights of the focusing lens groups, thereby achieve high speed AF and quietness during AF without increasing the size of the barrel and satisfactorily suppress aberration fluctuation upon zooming from a wide angle end state to a telephoto end state and aberration fluctuations upon focusing on an object from infinity to a short distance.

EXAMPLES

Hereinafter, the zoom optical system ZL according to specific examples of the above-described embodiment will be described based on the accompanying drawings. FIG. 1, FIG. 4, FIG. 7, FIG. 10 and FIG. 13 are cross-sectional views illustrating a configuration and a refractive power distribution of the zoom optical system ZL {ZL (1) to ZL (5)} according to first to fifth examples. In each cross-sectional view, moving directions of the respective lens groups on an optical axis upon zooming from a wide angle end state (W) to a telephoto end state (T) are shown by arrows. Furthermore, the moving directions of the focusing lens groups upon focusing on an object from infinity to a short distance are shown by arrows together with characters "focusing."

In these drawings (FIG. 1, FIG. 4, FIG. 7, FIG. 10, FIG. 13), each lens group is represented by a combination of a reference character G and a number and each lens is represented by a combination of a reference character L and a number. In this case, to prevent the number of types of reference characters and numbers from increasing and prevent complications, lens groups or the like are represented using a combination of reference characters and numbers independently for each example. For this reason, even when a combination of the same reference character and number is used among different examples, this does not necessarily mean that they have an identical configuration.

In FIGS. 2A-2C and FIGS. 3A-3C, FIGS. 5A-5C and FIGS. 6A-6C, FIGS. 8A-8C and FIGS. 9A-9C, FIGS. 11A-11C and FIGS. 12A-12C, FIGS. 14A-14C and FIGS. 15A-15C, "FNO" denotes an F number, "NA" denotes a numerical aperture, "Y" denotes an image height. An F number or numerical aperture value corresponding to a maximum aperture is shown in a spherical aberration diagram, a maximum value of image height is shown in an astigmatism diagram and a distortion diagram, and each image height value is shown in a coma aberration diagram. A term "d" denotes a d-line ($\lambda$=587.6 nm), "g" denotes a g-line ($\lambda$=435.8 nm). In the astigmatism diagram, a solid line represents a sagittal image surface and a broken line represents a meridional image surface. The distortion diagram shows a distortion using the d-line as a reference and the diagram of chromatic aberration of magnification shows a chromatic aberration of magnification using the g-line as a reference.

Table 1 to Table 5 will be presented hereinafter, and among these tables, Table 1, Table 2, Table 3, Table 4 and Table 5 are tables that show specification data in a first example, a second example, a third example, a fourth example and a fifth example, respectively. In each example, the d-line (wavelength $\lambda$=587.6 nm) and the g-line (wavelength $\lambda$=435.8 nm) are selected as targets for calculating aberration characteristics.

In a table of [general data], "focal length (f)" represents a focal length of the entire lens system at a wide angle end (fw) and a telephoto end (ft). "F. NO" represents an F number, "2$\omega$" represents an angle of view (unit is ° (degrees) and "$\omega$" represents a half angle of view). "TL" represents, in an air equivalent length, a distance from a front most lens surface to a final lens surface on an optical axis upon focusing on infinity with BF added, "BF" represents an air equivalent distance (back focusing) from the lens final surface to the image surface I on the optical axis upon focusing on infinity. Note that these values are shown in each zooming state of wide angle end (W), intermediate focal length (M) and telephoto end (T) respectively.

In a table of [lens data], a surface number (number in a field shown by a character "surface") represents order of optical surfaces from an object side in a direction in which a light beam travels, "R" represents a radius of curvature of each optical surface (surface on which the center of curvature is located on the image side is set as a positive value), "D" represents a surface distance which is a distance on the optical axis from each optical surface to the next optical surface (or image surface), "nd" represents a refractive index of the material of an optical member with respect to the d-line, and "vd" represents an Abbe number using the d-line of the material of the optical member as a reference. "∞" of the radius of curvature represents a flat surface or opening, and "(aperture stop S)" represents an aperture stop. The description of refractive index of air nd=1.00000 is omitted. When the lens surface is aspherical, the surface number is marked with an asterisk "*" and a paraxial radius of curvature is shown in the field of radius of curvature R.

In a table of [aspherical surface data], the shape of the aspherical surface shown in [lens data] is expressed by the following expression (A). "X(y)" represents a distance (sag amount) along an optical axis direction from a tangent plane at a vertex of the aspherical surface to a position on the aspherical surface at a height y, "R" represents a radius of curvature (paraxial radius of curvature) of a reference spherical surface, "κ" represents a conic constant and "Ai" represents an ith order aspherical coefficient. "E-n" represents "×10$^{-n}$." For example, 1.234E-05=1.234×10$^{-5}$. Note that a second order aspherical coefficient A2 is 0 and the description thereof is omitted.

$$X(y)=(y^2/R)/\{1+(1-\kappa \times y^2/R^2)^{1/2}\}+A4\times y^4+A6\times y^6+A8\times y^8+A10\times y^{10}+A12\times y^{12}$$ (A)

In a table of [lens group data], a first surface (most object side surface) of each lens group and a focal length of each lens group are shown.

A table of [variable distance data] shows surface distances with surface numbers where the surface distances are set as "variable" in the table showing [lens data]. Here, surface distances in each zooming state of wide angle end (W), intermediate focal length (M) and telephoto end (T) upon focusing on infinity and focusing on a short-distance object are shown separately for a case of focusing on a normal distance (infinity) and for a case of focusing on a close range (short distance). Note that the first line shows an overall focal length f in each zooming state (upon focusing on a normal distance) or lateral magnification β (upon focusing on a close range). The final line shows a surface distance of a portion where the surface distance is set as "Bf."

A table of [magnification] shows the lateral magnification βF1 of the first focusing lens group and the lateral magnification βF2 of the second focusing lens group in each zooming state of wide angle end (W), intermediate focal length (M) and telephoto end (T) separately in cases of focusing on a normal distance and focusing on a close range. A table of [other specifications] shows a focal length (ff1) of the first focusing lens group and a focal length (ff2) of the second focusing lens group. The table further shows an amount of movement (MVF1) of the first focusing lens group and an amount of movement (MVF2) of the second focusing lens group upon focusing from an infinity object to a short-distance object (shortest-distance object) in a wide angle end state.

A table of [conditional expression corresponding values] is provided at the end of the description of all examples (first to fifth examples). The table shows values corresponding to the respective conditional expressions in a summarized manner for all examples (first to fifth examples).

Hereinafter, "mm" is generally used for all specification values, to indicate the described focal length f, radius of curvature R, surface distance D and other lengths unless otherwise specified, whereas even when the optical system is proportionally enlarged or proportionally contracted, the equivalent optical performance can be obtained, and so the specification values are not limited to this.

The description of the tables so far is common to all examples and duplicate description will be omitted hereinafter.

First Example

A first example will be described using FIG. 1 to FIGS. 3A-3C and Table 1. FIG. 1 is a diagram illustrating a lens configuration of a zoom optical system according to the first example. A zoom optical system ZL (1) according to the first example is constructed of a first lens group G1 having a negative refractive power, a second lens group G2 having a positive refractive power, an aperture stop S, a third lens group G3 having a positive refractive power, a fourth lens group G4 having a negative refractive power, a fifth lens group G5 having a positive refractive power and a sixth lens group G6 having a positive refractive power, disposed in order from an object side. Upon zooming from a wide angle end state (W) to a telephoto end state (T), the first to sixth lens groups G1 to G6 move in directions shown by arrows in FIG. 1 respectively, and a distance between the adjacent lens groups changes. A lens group consisting of the second to sixth lens groups G2 to G6 corresponds to the succeeding lens group GR. A sign (+) or (−) attached to each lens group symbol indicates a refractive power of each lens group, and the same will apply to all the following examples.

The first lens group G1 is constructed of a negative meniscus lens L11 having a convex surface facing an object side, a negative meniscus lens L12 having a convex surface facing the object side, a negative meniscus lens L13 having a convex surface facing the object side and a biconvex positive lens L14, disposed in order from the object side.

The negative meniscus lens L11 is a hybrid lens constructed with a resin layer L11b provided on a surface on an image side of a glass lens body L11a. A surface on the image side of the resin layer L11b is aspherical and the negative meniscus lens L11 is a composite type aspherical lens. In the [lens data] field which will be described later, a surface number 1 represents the surface on the object side of the lens body L11a, a surface number 2 represents the surface on the image side of the lens body L11a and the surface on the object side of the resin layer L11b (surface on which both lenses are cemented) and a surface number 3 represents the surface on the image side of the resin layer L11b.

The negative meniscus lens L12 is also a hybrid lens configured with a resin layer L12b provided on a surface on the object side of a glass lens body L12a. A surface on the object side of the resin layer L12b is aspherical and the negative meniscus lens L12 is also a composite type aspherical lens. In the [lens data] field which will be described later, a surface number 4 represents the surface on the object side of the resin layer L12b, a surface number 5 represents the surface on the image side of the resin layer L12b and a surface on the object side of the lens body L12a (surface on which both lenses are cemented), and a surface number 6 represents the surface on the image side of the lens body L12a.

The second lens group G2 is constructed of a cemented lens consisting of a positive meniscus lens L21 having a convex surface facing the object side and a negative meniscus lens L22 having a convex surface facing the object side, and a biconvex positive lens L23, disposed in order from the object side. The aperture stop S is provided in the vicinity of the image side of the second lens group G2 and moves together with the second lens group G2 upon zooming.

The third lens group G3 is constructed of a cemented lens consisting of a biconvex positive lens L31 and a negative meniscus lens L32 having a concave surface facing the object side.

The fourth lens group G4 is constructed of a biconcave negative lens L41.

The fifth lens group G5 is constructed of a positive meniscus lens L51 having a convex surface facing the object side.

The sixth lens group G6 is constructed of a positive meniscus lens L61 having a concave surface facing the object side and a cemented lens consisting of a negative meniscus lens L62 having a convex surface facing the object side and a biconvex positive lens L63. Note that a surface on the image side of the positive meniscus lens L61 is aspherical.

In the present example, the third lens group G3 constitutes a first focusing lens group and the fifth lens group G5 constitutes a second focusing lens group. The third lens group G3 moves toward the object side and the fifth lens group G5 moves toward the image side depending on a change from focusing on a long-distance object (infinity object) to focusing on a short-distance object.

The following Table 1 lists specification values of the zoom optical system according to the first example.

TABLE 1

[General Data]
Focal length (f) 10.3 (fw)-21.5 (ft)

|  | W | M | T |
|---|---|---|---|
| F.NO | 4.58461 | 4.97276 | 5.66887 |
| 2ω | 55.20233 | 47.83147 | 32.93905 |
| Air Equivalent TL | 121.30256 | 111.17694 | 103.94431 |
| Air Equivalent BF | 22.07112 | 26.72635 | 37.73788 |

[Lens Data]

| Surface | R | D | nd | vd |
|---|---|---|---|---|
| 1 | 66.0078 | 2.40 | 1.77250 | 49.61 |
| 2 | 17.8896 | 0.20 | 1.56093 | 36.64 |
| *3 | 13.0203 | 10.39 | 1.00000 |  |
| *4 | 69.5573 | 0.20 | 1.55389 | 38.09 |
| 5 | 74.5519 | 1.50 | 1.77250 | 49.61 |
| 6 | 25.3147 | 4.66 | 1.00000 |  |
| 7 | 120.000 | 1.30 | 1.77250 | 49.61 |
| 8 | 31.6192 | 3.48 | 1.00000 |  |
| 9 | 32.2527 | 4.63 | 1.71736 | 29.58 |
| 10 | −749.923 | Variable | 1.00000 |  |
| 11 | 16.9525 | 2.04 | 1.72825 | 28.38 |
| 12 | 55.8636 | 0.80 | 1.91082 | 35.25 |
| 13 | 12.8077 | 1.51 | 1.00000 |  |
| 14 | 14.4747 | 2.31 | 1.51680 | 63.88 |
| 15 | −90.0426 | 1.86 | 1.00000 |  |
| 16 | 0 | Variable | 1.00000 | Aperture Stop S |
| 17 | 23.0619 | 2.94 | 1.53172 | 48.78 |
| 18 | −15.5169 | 0.90 | 1.90366 | 31.27 |
| 19 | −26.4746 | Variable | 1.00000 |  |
| 20 | −831.453 | 0.80 | 1.91082 | 35.25 |
| 21 | 25.1602 | Variable | 1.00000 |  |
| 22 | 16.4236 | 1.61 | 1.51680 | 63.88 |
| 23 | 30.0899 | Variable | 1.00000 |  |
| 24 | −59.9852 | 1.35 | 1.53110 | 55.91 |
| *25 | −33.4579 | 0.50 | 1.00000 |  |
| 26 | 78.9399 | 0.80 | 1.91082 | 35.25 |
| 27 | 19.5552 | 4.48 | 1.48749 | 70.24 |
| 28 | −44.7036 | Variable | 1.00000 |  |
| 29 | 0 | 2.00 | 1.51680 | 63.88 |
| 30 | 0 | Bf | 1.00000 |  |
| Image Surface (I) | ∞ |  |  |  |

[Aspheriacal Surface Data]

3rd Surface
κ = 0.0944

| A4 = −9.40E−06 | A6 = −1.18E−08 | A8 = 3.95E−11 | A10 = 5.57E−13 |

4th Surface
κ = −25.413

| A4 = −4.18E−06 | A6 = 2.67E−08 | A8 = 1.51E−10 | A10 = −2.82E−13 |

25th Surface
κ = 1.00

| A4 = 6.81E−05 | A6 = 4.87E−07 | A8 = −4.55E−09 | A10 = 5.03E−11 |

[Lens Group Data]

| Group | First surface | Focal length |
|---|---|---|
| G1 | 1 | −18.7654 |
| G2 | 11 | 51.03682 |

TABLE 1-continued

| | | | |
|---|---|---|---|
| G3 | 17 | | 30.51806 |
| G4 | 20 | | −26.8004 |
| G5 | 22 | | 67.26356 |
| G6 | 24 | | 123.1616 |

[Variable Distance Data]

| | W | M | T | W Close range | M Close range | T Close range |
|---|---|---|---|---|---|---|
| f(β) | 10.30 | 13.01 | 21.50 | −0.08318 | −0.14416 | −0.19832 |
| d10 | 32.8753 | 20.3228 | 2.00000 | 32.8753 | 20.3228 | 2.00000 |
| d16 | 5.0342 | 3.80869 | 2.76786 | 4.55905 | 3.16979 | 1.63154 |
| d19 | 1.49446 | 1.80677 | 3.48694 | 1.96961 | 2.44567 | 4.62326 |
| d21 | 0.69387 | 0.29529 | 2.00441 | 1.77009 | 1.77881 | 4.32648 |
| d23 | 8.45918 | 7.54262 | 5.2728 | 7.38297 | 6.0591 | 2.95073 |
| d28 | 20.65256 | 25.30779 | 36.31931 | 20.65256 | 25.30779 | 36.31931 |
| Bf | 0.1 | 0.1 | 0.1 | 0.1 | 0.1 | 0.1 |

[Magnification]

| | W | M | T | W Close range | M Close range | T Close range |
|---|---|---|---|---|---|---|
| βF1 | 0.18476 | 0.12404 | −0.04382 | 0.17725 | 0.11351 | −0.0685 |
| βF2 | 0.37405 | 0.2813 | 0.0176 | 0.39005 | 0.30335 | 0.05212 |

[Other specifications]

| | |
|---|---|
| ff1 | 30.518 |
| ff2 | 67.264 |
| MVF1w | −0.475 |
| MVF2w | 1.07621 |

Figure 3A:
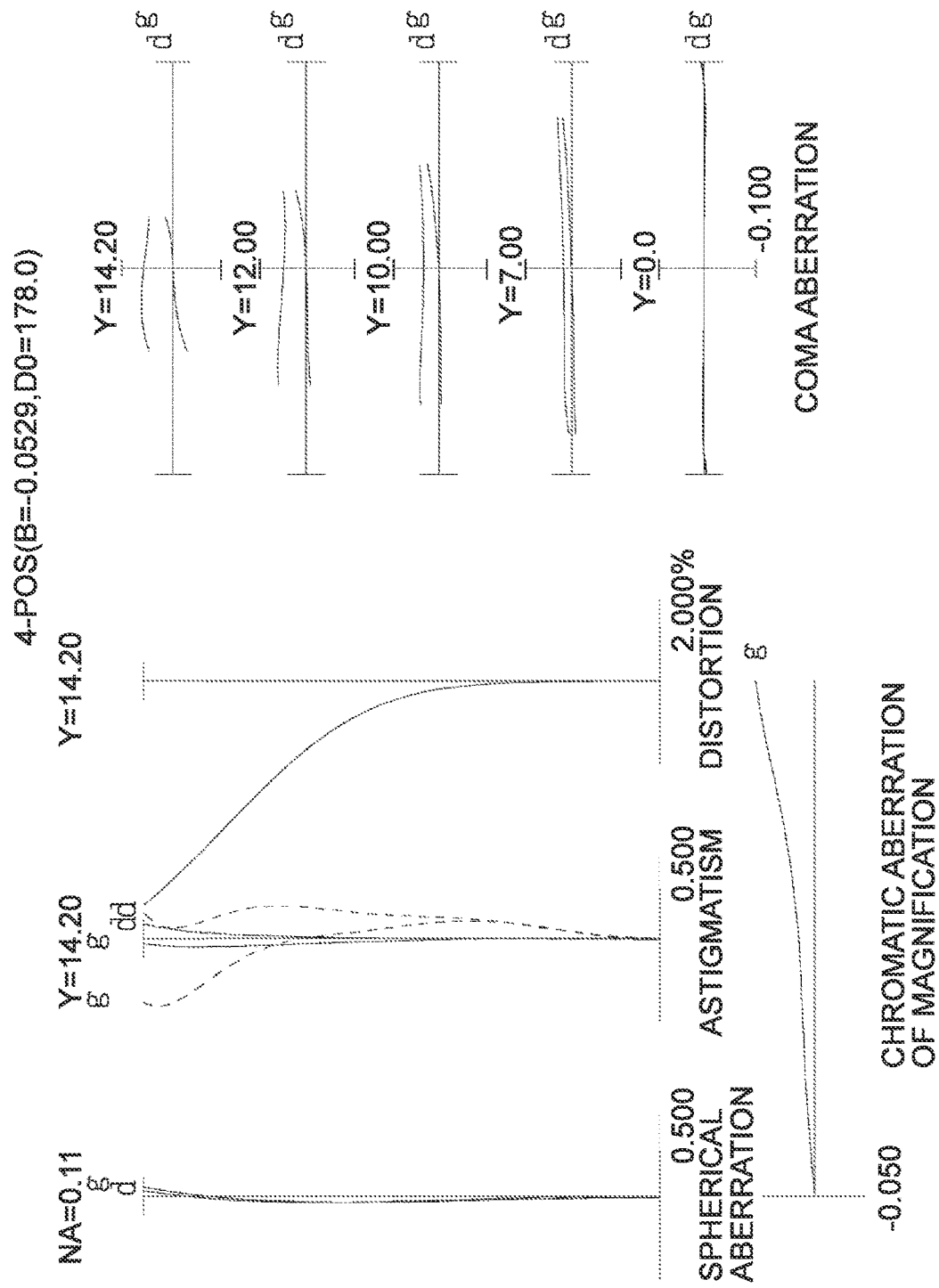
FIG. 3A, FIG. 3B, and FIG. 3C are various aberration diagrams upon focusing on a short-distance object in a wide angle end state, an intermediate focal length state and a telephoto end state respectively of the zoom optical system according to the first example.
Figure 3B:
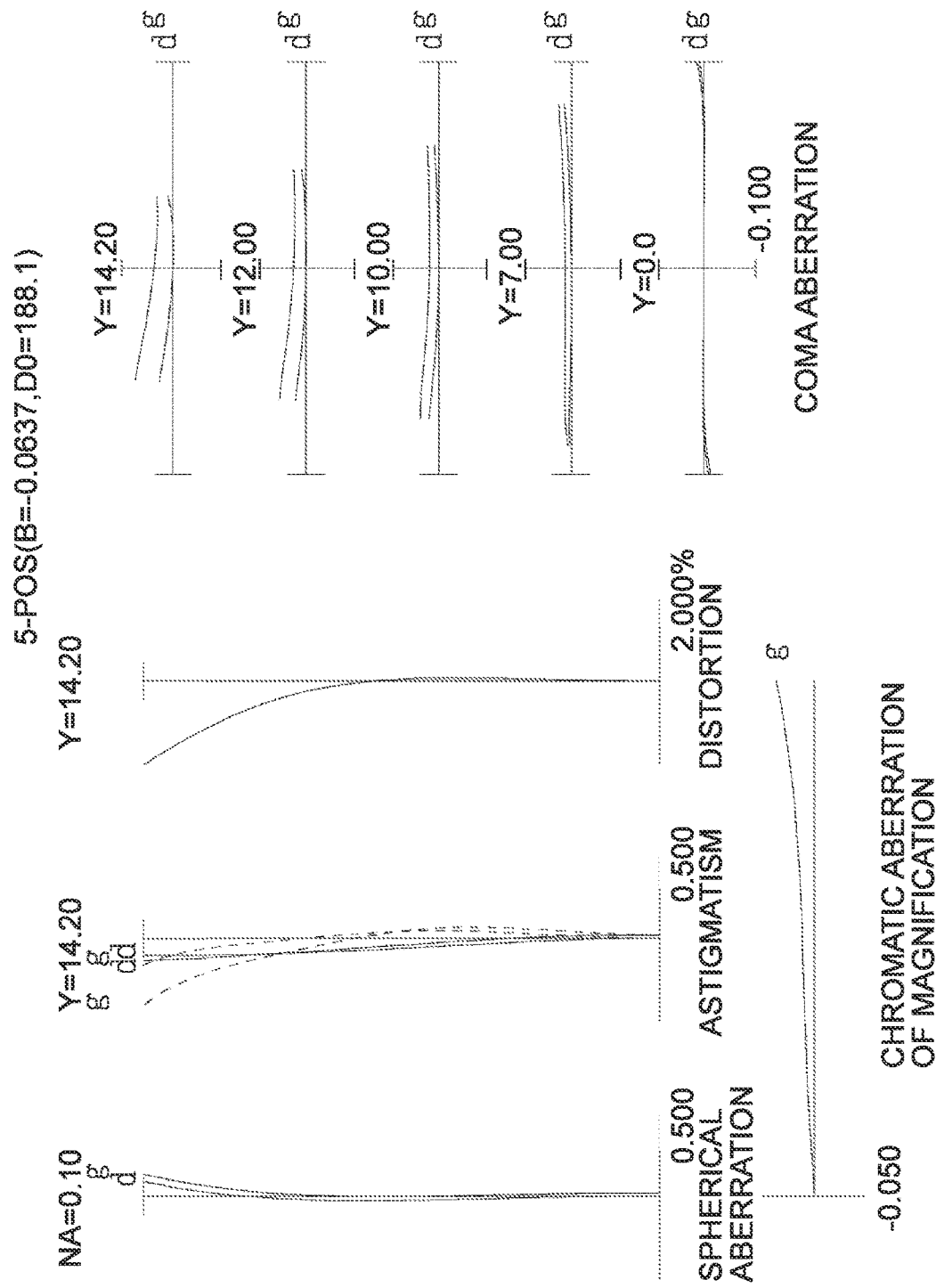
Figure 3C:
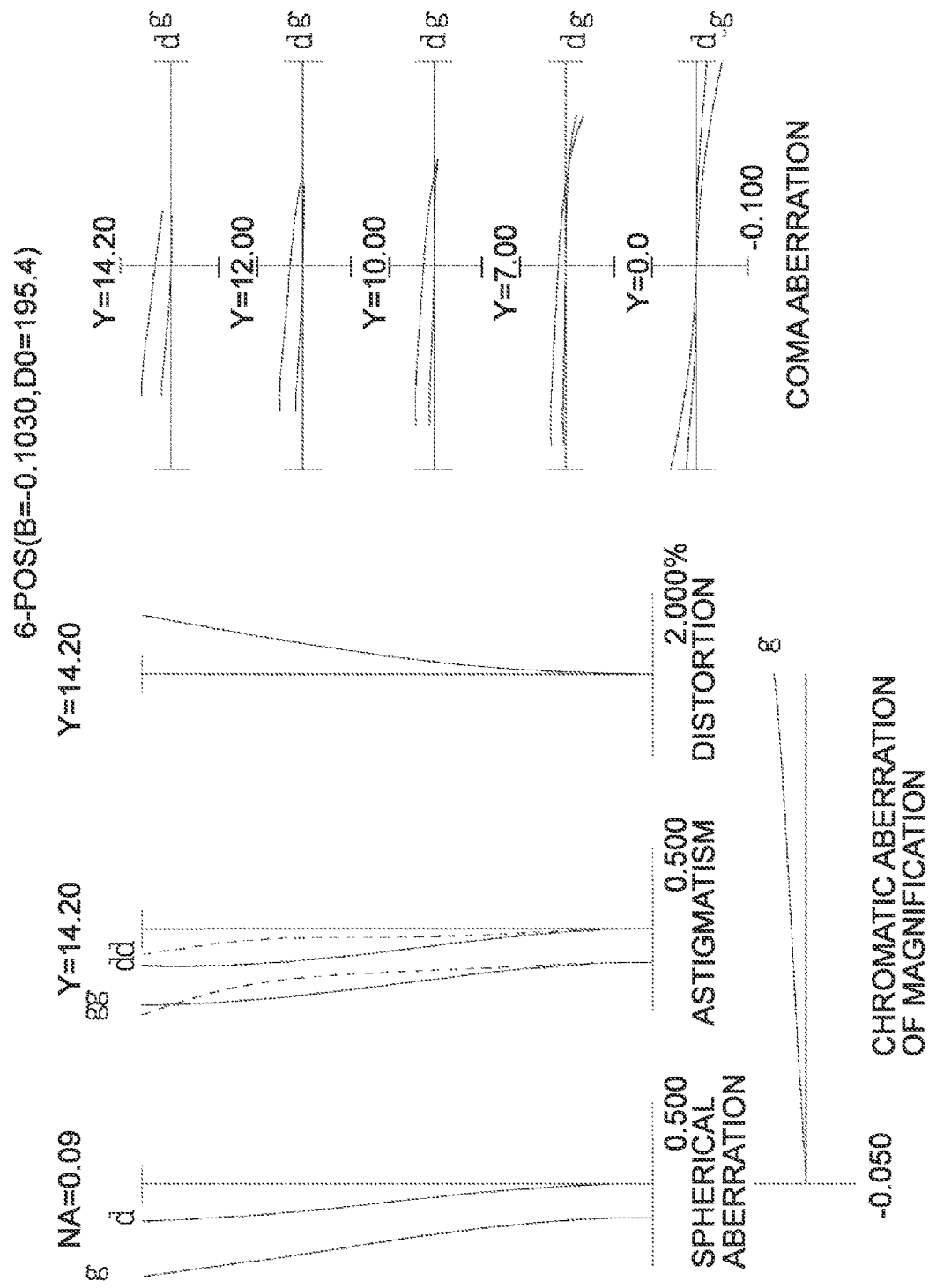

FIGS. 2A, 2B and 2C are various aberration diagrams upon focusing on infinity in a wide angle end state, an intermediate focal length state and a telephoto end state respectively of the zoom optical system according to the first example. FIGS. 3A, 3B and 3C are various aberration diagrams upon focusing on a short-distance object in a wide angle end state, an intermediate focal length state and a telephoto end state respectively of the zoom optical system according to the first example.

In the respective aberration diagrams in FIGS. 2A to 2C, "FNO" represents an F number and "Y" represents an image height. Each spherical aberration diagram shows a value of the F number corresponding to a maximum aperture, and each astigmatism diagram and each distortion diagram show a maximum value of the image height, each lateral aberration diagram shows a value of each image height. In the respective aberration diagrams in FIGS. 3A to 3C, "NA" represents a numerical aperture and "Y" represents an image height. The spherical aberration diagram shows a value of the numerical aperture corresponding to the maximum aperture and the astigmatism diagram and the distortion diagram show a maximum value of the image height and the coma aberration diagram shows a value of each image height. In each aberration diagram, "d" represents a d-line (wavelength λ=587.6 nm) and "g" represents a g-line (wavelength λ=435.8 nm). In the astigmatism diagram, a solid line represents a sagittal image surface and a broken line represents a meridional image surface. Note that in the aberration diagrams shown in the following examples, reference characters similar to those of the present example will be used and duplicated description thereof will be omitted.

From each aberration diagram, it can be seen that the zoom optical system according to the first example has excellent image forming performance by satisfactorily correcting various aberrations from a wide angle end state to a telephoto end state, and further has excellent image forming performance upon focusing on a short-distance object as well.

Second Example

A second example will be described using FIG. 4 to FIGS. 6A-6C and Table 2. FIG. 4 is a diagram illustrating a lens configuration of a zoom optical system according to the second example. A zoom optical system ZL (2) according to the second example is constructed of a first lens group G1 having a negative refractive power and a second lens group G2 having a positive refractive power, an aperture stop S, a third lens group G3 having a positive refractive power, a fourth lens group G4 having a negative refractive power, a fifth lens group G5 having a positive refractive power and a sixth lens group G6 having a positive refractive power, disposed in order from an object side. Upon zooming from a wide angle end state (W) to a telephoto end state (T), the first to sixth lens groups G1 to G6 move in directions shown by arrows in FIG. 4 respectively and a distance between the adjacent lens groups changes. A lens group consisting of the second to sixth lens groups G2 to G6 corresponds to the succeeding lens group GR.

The first lens group G1 is constructed of a negative meniscus lens L11 having a convex surface facing the object side, a negative meniscus lens L12 having a convex surface facing the object side, a negative meniscus lens L13 having a convex surface facing the object side and a biconvex positive lens L14, disposed in order from the object side.

The negative meniscus lens L11 is a hybrid lens constructed with a resin layer L11b provided on a surface on the image side of a glass lens body L11a. A surface on the image side of a resin layer L11b is aspherical and the negative meniscus lens L11 is a composite type aspherical lens. In the [lens data] field which will be described later, a surface number 1 represents the surface on the object side of the lens body L1la, a surface number 2 represents the surface on the image side of the lens body L11a and the surface on the object side of the resin layer L11b (surface on which both lenses are cemented) and a surface number 3 represents the surface on the image side of the resin layer L11b.

The negative meniscus lens L12 is also a hybrid lens constructed with a resin layer L12b provided on a surface of the object side of a glass lens body L12a. A surface on the object side of the resin layer L12b is aspherical and the negative meniscus lens L12 is also a composite type aspherical lens. In the [lens data] field which will be described later, a surface number 4 represents the surface on the object side of the resin layer L12b, a surface number 5 represents the surface on the image side of the resin layer L12b and a surface on the object side of the lens body L12a (surface on which both lenses are cemented) and a surface number 6 represents the surface on the image side of the lens body L12a.

The second lens group G2 is constructed of a cemented lens consisting of a biconvex positive lens L21 and a biconcave negative lens L22, and a biconvex positive lens L23, disposed in order from the object side. The aperture stop S is provided in the vicinity on the image side of the second lens group G2 and moves together with the second lens group G2 upon zooming.

The third lens group G3 is constructed of a cemented lens consisting of a biconvex positive lens L31 and a negative meniscus lens L32 having a concave surface facing the object side.

The fourth lens group G4 is constructed of a biconcave negative lens L41.

The fifth lens group G5 is constructed of a positive meniscus lens L51 having a convex surface facing the object side.

The sixth lens group G6 is constructed of a positive meniscus lens L61 having a concave surface facing the object side and a cemented lens consisting of a negative meniscus lens L62 having a convex surface facing the object side and a biconvex positive lens L63. Note that a surface on the image side of the positive meniscus lens L61 is aspherical.

In the present example, the third lens group G3 constitutes a first focusing lens group and the fifth lens group G5 constitutes a second focusing lens group. Depending on a change from focusing on a long-distance object (infinity object) to focusing on a short-distance object, the third lens group G3 moves toward the object side and the fifth lens group G5 moves toward the image side.

The following Table 2 lists specification values of the zoom optical system according to the second example.

TABLE 2

| [General Data] Focal length (f) 10.3 (fw)-19.32 (ft) | | | |
|---|---|---|---|
| | W | M | T |
| F.NO | 4.6301 | 5.23998 | 5.83553 |
| 2ω | 56.39754 | 44.87543 | 37.36057 |
| Air Equivalent TL | 125.91266 | 113.62769 | 107.76397 |
| Air Equivalent BF | 20.44108 | 26.46282 | 35.19053 |

| [Lens Data] | | | | |
|---|---|---|---|---|
| Surface | R | D | nd | vd |
| 1 | 66.922 | 2.40 | 1.77250 | 49.61 |
| 2 | 17.7951 | 0.20 | 1.56093 | 36.64 |
| *3 | 13.0065 | 10.96 | 1.00000 | |
| *4 | 44.9602 | 0.20 | 1.55389 | 38.09 |
| 5 | 46.0476 | 1.50 | 1.77250 | 49.61 |
| 6 | 20.8512 | 5.49 | 1.00000 | |
| 7 | 120.000 | 1.30 | 1.77250 | 49.61 |
| 8 | 36.1878 | 5.92 | 1.00000 | |
| 9 | 37.0286 | 3.92 | 1.71736 | 29.58 |
| 10 | −749.889 | Variable | 1.00000 | |
| 11 | 51.0535 | 2.05 | 1.72825 | 28.38 |
| 12 | −32.8904 | 0.80 | 1.91082 | 35.25 |
| 13 | 40.7464 | 1.22 | 1.00000 | |
| 14 | 22.0824 | 2.28 | 1.51680 | 63.88 |
| 15 | −35.2067 | 1.63 | 1.00000 | |
| 16 | 0 | Variable | 1.00000 | Aperture Stop S |
| 17 | 28.7991 | 2.69 | 1.53172 | 48.78 |
| 18 | −15.1315 | 0.90 | 1.90366 | 31.27 |
| 19 | −34.7347 | Variable | 1.00000 | |
| 20 | −79.1048 | 0.80 | 1.91082 | 35.25 |
| 21 | 55.1803 | Variable | 1.00000 | |
| 22 | 18.6322 | 1.56 | 1.51680 | 63.88 |
| 23 | 31.533 | Variable | 1.00000 | |
| 24 | −60.0021 | 1.43 | 1.53110 | 55.91 |
| *25 | −33.4796 | 0.50 | 1.00000 | |

TABLE 2-continued

| 26 | 49.3873 | 0.80 | 1.91082 | 35.25 |
|---|---|---|---|---|
| 27 | 15.8208 | 5.23 | 1.48749 | 70.24 |
| 28 | −53.1349 | Variable | 1.00000 | |
| 29 | 0 | 2.00 | 1.51680 | 63.88 |
| 30 | 0 | Bf | 1.00000 | |
| Image Surface (I) | ∞ | | | |

[Aspheriacal Surface Data]

3rd Surface
κ = 0.1002

| A4 = −9.02E−06 | A6 = −1.45E−08 | A8 = 8.99E−11 | A10 = 4.58E−13 |
|---|---|---|---|

4th Surface
κ = −4.6078

| A4 = −6.39E−06 | A6 = 4.84E−08 | A8 = 1.53E−10 | A10 = −2.96E−13 |
|---|---|---|---|

25th Surface
κ = 1.0000

| A4 = 4.61E−05 | A6 = 2.921E−07 | A8 = −3.00E−09 | A10 = 2.17E−11 |
|---|---|---|---|

[Lens Group Data]

| Group | First surface | Focal length |
|---|---|---|
| G1 | 1 | −20.0295 |
| G2 | 11 | 40.65621 |
| G3 | 17 | 50.20726 |
| G4 | 20 | −35.5873 |
| G5 | 22 | 84.63536 |
| G6 | 24 | 121.5811 |

[Variable Distance Data]

| | W | M | T | W Close range | M Close range | T Close range |
|---|---|---|---|---|---|---|
| f(β) | 10.29984 | 12.99976 | 19.31945 | −0.05582 | −0.0664 | −0.0967 |
| d10 | 32.5917 | 18.1044 | 2.00000 | 32.5917 | 18.1044 | 2.0000 |
| d16 | 2.94702 | 2.78457 | 4.11328 | 2.3937 | 2.02381 | 2.79333 |
| d19 | 1.5000 | 1.54877 | 2.3198 | 2.05332 | 2.30953 | 3.63975 |
| d21 | 3.20723 | 1.00000 | 1.50000 | 3.95327 | 1.98746 | 3.21594 |
| d23 | 11.4491 | 9.9506 | 8.86383 | 10.70306 | 8.96314 | 7.14789 |
| d28 | 19.02252 | 25.04425 | 33.77196 | 19.03768 | 25.06574 | 33.81755 |
| Bf | 0.1 | 0.1 | 0.1 | 0.1 | 0.1 | 0.1 |

[Magnification]

| | W | M | T | W Close range | M Close range | T Close range |
|---|---|---|---|---|---|---|
| βF1 | 0.42189 | 0.37491 | 0.28287 | 0.41447 | 0.36447 | 0.26369 |
| βF2 | 0.48041 | 0.38803 | 0.21395 | 0.48897 | 0.39928 | 0.23315 |

[Other specifications]

| ff1 | 50.207 |
|---|---|
| ff2 | 84.635 |
| MVF1w | −0.568 |
| MVF2w | 0.73087 |

Figure 5A:
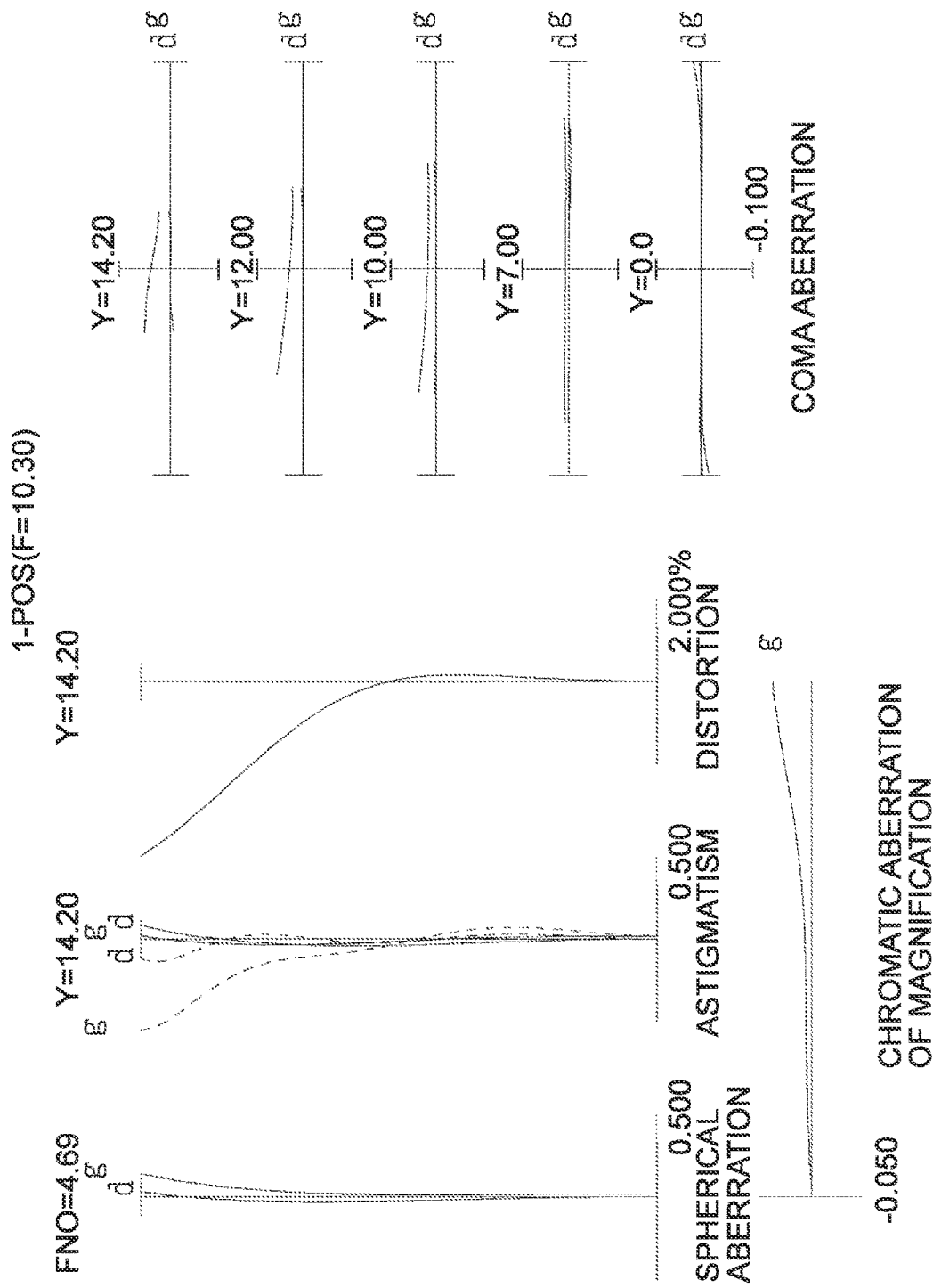
Figure 5C:
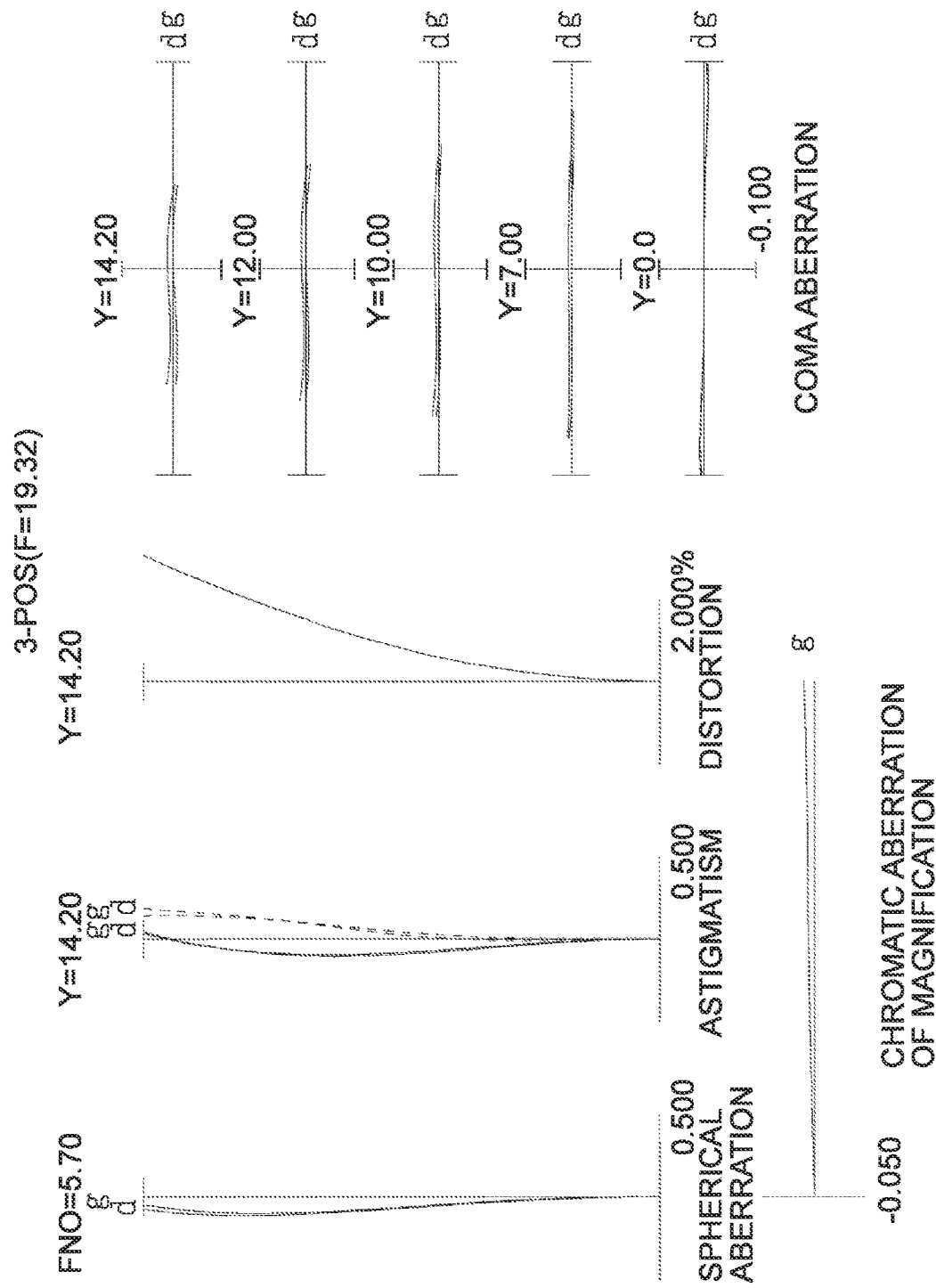
Figure 6B:
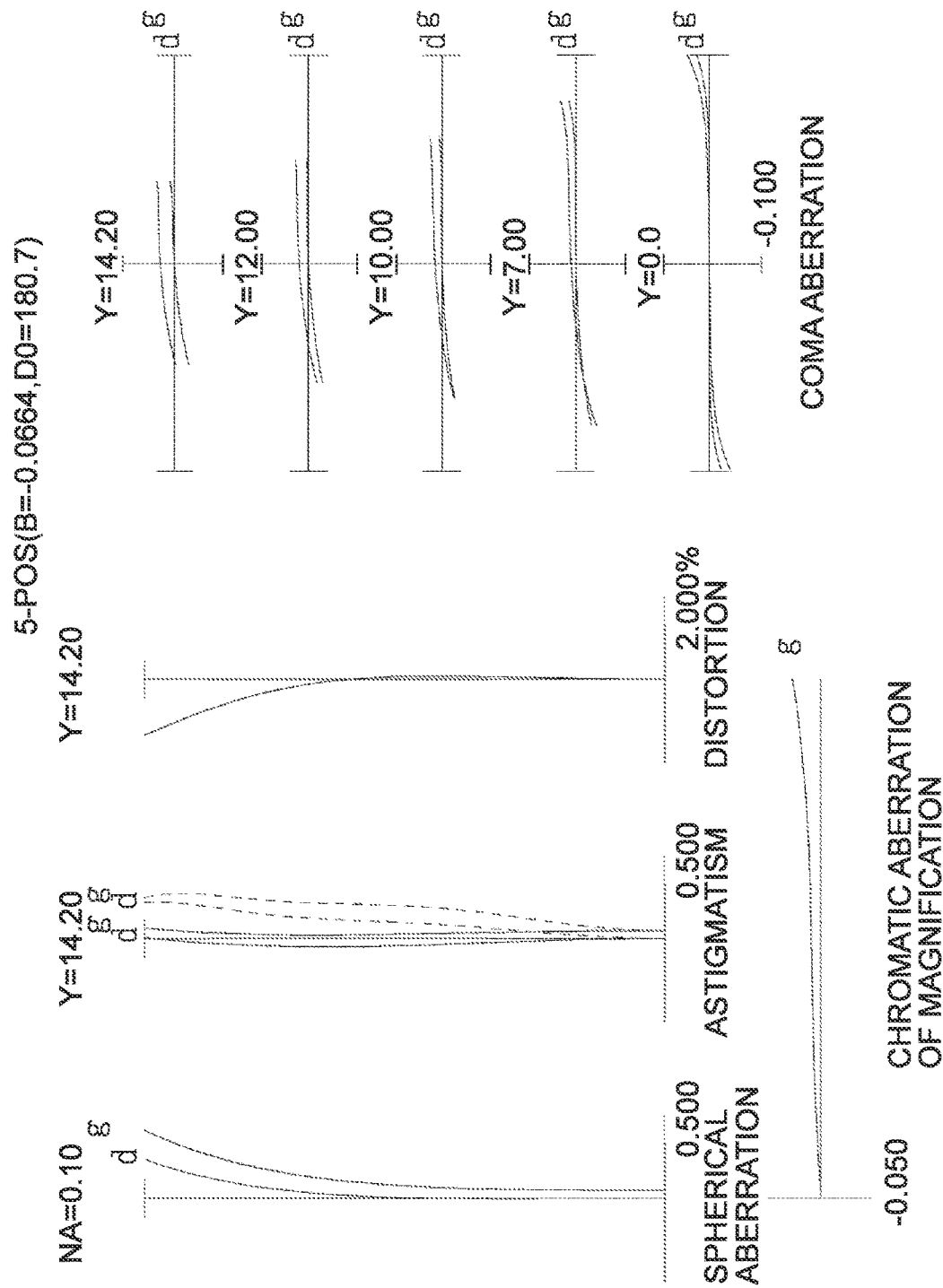
Figure 6C:
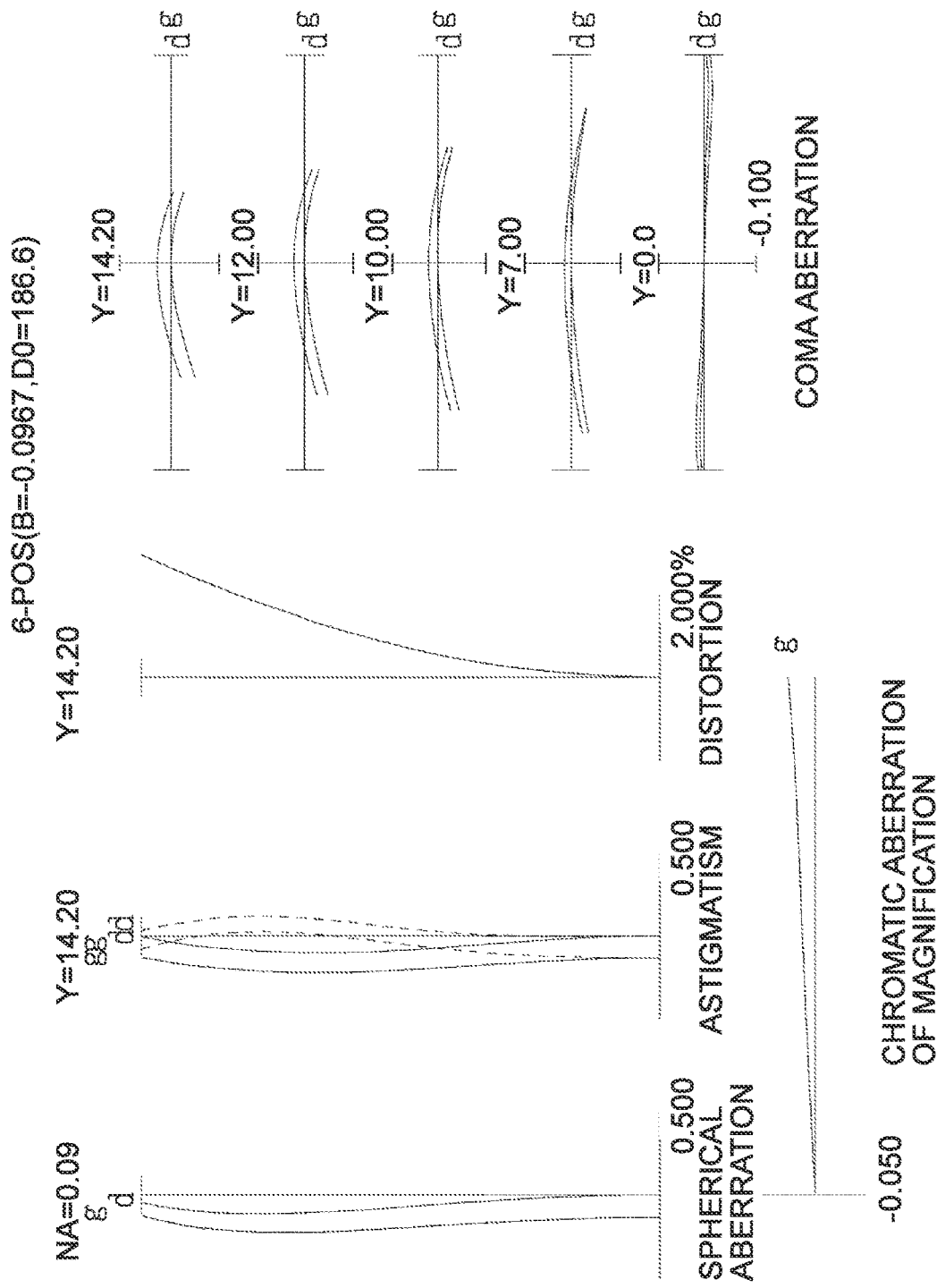

FIG. 5A, FIG. 5B and FIG. 5C are various aberration diagrams upon focusing on infinity in a wide angle end state, an intermediate focal length state and a telephoto end state respectively of the zoom optical system according to the second example. FIG. 6A, FIG. 6B, and FIG. 6C are various aberration diagrams upon focusing on a short-distance object in a wide angle end state, an intermediate focal length state and a telephoto end state respectively of the zoom optical system according to the second example. From each aberration diagram, it can be seen that the zoom optical system according to the second example has excellent image forming performance by satisfactorily correcting various aberrations from a wide angle end state to a telephoto end state, and further has excellent image forming performance upon focusing on a short-distance object as well.

Third Example

Figure 7:
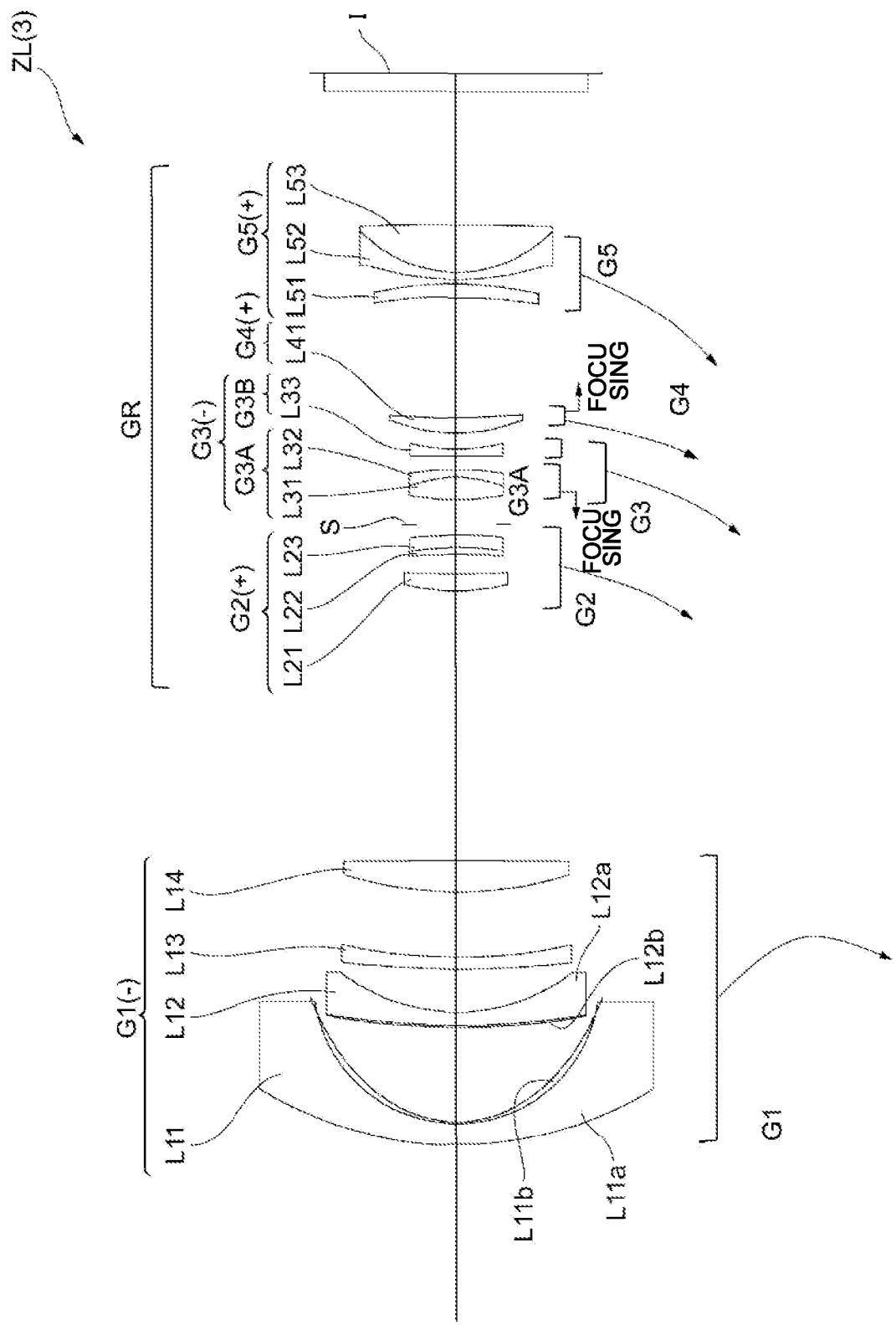
FIG. 7 is a diagram illustrating a lens configuration of a zoom optical system according to a third example.

A third example will be described using FIG. 7 to FIGS. 9A-9C and Table 3. FIG. 7 is a diagram illustrating a lens configuration of a zoom optical system according to the third example. A zoom optical system ZL (3) according to the third example is constructed of a first lens group G1 having a negative refractive power, a second lens group G2 having a positive refractive power, an aperture stop S, a third lens group G3 having a negative refractive power, a fourth lens group G4 having a positive refractive power and a fifth lens group G5 having a positive refractive power, disposed in order from an object side. Upon zooming from a wide angle end state (W) to a telephoto end state (T), the first to fifth lens groups G1 to G5 move in directions shown by arrows in FIG. 7 respectively and a distance between the adjacent lens groups changes. A lens group consisting of the second to fifth lens groups G2 to G5 corresponds to the succeeding lens group GR.

The first lens group G1 is constructed of a negative meniscus lens L11 having a convex surface facing the object side, a negative meniscus lens L12 having a convex surface facing the object side, a negative meniscus lens L13 having a convex surface facing the object side and a biconvex positive lens L14, disposed in order from the object side.

The negative meniscus lens L11 is a hybrid lens constructed with a resin layer L11*b* provided on a surface on an image side of a glass lens body L11*a*. A surface on the image side of the resin layer L11*b* is aspherical and the negative meniscus lens L11 is a composite type aspherical lens. In the [lens data] field which will be described later, a surface number 1 represents the surface on the object side of the lens body L11*a*, a surface number 2 represents the surface on the image side of the lens body L11*a* and the surface on the object side of a resin layer L11*b* (surface on which both lenses are cemented) and a surface number 3 represents the surface on the image side of the resin layer L11*b*.

The negative meniscus lens L12 is also a hybrid lens constructed with a resin layer L12*b* provided on the surface on the object side of a glass lens body L12*a*. A surface on the object side of the resin layer L12*b* is aspherical and the negative meniscus lens L12 is also a composite type aspherical lens. In the [lens data] field which will be described later, a surface number 4 represents the surface on the object side of the resin layer L12*ba*, a surface number 5 represents the surface on the image side of the resin layer L12*b* and a surface on the object side of the lens body L12*a* (surface on which both lenses are cemented) and a surface number 6 represents the surface on the image side of the lens body L12*a*.

The second lens group G2 is constructed of a positive meniscus lens L21 having a convex surface facing the object side and a cemented lens consisting of a positive meniscus lens L23 having a concave surface facing the object side and a negative meniscus lens L24 having a concave surface facing the object side, disposed in order from the object side. The aperture stop S is provided in the vicinity of an image side of the second lens group G2 and moves together with the second lens group G2 upon zooming.

The third lens group G3 is constructed of a cemented lens consisting of a biconvex positive lens L31 and a negative meniscus lens L32 having a concave surface facing the object side and a biconcave negative lens L33. In the third lens group G3, the cemented lens consisting of the positive lens L31 and the negative meniscus lens L32 constitutes a front-side lens group G3A and the negative lens L33 constitutes a rear-side lens group G3B. Furthermore, the front-side lens group G3A constitutes a first focusing lens group.

The fourth lens group G4 is constructed of a positive meniscus lens L41 having a convex surface facing the object side. The fourth lens group G4 constitutes a second focusing lens group.

The fifth lens group G5 is constructed of a positive meniscus lens L51 having a concave surface facing the object side, a negative meniscus lens L52 having a convex surface facing the object side and a biconvex positive lens L53. Note that a surface on the image side of the positive meniscus lens L51 is aspherical.

In the present example, part of the third lens group G3 on the image side (front-side lens group G3A) constitutes a first focusing lens group and the fourth lens group G4 constitutes a second focusing lens group. Part of the third lens group G3 on the image side (front-side lens group G3A) moves toward the object side and the fourth lens group G4 moves toward the image side depending on a change from focusing on a long-distance object (infinity object) to focusing on a short-distance object.

The following Table 3 lists specification values of the zoom optical system according to the third example.

TABLE 3

[General Data]
Focal length (f) 11.3 (fw)-19.3 (ft)

| | W | M | T |
|---|---|---|---|
| F.NO | 4.61296 | 5.00943 | 5.68446 |
| 2ω | 52.82737 | 44.07011 | 36.15833 |
| Air Equivalent TL | 120.87241 | 108.97567 | 108.40436 |
| Air Equivalent BF | 16.52159 | 24.01249 | 31.04985 |

[Lens Data]

| Surface | R | D | nd | vd |
|---|---|---|---|---|
| 1 | 42.2613 | 2.40 | 1.77250 | 49.61 |
| 2 | 16.1746 | 0.20 | 1.56093 | 36.64 |
| *3 | 13.0027 | 10.79 | 1.00000 | |
| *4 | 99.2765 | 0.20 | 1.55389 | 38.09 |
| 5 | 91.8259 | 1.50 | 1.77250 | 49.61 |
| 6 | 21.4633 | 4.89 | 1.00000 | |
| 7 | 120.000 | 1.30 | 1.77250 | 49.61 |
| 8 | 59.6747 | 7.41 | 1.00000 | |
| 9 | 43.1309 | 3.59 | 1.71736 | 29.58 |
| 10 | −750.0000 | Variable | 1.00000 | |
| 11 | 23.8089 | 1.88 | 1.51680 | 63.88 |
| 12 | 101.019 | 2.23 | 1.00000 | |
| 13 | −114.581 | 0.80 | 1.91082 | 35.25 |
| 14 | −40.4733 | 1.43 | 1.72825 | 28.38 |

TABLE 3-continued

| | | | | |
|---|---|---|---|---|
| 15 | −52.685 | 1.28 | 1.00000 | |
| 16 | 0 | Variable | 1.00000 | Aperture Stop S |
| 17 | 26.5144 | 2.55 | 1.53172 | 48.78 |
| 18 | −14.8795 | 0.90 | 1.90366 | 31.27 |
| 19 | −32.8111 | Variable | 1.00000 | |
| 20 | −1986.21 | 0.80 | 1.91082 | 35.25 |
| 21 | 21.4616 | Variable | 1.00000 | |
| 22 | 19.6202 | 1.79 | 1.51680 | 63.88 |
| 23 | 103.813 | Variable | 1.00000 | |
| 24 | −59.9998 | 1.56 | 1.53110 | 55.91 |
| *25 | −33.5052 | 0.50 | 1.00000 | |
| 26 | 34.3198 | 0.80 | 1.91082 | 35.25 |
| 27 | 15.1432 | 5.39 | 1.48749 | 70.24 |
| 28 | −259.404 | Variable | 1.00000 | |
| 29 | 0 | 2.00 | 1.51680 | 63.88 |
| 30 | 0 | Bf | 1.00000 | |
| Image Surface (I) | ∞ | | | |

[Aspheriacal Surface Data]

3rd Surface
$\kappa = 0.2869$

| | | | |
|---|---|---|---|
| A4 = 1.03E−05 | A6 = 2.72E−08 | A8 = −1.10E−10 | A10 = 8.60E−13 |

4th Surface
$\kappa = 12.1204$

| | | | |
|---|---|---|---|
| A4 = 1.25E−06 | A6 = −1.11E−08 | A8 = 1.38E−10 | A10 = −2.23E−13 |

25th Surface
$\kappa = 1.0000$

| | | | |
|---|---|---|---|
| A4 = 2.71E−05 | A6 = 7.25E−08 | A8 = −6.06E−10 | A10 = 6.36E−12 |

[Lens Group Data]

| Group | First surface | Focal length |
|---|---|---|
| G1 | 1 | −22.49113 |
| G2 | 11 | 38.13818 |
| G3 | 17 | −58.34838 |
| G4 | 22 | 46.47508 |
| G5 | 24 | 126.00073 |

[Variable Distance Data]

| | W | M | T | W Close range | M Close range | T Close range |
|---|---|---|---|---|---|---|
| f(β) | 11.2996 | 14.8995 | 19.3194 | −0.05898 | −0.07401 | −0.09672 |
| d10 | 30.4632 | 13.8849 | 2.0000 | 30.4632 | 13.8849 | 2.0000 |
| d16 | 2.76367 | 2.80224 | 4.56673 | 2.11089 | 2.09423 | 3.56283 |
| d19 | 1.5000 | 1.5000 | 1.5000 | 2.15278 | 2.20801 | 2.5039 |
| d21 | 1.80903 | 2.00882 | 6.09908 | 2.7882 | 2.78763 | 7.10298 |
| d23 | 13.6245 | 10.5768 | 8.99828 | 12.64533 | 9.79799 | 7.99438 |
| d28 | 15.10303 | 22.59384 | 29.63121 | 15.10303 | 22.59384 | 29.63121 |
| Bf | 0.1 | 0.10008 | 0.10008 | 0.1 | 0.10008 | 0.10008 |

[Magnification]

| | W | M | T | W Close range | M Close range | T Close range |
|---|---|---|---|---|---|---|
| βF1 | 0.43161 | 0.38253 | 0.32802 | 0.42303 | 0.37074 | 0.30964 |
| βF2 | 0.11541 | −0.06604 | −0.30118 | 0.13648 | −0.04929 | −0.27958 |

[Other specifications]

| | |
|---|---|
| ff1 | 44.31219 |
| ff2 | 46.47508 |
| MVF1w | −0.6528 |
| MVF2w | 0.97917 |

Figure 9B:
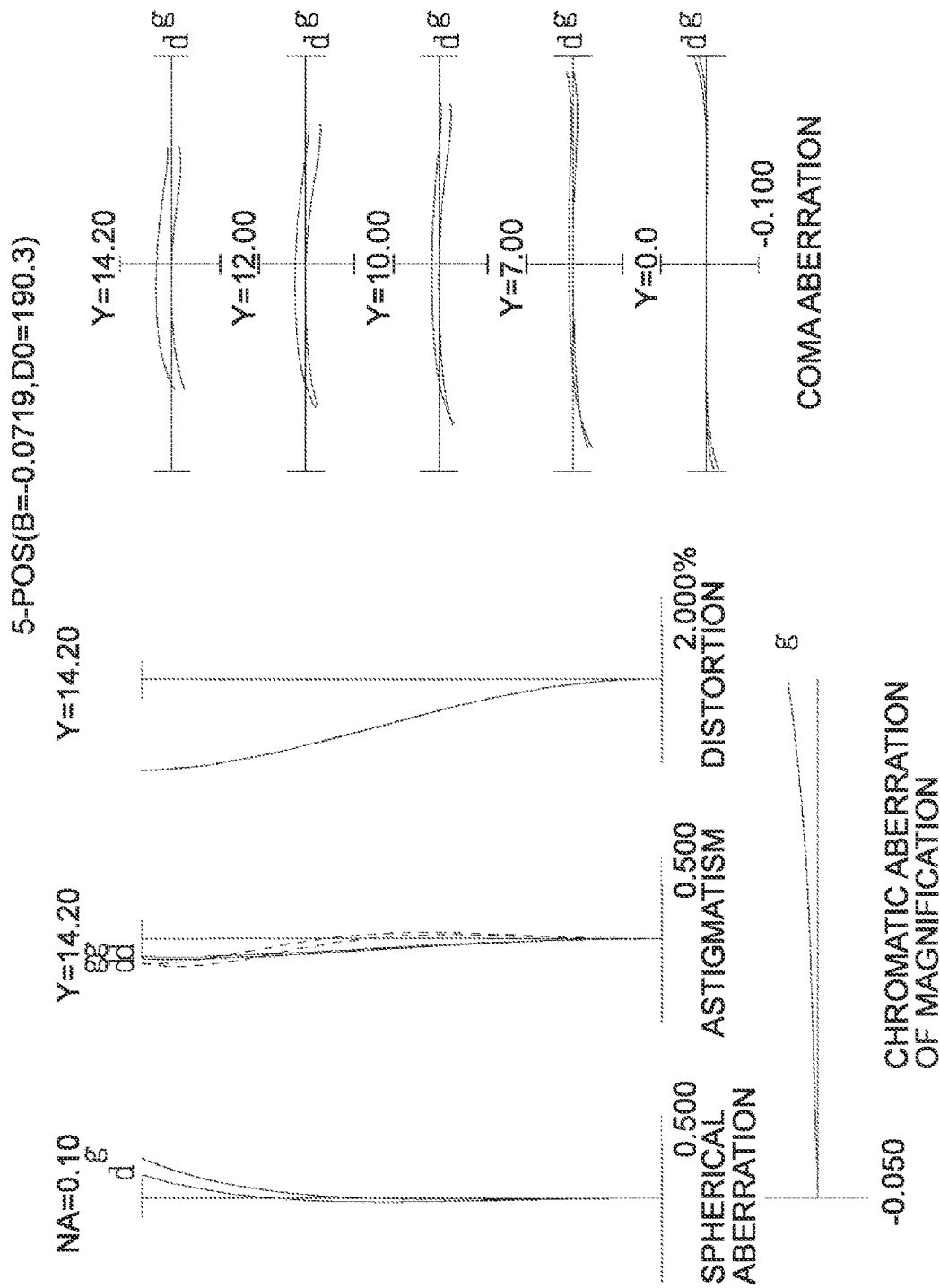
Figure 9C:
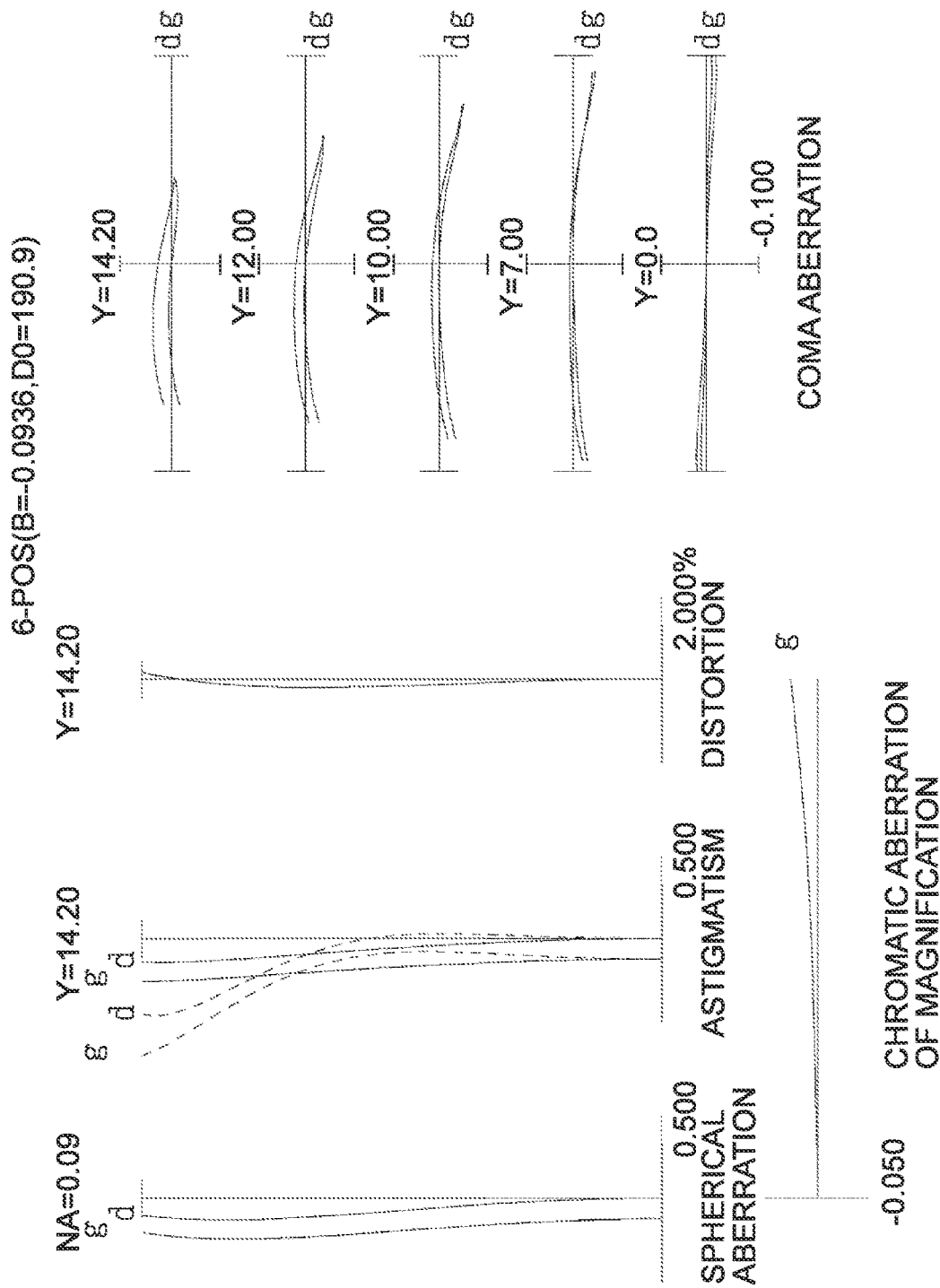

FIG. 8A, FIG. 8B, and FIG. 8C are various aberration diagrams upon focusing on infinity in a wide angle end state, an intermediate focal length state and a telephoto end state respectively of the zoom optical system according to the third example. FIG. 9A, FIG. 9B, and FIG. 9C are various aberration diagrams upon focusing on a short-distance object in a wide angle end state, an intermediate focal length state and a telephoto end state respectively of the zoom optical system according to the third example. From each aberration diagram, it can be seen that the zoom optical system according to the third example has excellent image forming performance by satisfactorily correcting various aberrations from a wide angle end state to a telephoto end state, and further has excellent image forming performance upon focusing on a short-distance object as well.

Fourth Example

Figure 10:
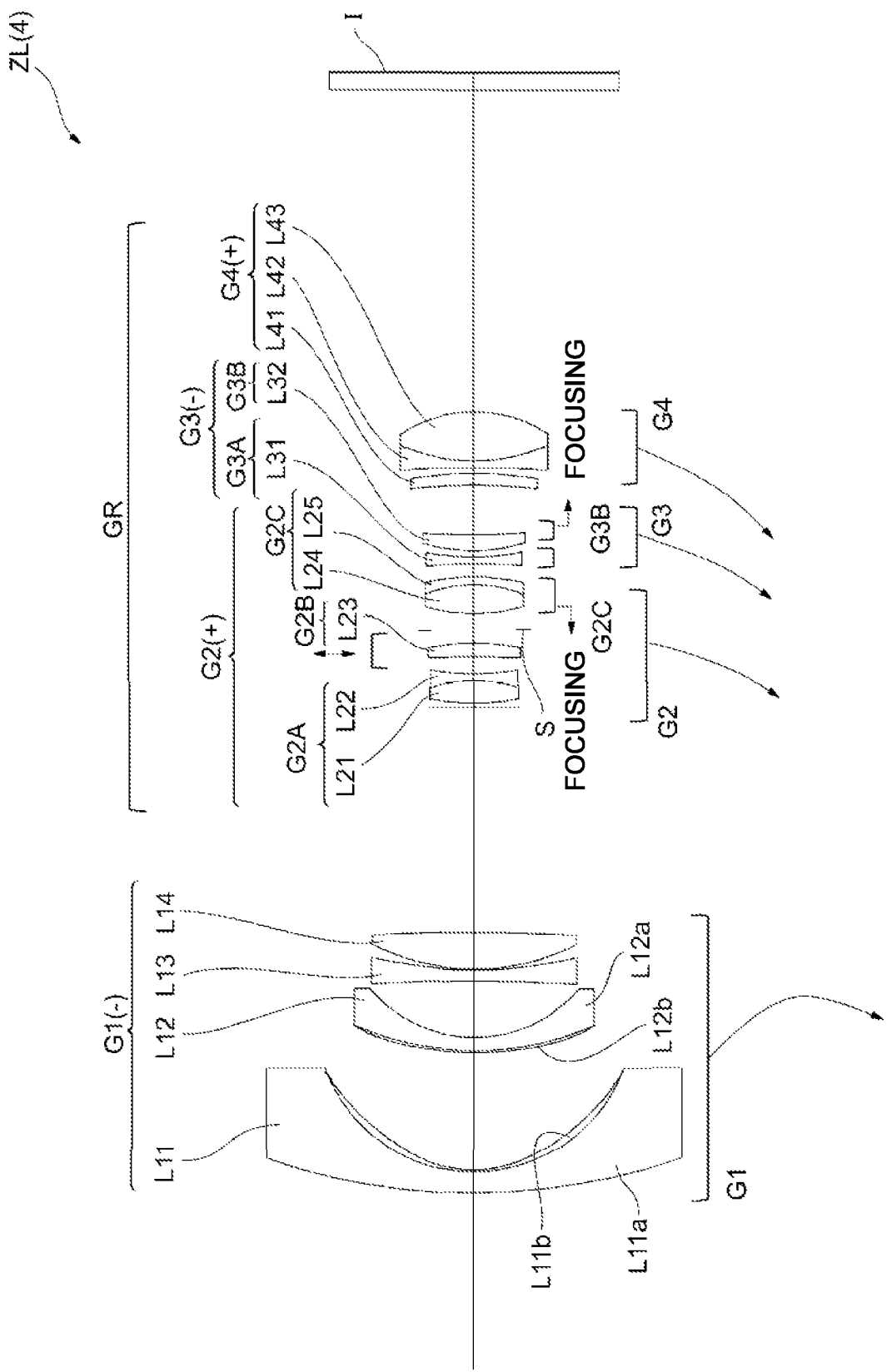
FIG. 10 is a diagram illustrating a lens configuration of a zoom optical system according to a fourth example.

A fourth example will be described using FIG. 10 to FIGS. 12A-12C and Table 4. FIG. 10 is a diagram illustrating a lens configuration of a zoom optical system according to the fourth example. A zoom optical system ZL (4) according to the fourth example is constructed of a first lens group G1 having a negative refractive power, a second lens group G2 having a positive refractive power with an aperture stop S in the middle, a third lens group G3 having a negative refractive power and a fourth lens group G4 having a positive refractive power, disposed in order from an object side. Upon zooming from a wide angle end state (W) to a telephoto end state (T), the first to fourth lens groups G1 to G4 move in directions shown by arrows in FIG. 10 and a distance between the adjacent lens groups changes. A lens group consisting of the second to fourth lens groups G2 to G4 corresponds to the succeeding lens group GR.

The first lens group G1 is constructed of a negative meniscus lens L11 having a convex surface facing the object side, a negative meniscus lens L12 having a convex surface facing the object side, a biconcave negative lens L13 and a biconvex positive lens L14, disposed in order from the object side.

The negative meniscus lens L11 is a hybrid lens constructed with a resin layer L11b provided on a surface on the image side of a glass lens body L11a. A surface on the image side of the resin layer L11b is aspherical and the negative meniscus lens L11 is a composite type aspherical lens. In the [lens data] field which will be described later, a surface number 1 represents the surface on the object side of the lens body L1la, a surface number 2 represents the surface on the image side of the lens body L11a and the surface on the object side of the resin layer L11b (surface on which both lenses are cemented), and a surface number 3 represents the surface on the image side of the resin layer L11b.

The negative meniscus lens L12 is also a hybrid lens constructed with a resin layer L12b provided on a surface on the object side of a glass lens body L12a. A surface on the object side of the resin layer L12b is aspherical, and the negative meniscus lens L12 is also a composite type aspherical lens. In the [lens data] field which will be described later, a surface number 4 represents the surface on the object side of the resin layer L12b, a surface number 5 represents the surface on the image side of the resin layer L12b and the surface on the object side of the lens body L12a (surface on which both lenses are cemented), and a surface number 6 represents the surface on the image side of the lens body L12a.

The second lens group G2 is constructed of a cemented lens consisting of a biconvex positive lens L21 and a biconcave negative lens L22, a positive meniscus lens L23 having a concave surface facing the object side, and a cemented lens consisting of a biconvex positive lens L24 and a negative meniscus lens L25 having a concave surface facing the object side, disposed in order from the object side. The aperture stop S is located between the positive meniscus lens L23 and the positive lens L24, provided inside the second lens group G2 and moves together with the second lens group G2 upon zooming. Note that as shown in FIG. 10, the second lens group G2 is constructed of a front-side lens group G2A (constructed of a cemented lens consisting of the positive lens L21 and the negative lens L22), an intermediate lens group G2B (constructed of the positive meniscus lens L23) and a rear-side lens group G2C (constructed of a cemented lens consisting of the positive lens L24 and the negative meniscus lens L25).

The third lens group G3 is constructed of a biconcave negative lens L31 and a positive meniscus lens L32 having a convex surface facing the object side. Note that as shown in FIG. 10, the third lens group G3 is constructed of a front-side lens group G3A (constructed of the negative lens L31) and a rear-side lens group G3B (constructed of the positive meniscus lens L32).

The fourth lens group G4 is constructed of a positive meniscus lens L41 having a concave surface facing the object side and a cemented lens consisting of a biconcave negative lens L42 and a biconvex positive lens L43. Note that a surface on the image side of the positive meniscus lens L41 is aspherical.

In the present example, the rear-side lens group G2C of the second lens group G2 constitutes a first focusing lens group, the rear-side lens group G3B of the third lens group G3 constitutes a second focusing lens group. Depending on a change from focusing on a long-distance object (infinity object) to focusing on a short-distance object, the first focusing lens group (rear-side lens group G2C) moves toward the object side and the second focusing lens group (rear-side lens group G3B) moves toward the image side.

The intermediate lens group G2B (positive meniscus lens L23) that constitutes the second lens group G2 is moved so as to have a component in a direction perpendicular to the optical axis, constituting a vibration-proof lens group that corrects image blur caused by camera shake or the like.

The following Table 4 lists specification values of the zoom optical system according to the fourth example.

TABLE 4

| [General Data] Focal length (f) 10.3 (fw)-19.4 (ft) | | | |
|---|---|---|---|
| | W | M | T |
| F.NO | 4.6301 | 5.23998 | 5.83553 |
| 2ω | 56.39754 | 44.87543 | 37.36057 |
| Air Equivalent TL | 127.19237 | 118.45802 | 118.27894 |
| Air Equivalent BF | 38.11835 | 45.70695 | 53.49651 |

TABLE 4-continued

[Lens Data]

| Surface | R | D | nd | νd |
|---|---|---|---|---|
| 1 | 72.1955 | 2.40 | 1.77250 | 49.62 |
| 2 | 18.1031 | 0.20 | 1.56093 | 36.64 |
| *3 | 12.8098 | 13.50 | 1.00000 | |
| *4 | 38.7281 | 0.20 | 1.55389 | 38.09 |
| 5 | 33.8000 | 1.50 | 1.80610 | 40.97 |
| 6 | 15.4815 | 6.41 | 1.00000 | |
| 7 | −213.939 | 1.30 | 1.69680 | 49.61 |
| 8 | 48.4224 | 0.10 | 1.00000 | |
| 9 | 25.7571 | 4.15 | 1.71736 | 29.57 |
| 10 | −228.544 | Variable | 1.00000 | |
| 11 | 25.4457 | 2.55 | 1.72825 | 28.38 |
| 12 | −15.8585 | 0.80 | 1.91082 | 35.25 |
| 13 | 28.6288 | 1.92 | 1.00000 | |
| 14 | −195.244 | 1.58 | 1.51680 | 63.88 |
| 15 | −24.949 | 1.45 | 1.00000 | |
| 16 | 0 | Variable | 1.00000 | Aperture Stop S |
| 17 | 21.5531 | 3.28 | 1.53172 | 48.78 |
| 18 | −15.0486 | 0.90 | 1.91082 | 35.25 |
| 19 | −23.5039 | Variable | 1.00000 | |
| 20 | −112.948 | 0.80 | 1.91082 | 35.25 |
| 21 | 28.2311 | Variable | 1.00000 | |
| 22 | 18.6211 | 1.83 | 1.51680 | 63.88 |
| 23 | 77.6694 | Variable | 1.00000 | |
| 24 | −59.8503 | 1.36 | 1.53110 | 55.91 |
| *25 | −34.4312 | 0.60 | 1.00000 | |
| 26 | −136.828 | 0.80 | 1.91082 | 35.25 |
| 27 | 21.0189 | 5.60 | 1.48749 | 70.31 |
| 28 | −15.2735 | Variable | 1.00000 | |
| 29 | 0 | 2.00 | 1.51680 | 63.88 |
| 30 | 0 | Bf | 1.00000 | |
| Image Surface (I) | ∞ | | | |

[Aspheriacal Surface Data]

3rd Surface
$\kappa = 0.0387$

| A4 = −1.01E−05 | A6 = −2.98E−08 | A8 = 1.59E−10 | A10 = 2.68E−13 |
|---|---|---|---|

4th Surface
$\kappa = 0.2082$

| A4 = −3.60E−06 | A6 = 8.87E−08 | A8 = 2.10E−10 | A10 = −2.30E−13 |
|---|---|---|---|

25th Surface
$\kappa = 1.0000$

| A4 = 5.63E−05 | A6 = 4.89E−08 | A8 = −2.05E−09 | A10 = 3.5E−11 |
|---|---|---|---|

[Lens Group Data]

| Group | First surface | Focal length |
|---|---|---|
| G1 | 1 | −16.3772 |
| G2 | 11 | 24.84907 |
| G3 | 20 | −56.2908 |
| G4 | 24 | 70.2103 |

[Variable Distance Data]

| | W | M | T | W Close range | M Close range | T Close range |
|---|---|---|---|---|---|---|
| f(β) | 10.31023 | 15.00257 | 19.4 | −0.05436 | −0.07709 | −0.10236 |
| d10 | 26.1646 | 9.84165 | 1.87301 | 26.1646 | 9.84165 | 1.87301 |
| d16 | 1.80195 | 1.80195 | 1.80195 | 1.32479 | 1.00051 | 0.20687 |
| d19 | 1.45964 | 2.6478 | 3.18161 | 1.9368 | 3.44925 | 4.77669 |
| d21 | 0.6974 | 0.6974 | 0.6974 | 1.89031 | 1.73928 | 1.97347 |
| d23 | 5.72006 | 4.5319 | 3.99809 | 4.52716 | 3.49002 | 2.72203 |
| d28 | 36.69978 | 44.28838 | 52.07794 | 36.69978 | 44.28838 | 52.07794 |
| Bf | 0.1 | 0.1 | 0.1 | 0.1 | 0.1 | 0.1 |

TABLE 4-continued

| [Magnification] | | | | | |
|---|---|---|---|---|---|
| W | M | T | W Close range | M Close range | T Close range |
| βF1 −0.29802 | −0.49787 | −0.68391 | −0.31172 | −0.53124 | −0.75951 |
| βF2 −0.67094 | −1.34785 | −2.55372 | −0.64551 | −1.32564 | −2.52651 |

| [Other specifications] | |
|---|---|
| ff1 | 26.66669 |
| ff2 | 46.89864 |
| MVF1w | −0.477 |
| MVF2w | 1.1929 |

Figure 11A:
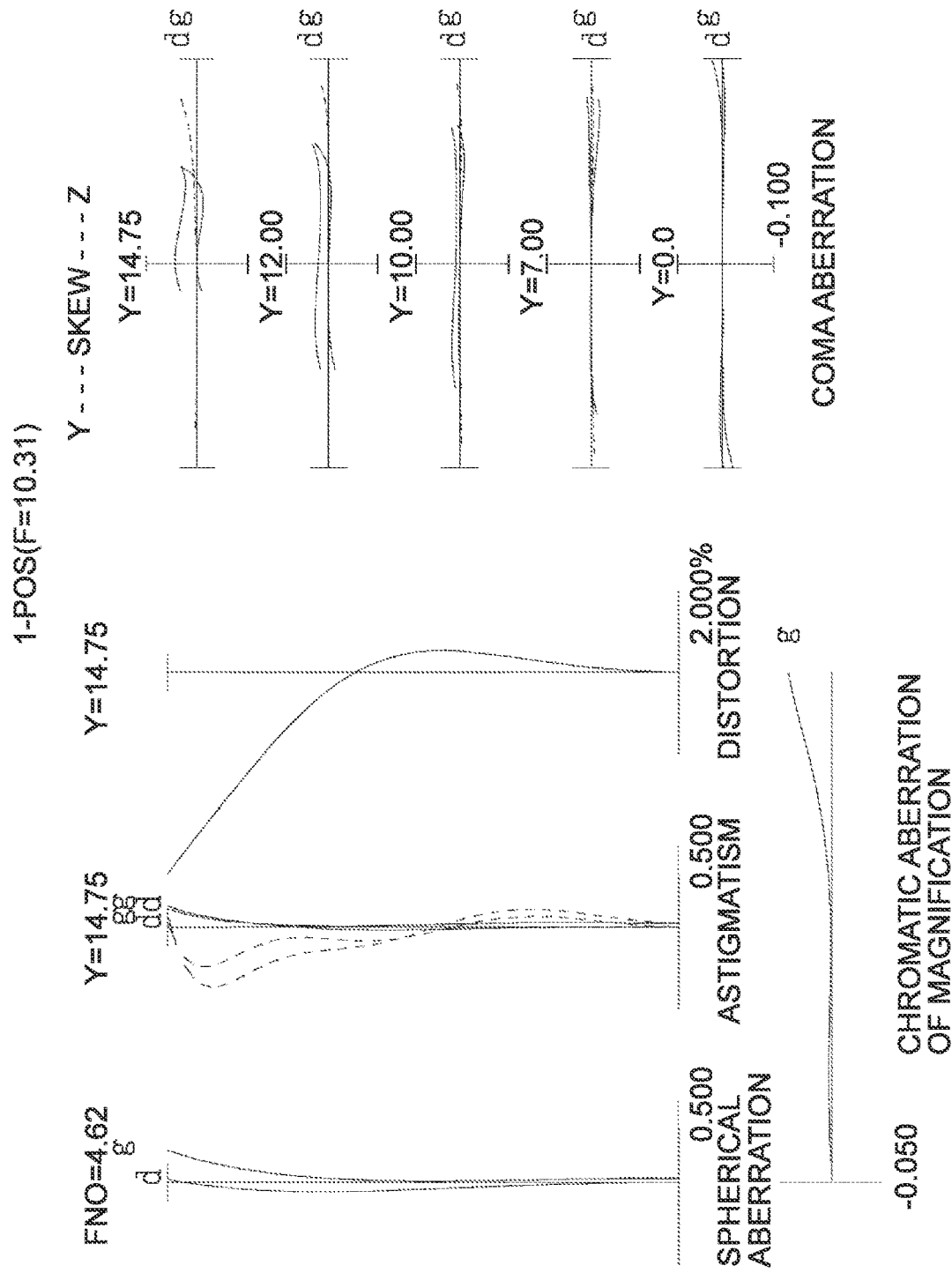
Figure 11B:
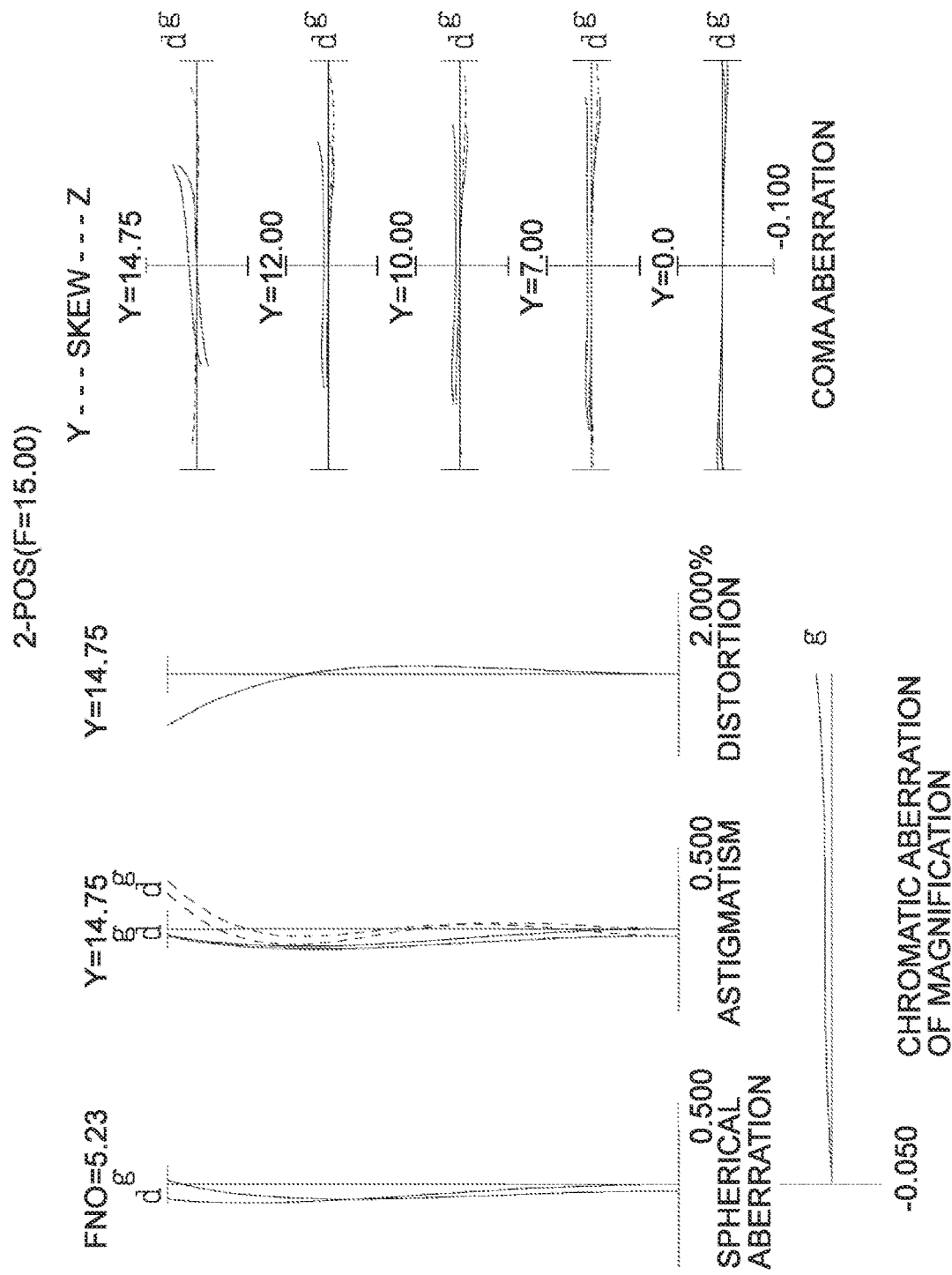
Figure 12A:
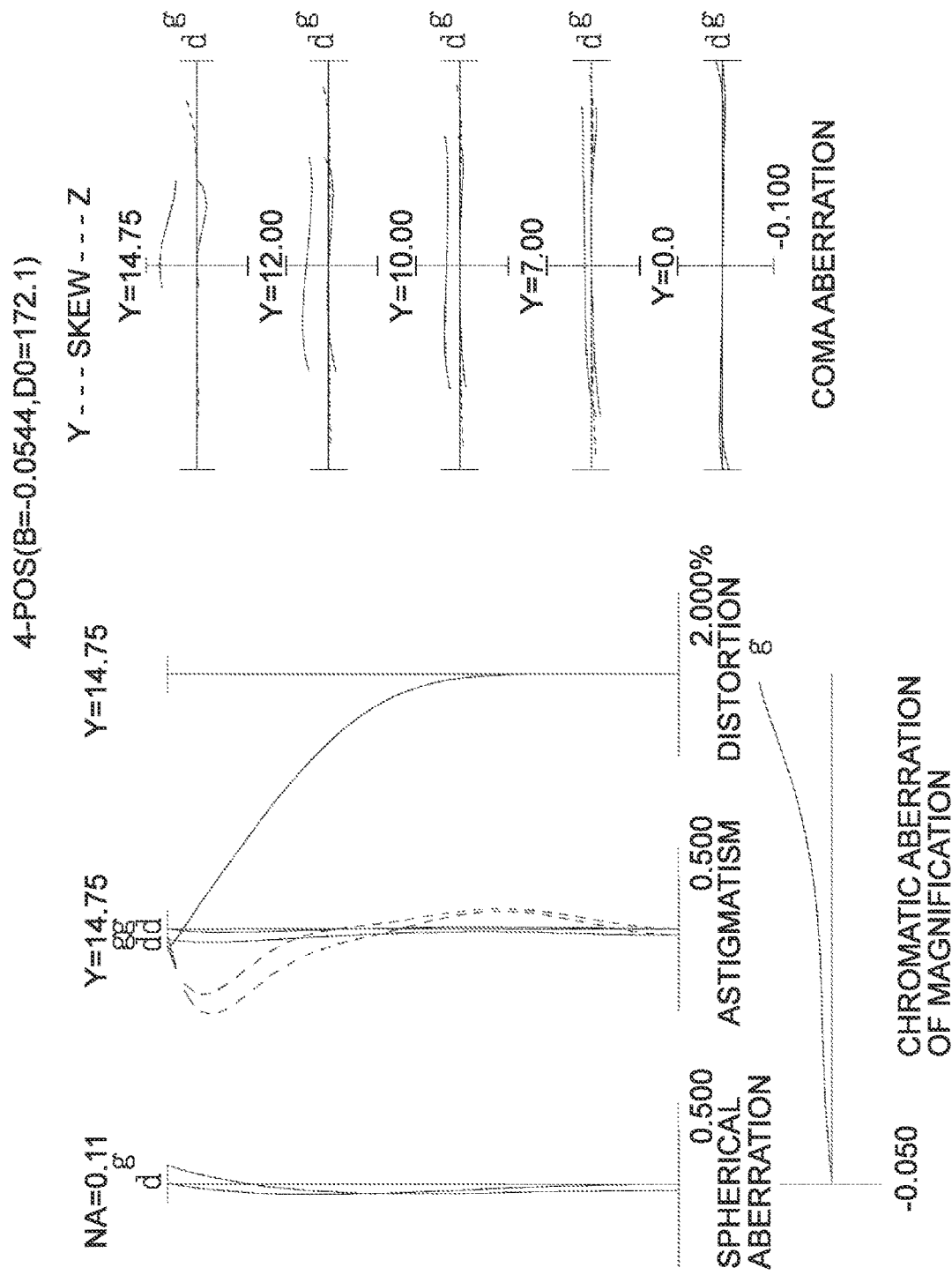
FIG. 12A, FIG. 12B, and FIG. 12C are various aberration diagrams upon focusing on a short-distance object in a wide angle end state, an intermediate focal length state and a telephoto end state respectively of the zoom optical system according to the fourth example.
Figure 12B:
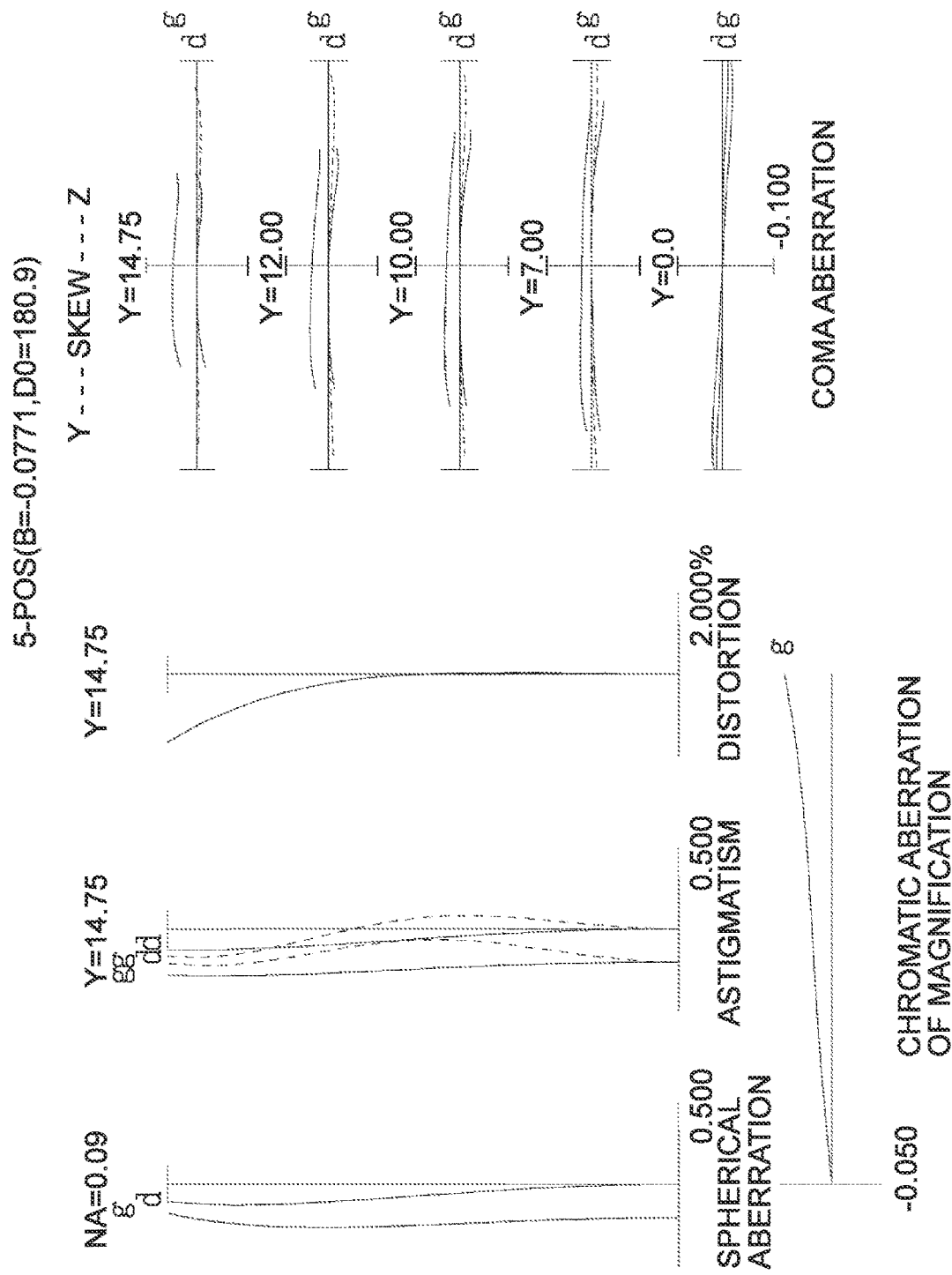
Figure 12C:
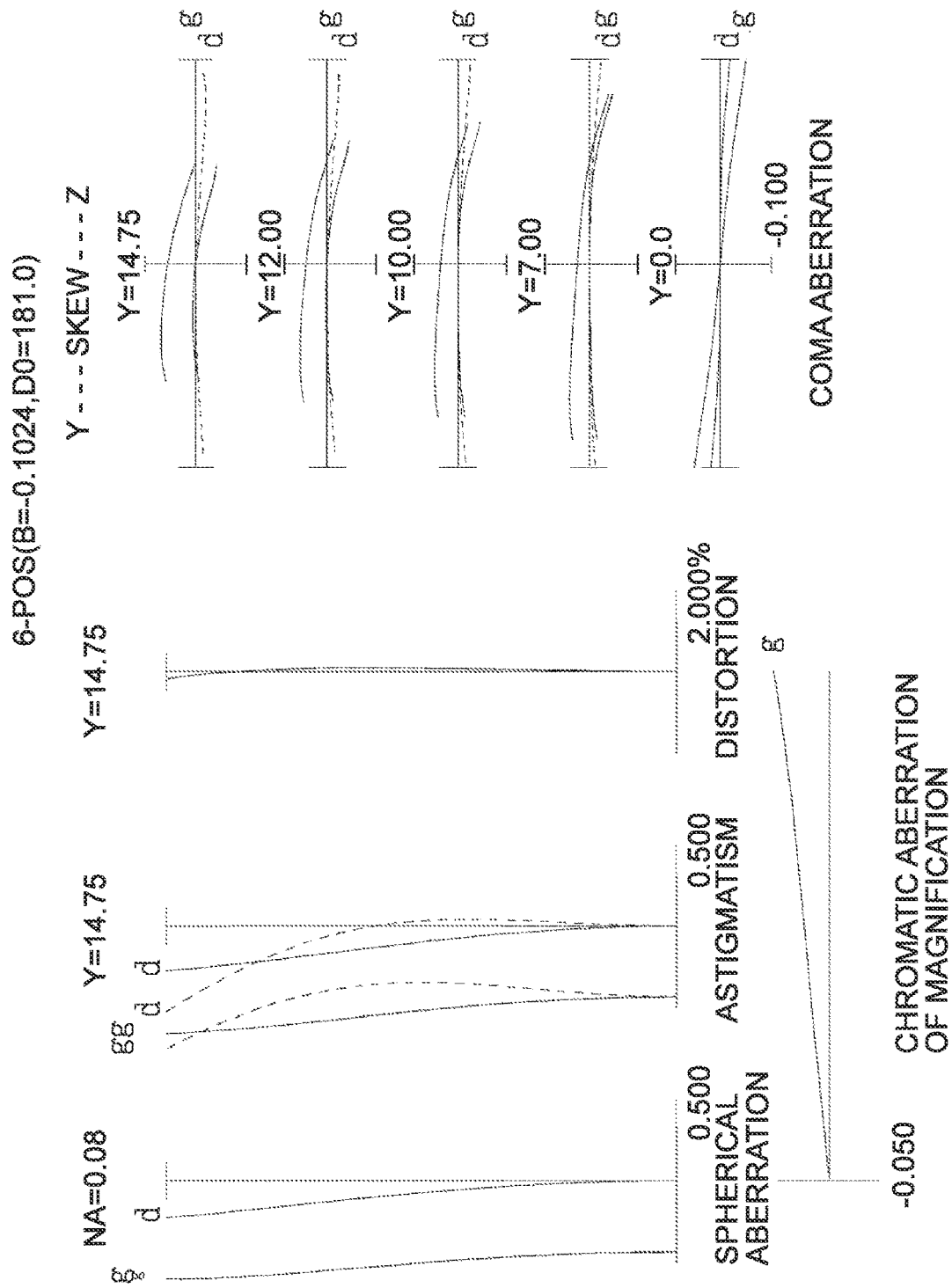

FIG. 11A, FIG. 11B and FIG. 11C are various aberration diagrams upon focusing on infinity in a wide angle end state, an intermediate focal length state and a telephoto end state respectively of the zoom optical system according to the fourth example. FIG. 12A, FIG. 12B, and FIG. 12C are various aberration diagrams upon focusing on a short-distance object in a wide angle end state, an intermediate focal length state and a telephoto end state respectively of the zoom optical system according to the fourth example. From each aberration diagram, it can be seen that the zoom optical system according to the fourth example has excellent image forming performance by satisfactorily correcting various aberrations from a wide angle end state to a telephoto end state and also has excellent image forming performance upon focusing on a short-distance object as well.

Fifth Example

Figure 13:
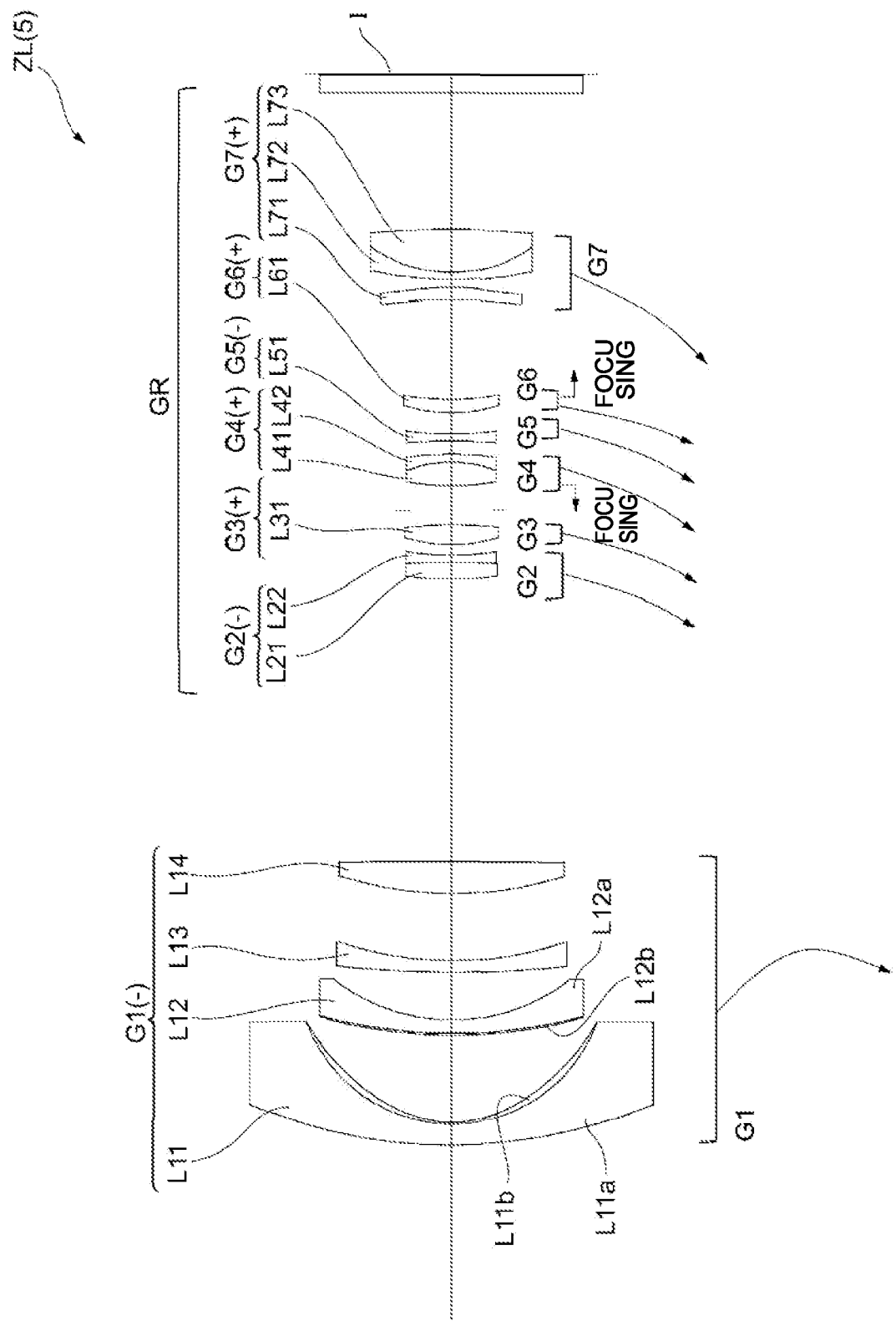
FIG. 13 is a diagram illustrating a lens configuration of a zoom optical system according to a fifth example.

A fifth example will be described using FIG. 13 to FIGS. 15A-15C and Table 5. FIG. 13 is a diagram illustrating a lens configuration of a zoom optical system according to the fifth example. A zoom optical system ZL (5) according to the fifth example is constructed of a first lens group G1 having a negative refractive power, a second lens group G2 having a negative refractive power, a third lens group G3 having a positive refractive power, an aperture stop S, a fourth lens group G4 having a positive refractive power, a fifth lens group G5 having a negative refractive power, a sixth lens group G6 having a positive refractive power and a seventh lens group G7 having a positive refractive power, disposed in order from an object side. Upon zooming from a wide angle end state (W) to a telephoto end state (T), the first to seventh lens groups G1 to G7 move in directions shown by arrows in FIG. 13 respectively, and a distance between the adjacent lens groups changes. A lens group consisting of the second to seventh lens groups G2 to G7 corresponds to the succeeding lens group GR.

The first lens group G1 is constructed of a negative meniscus lens L11 having a convex surface facing the object side, a negative meniscus lens L12 having a convex surface facing the object side, a negative meniscus lens L13 having a convex surface facing the object side and a biconvex positive lens L14, disposed in order from the object side.

The negative meniscus lens L11 is a hybrid lens constructed with a resin layer L11b provided on a surface on the image side of a glass lens body L11a. A surface on the image side of the resin layer L11b is aspherical and the negative meniscus lens L11 is a composite type aspherical lens. In the [lens data] field which will be described later, a surface number 1 represents the surface on the object side of the lens body L11a, a surface number 2 represents the surface on the image side of the lens body L11a and the surface on the object side of the resin layer L11b (surface on which both lenses are cemented) and a surface number 3 represents the surface on the image side of the resin layer L11b.

The negative meniscus lens L12 is also a hybrid lens constructed with a resin layer L12b provided on a surface on the object side of a glass lens body L12a. A surface on the object side of the resin layer L12b is aspherical and the negative meniscus lens L12 is also a composite type aspherical lens. In the [lens data] field which will be described later, a surface number 4 represents a surface on the object side of the resin layer L12ba, a surface number 5 represents the surface on the image side of the resin layer L12b and the surface on the object side of the lens body L12a (surface on which both lenses are cemented), and a surface number 6 represents the surface on the image side of the lens body L12a.

The second lens group G2 is constructed of a cemented lens consisting of a biconvex positive lens L21 and a biconcave negative lens L22.

The third lens group G3 is constructed of a biconvex positive lens L31. The aperture stop S is provided in the vicinity of the image side of the third lens group G3 and moves together with the third lens group G3 upon zooming.

The fourth lens group G4 is constructed of a cemented lens consisting of a biconvex positive lens L41 and a negative meniscus lens L42 having a concave surface facing the object side.

The fifth lens group G5 is constructed of a biconcave negative lens L51.

The sixth lens group G6 is constructed of a positive meniscus lens L61 having a convex surface facing the object side.

The seventh lens group G7 is constructed of a positive meniscus lens L71 having a concave surface facing the object side and a cemented lens consisting of a negative meniscus lens L72 having a convex surface facing the object side and a biconvex positive lens L73. Note that the surface on the image side of the positive meniscus lens L71 is aspherical.

In the present example, the fourth lens group G4 constitutes a first focusing lens group and the sixth lens group G6 constitutes a second focusing lens group. Depending on a change from focusing on a long-distance object (infinity object) to focusing on a short-distance object, the first focusing lens group (fourth lens group G4) moves toward the object side and the second focusing lens group (sixth lens group G6) moves toward the image side.

The following Table 5 lists specification values of the zoom optical system according to the fifth example.

TABLE 5

| [General Data] | | | |
|---|---|---|---|
| Focal length (f) 10.3 (fw)-19.3 (ft) | | | |
| | W | M | T |
| F.NO | 4.6683 | 4.96374 | 5.80239 |
| 2ω | 55.25456 | 48.20506 | 35.45169 |
| Air Equivalent TL | 121.01438 | 108.39582 | 103.93683 |
| Air Equivalent BF | 16.95795 | 23.02697 | 29.43842 |

| [Lens Data] | | | | |
|---|---|---|---|---|
| Surface | R | D | nd | νd |
| 1 | 58.6074 | 2.40 | 1.77250 | 49.61 |
| 2 | 17.5078 | 0.20 | 1.56093 | 36.64 |
| *3 | 13.0042 | 9.90 | 1.00000 | |
| *4 | 50.3658 | 0.20 | 1.55389 | 38.09 |
| 5 | 56.8198 | 1.50 | 1.77250 | 49.61 |
| 6 | 21.5929 | 5.45 | 1.00000 | |
| 7 | 119.999 | 1.30 | 1.77250 | 49.61 |
| 8 | 39.5142 | 7.63 | 1.00000 | |
| 9 | 41.6577 | 3.67 | 1.71736 | 29.58 |
| 10 | −749.999 | Variable | 1.00000 | |
| 11 | 37.7166 | 1.91 | 1.72825 | 28.38 |
| 12 | −96.4635 | 0.80 | 1.91082 | 35.25 |
| 13 | 32.6266 | Variable | 1.00000 | |
| 14 | 18.8176 | 2.29 | 1.51680 | 63.88 |
| 15 | −41.5207 | 1.71 | 1.00000 | |
| 16 | 0 | Variable | 1.00000 | Aperture Stop S |
| 17 | 28.3401 | 2.69 | 1.53172 | 48.78 |
| 18 | −14.0687 | 0.90 | 1.90366 | 31.27 |
| 19 | −34.3736 | Variable | 1.00000 | |
| 20 | −67.0447 | 0.80 | 1.91082 | 35.25 |
| 21 | 45.6913 | Variable | 1.00000 | |
| 22 | 18.0512 | 1.59 | 1.51680 | 63.88 |
| 23 | 34.0298 | Variable | 1.00000 | |
| 24 | −60.0006 | 1.35 | 1.53110 | 55.91 |
| *25 | −33.4648 | 0.91 | 1.00000 | |
| 26 | 42.1746 | 0.80 | 1.91082 | 35.25 |
| 27 | 15.6452 | 4.94 | 1.48749 | 70.24 |
| 28 | −103.065 | 29.88 | 1.00000 | |
| 29 | 0 | 2.00 | 1.51680 | 63.88 |
| 30 | 0 | 0.10 | 1.00000 | |
| Image Surface (I) | ∞ | | | |

| [Aspheriacal Surface Data] | | | |
|---|---|---|---|
| 3rd Surface κ = 0.1402 | | | |
| A4 = −5.51E−06 | A6 = −1.51E−08 | A8 = 2.32E−11 | A10 = 6.51E−13 |
| 4th Surface κ = −5.3009 | | | |
| A4 = −9.86E−06 | A6 = 3.87E−08 | A8 = 1.40E−10 | A10 = −2.96E−13 |
| 25th Surface κ = 1.0000 | | | |
| A4 = 6.04E−05 | A6 = 5.21E−07 | A8 = −5.53E−09 | A10 = 4.16E−11 |

| [Lens Group Data] | | |
|---|---|---|
| Group | First surface | Focal length |
| G1 | 1 | −20.6289 |
| G2 | 11 | −103.51107 |
| G3 | 14 | 25.38363 |
| G4 | 17 | 53.4659 |
| G5 | 20 | −29.73283 |
| G6 | 22 | 71.94709 |
| G7 | 24 | 150.4283 |

TABLE 5-continued

[Variable Distance Data]

|  | W | M | T | W Close range | M Close range | T Close range |
|---|---|---|---|---|---|---|
| f(β) | 10.29989 | 12.99987 | 19.31936 | −0.05435 | −0.06458 | −0.09437 |
| d10 | 32.0027 | 12.9451 | 2.0000 | 32.0027 | 12.9451 | 2.0000 |
| d13 | 1.21092 | 3.95802 | 1.07653 | 1.21092 | 3.95802 | 1.07653 |
| d16 | 2.7494 | 2.86437 | 3.6529 | 2.29199 | 2.33306 | 2.65189 |
| d19 | 1.5000 | 0.40476 | 2.07238 | 1.95741 | 0.93607 | 3.07339 |
| d21 | 2.39681 | 1.0000 | 1.5000 | 2.83592 | 1.31879 | 2.31081 |
| d23 | 11.2541 | 9.43894 | 8.26897 | 10.81499 | 9.12015 | 7.45816 |
| d28 | 15.53939 | 22.84512 | 29.83997 | 15.55377 | 22.86546 | 29.88341 |
| Bf | 0.1 | 0.1 | 0.1 | 0.1 | 0.1 | 0.1 |

[Magnification]

|  | W | M | T | W Close range | M Close range | T Close range |
|---|---|---|---|---|---|---|
| βF1 | 0.52437 | 0.50057 | 0.42462 | 0.51772 | 0.49189 | 0.4088 |
| βF2 | 0.45968 | 0.34278 | 0.20627 | 0.46552 | 0.3468 | 0.21654 |

[Other specifications]

| | |
|---|---|
| ff1 | 53.4659 |
| ff2 | 71.94709 |
| MVF1w | −0.4718 |
| MVF2w | 0.42473 |

Figure 15A:
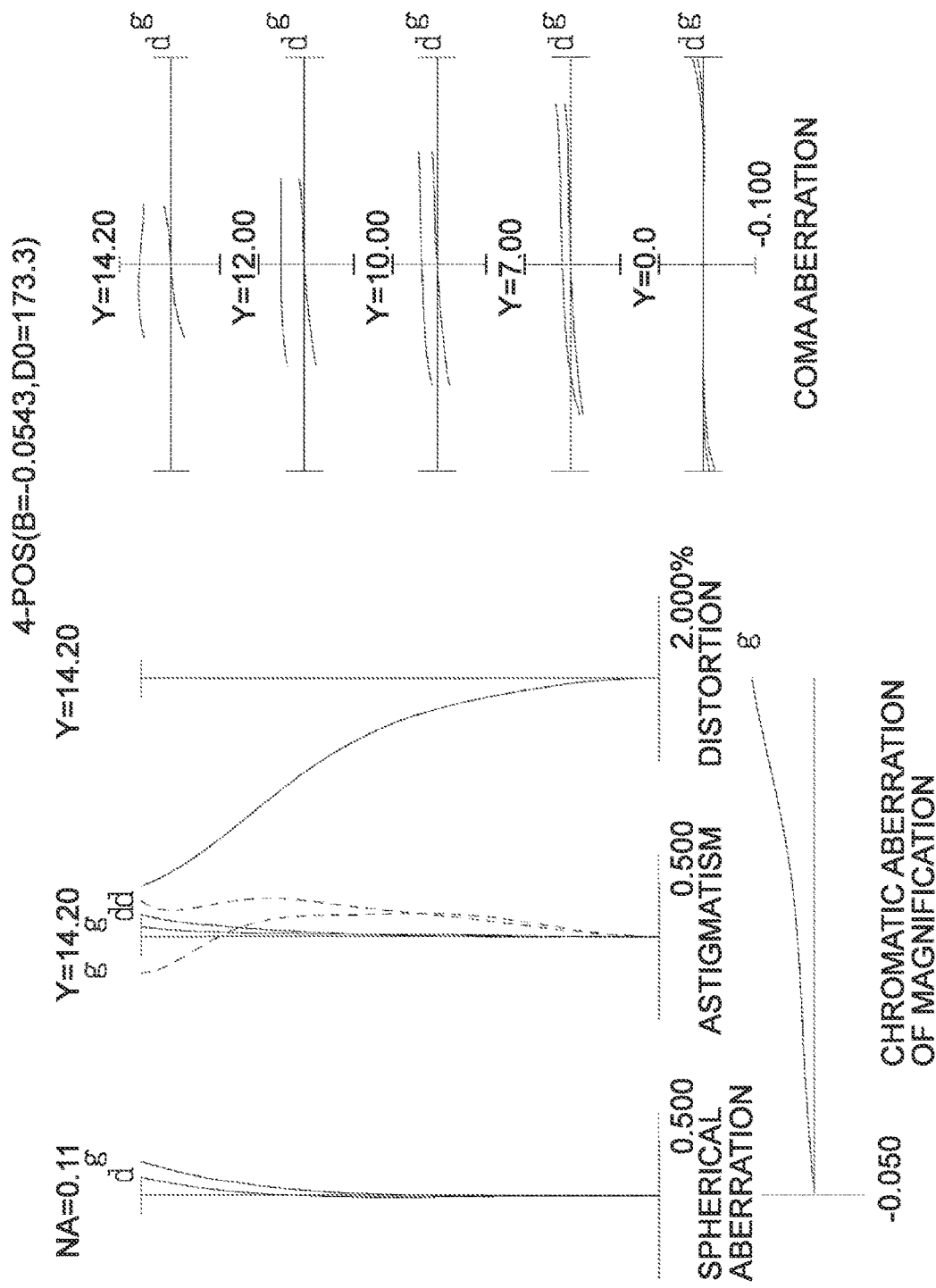
FIG. 15A, FIG. 15B, and FIG. 15C are various aberration diagrams upon focusing on a short-distance object in a wide angle end state, an intermediate focal length state and a telephoto end state respectively of the zoom optical system according to the fifth example.
Figure 15B:
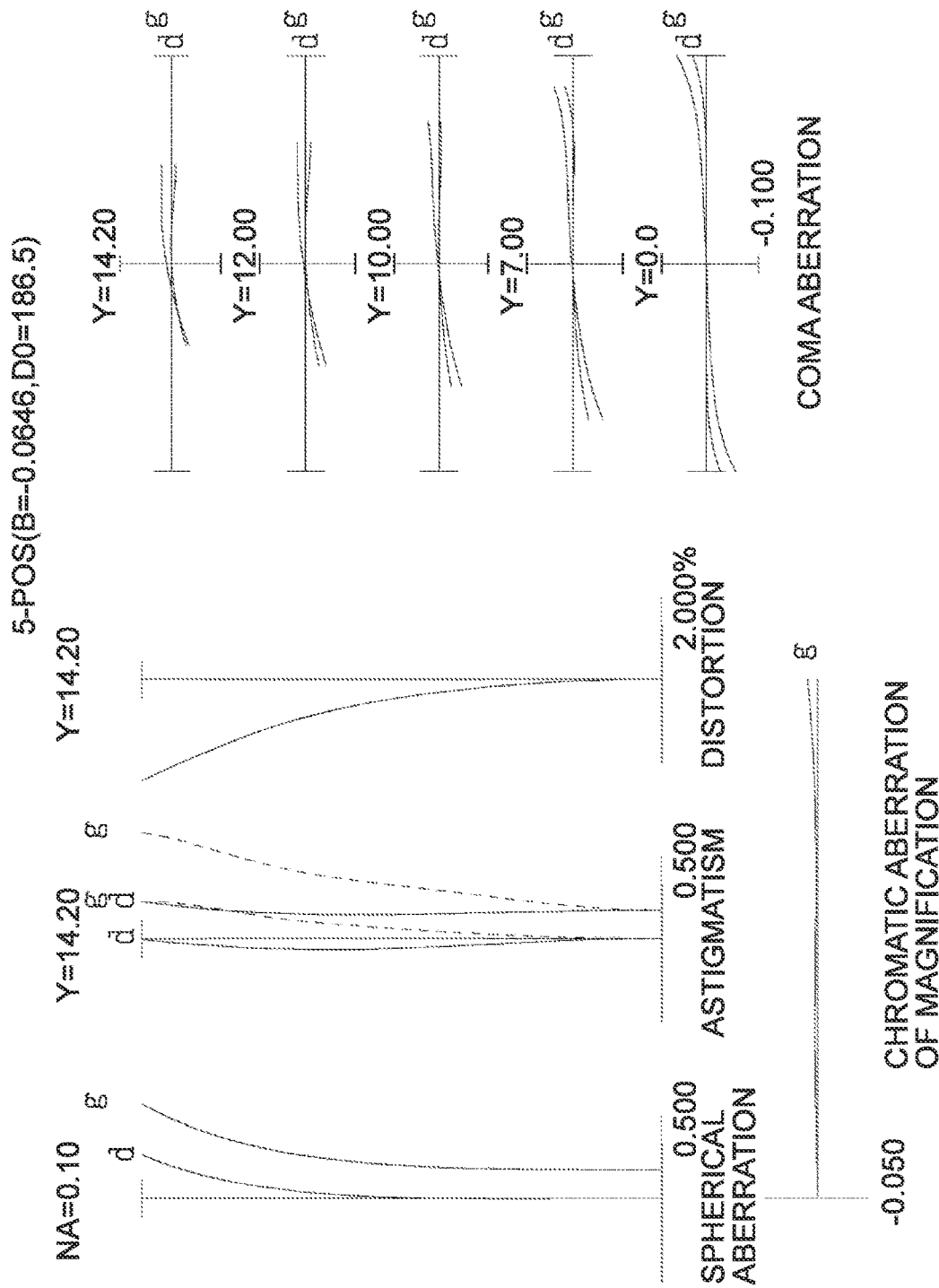
Figure 15C:
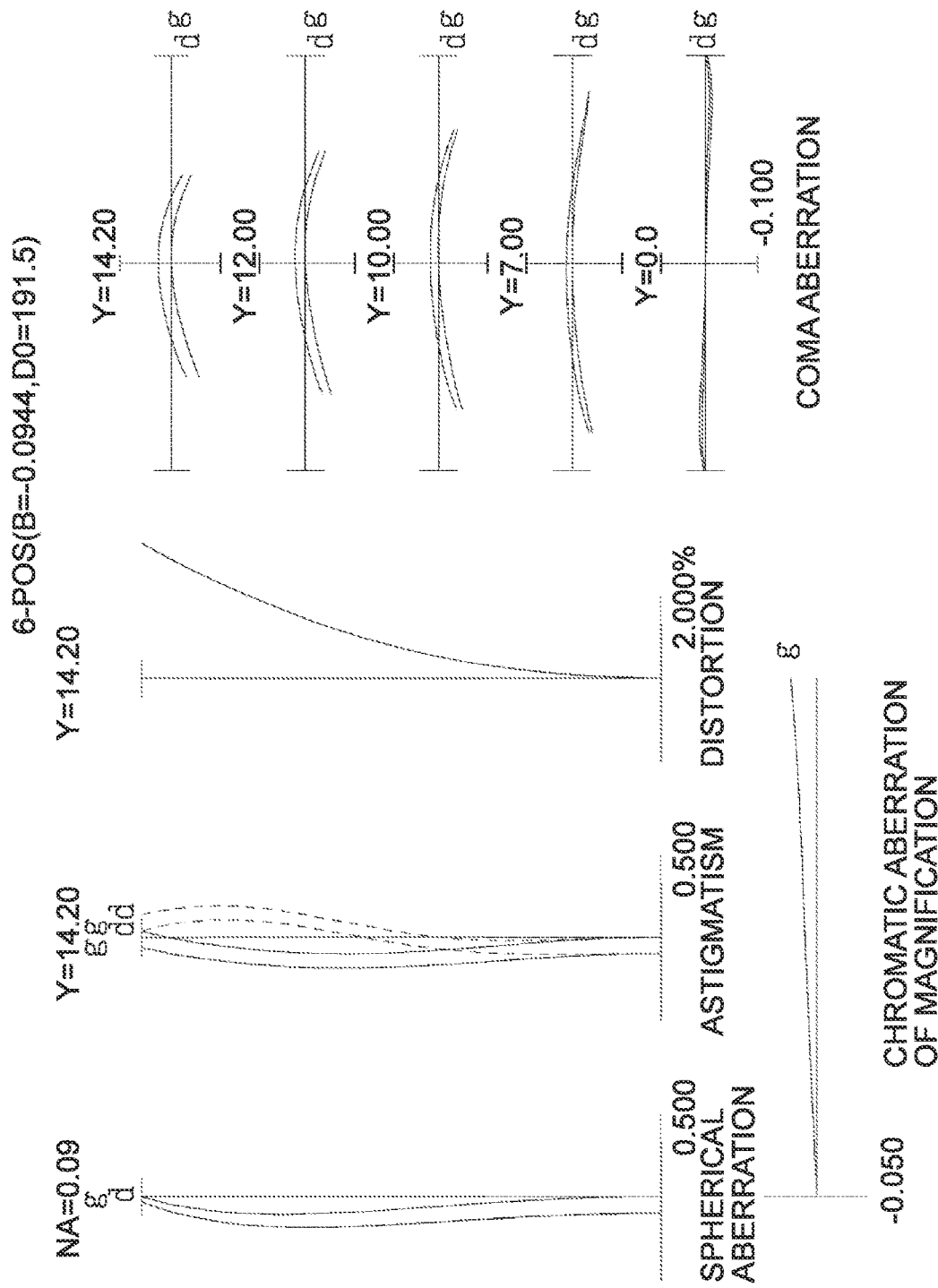

FIG. 14A, FIG. 14B, and FIG. 14C are various aberration diagrams upon focusing on infinity in a wide angle end state, an intermediate focal length state and a telephoto end state respectively of the zoom optical system according to the fifth example. FIG. 15A, FIG. 15B, and FIG. 15C are various aberration diagrams upon focusing on a short-distance object in a wide angle end state, an intermediate focal length state and a telephoto end state respectively of the zoom optical system according to the fifth example. From each aberration diagram, it can be seen that the zoom optical system according to the fifth example has excellent image forming performance by satisfactorily correcting various aberrations from a wide angle end state to a telephoto end state, and further has excellent image forming performance upon focusing on a short-distance object as well.

Finally, a table of [conditional expression corresponding values] is shown below. The table shows values corresponding to the respective conditional expressions (first to fifth examples) in a summarized manner for all the examples (first to fifth examples).

| | |
|---|---|
| 0.01<(−MVF1)/MVF2<30.0 | Conditional Expression (1) |
| 0.20<ff1/ff2<1.70 | Conditional Expression (2) |
| 0.15<(−f1)/ff1<1.30 | Conditional Expression (3) |
| 0.10<(−f1)/ff2<0.95 | Conditional Expression (4) |
| 0.10<(−f1)/f2<1.20 | Conditional Expression (5) |
| −0.80<βWF1<0.80 | Conditional Expression (6) |
| −0.80<βWF2<0.80 | Conditional Expression (7) |
| (βWF1+(1/βWF1))$^{-2}$<0.25 | Conditional Expression (8) |
| (βWF2+(1/βWF2))$^{-2}$<0.25 | Conditional Expression (9) |

[Conditional Expression Corresponding Value]

| Conditional Expression | 1st Example | 2nd Example | 3rd Example | 4th Example | 5th Example |
|---|---|---|---|---|---|
| (1) | 0.442 | 0.778 | 0.667 | 0.400 | 1.111 |
| (2) | 0.454 | 0.593 | 0.953 | 0.569 | 0.743 |
| (3) | 0.615 | 0.399 | 0.508 | 0.614 | 0.386 |
| (4) | 0.279 | 0.237 | 0.484 | 0.349 | 0.287 |
| (5) | 0.368 | 0.493 | 0.590 | 0.680 | −0.199 |
| (6) | 0.185 | 0.422 | 0.432 | −0.298 | 0.524 |
| (7) | 0.374 | 0.480 | 0.115 | −0.671 | 0.460 |
| (8) | 0.032 | 0.128 | 0.132 | 0.075 | 0.169 |
| (9) | 0.108 | 0.152 | 0.013 | 0.214 | 0.144 |

The above-described first to fifth examples show specific cases of the present embodiment and the present embodiment is not limited to these examples.

Note that the following contents can be adopted as appropriate without impairing the optical performance of the zoom optical system according to the present embodiment.

As numerical examples of the zoom optical system, the systems in a 4-group configuration, a 5-group configuration, a 6-group configuration and a 7-group configuration have been presented, but the present application is not limited to these configurations, and zoom optical systems in other group configurations (e.g., 8-group configuration) can also be configured. More specifically, a configuration with a lens or a lens group added to the most object side or the most image side of the zoom optical system may be adopted. Note that the lens group refers to a part having at least one lens, separated apart by an air gap that changes upon zooming.

The lens surface may be formed by a spherical or flat surface, or an aspherical surface. When the lens surface is spherical or flat, it is possible to process lenses and adjust assembly more easily, and thereby prevent degradation of optical performance caused by errors in processing and assembly adjustment, which is preferable. Even when the image surface is shifted, there is little degradation in imaging performance, which is preferable.

When the lens surface is aspherical, the aspherical surface may be any one of an aspherical surface by grinding, a glass molded aspherical surface in which glass is molded into an aspherical surface shape using a mold and a composite type aspherical surface in which resin is molded into an aspherical surface shape on the surface of glass. Furthermore, the lens surface may be a diffractive surface and the lens may be a refractive index distribution type lens (gradient index lens: GRIN lens) or a plastic lens.

The aperture stop may be substituted for its role by a lens frame without providing a member as an aperture stop.

An anti-reflective film demonstrating high transmittance over a wide wavelength range may be applied to each lens surface to reduce flare or ghosts and achieve high contrast optical performance. This makes it possible to reduce flare or ghosts and achieve high contrast optical performance.

EXPLANATION OF NUMERALS AND CHARACTERS

G1 first lens group
G2 second lens group
G3 third lens group
G4 fourth lens group
G5 fifth lens group
G6 sixth lens group
G7 seventh lens group
I Image surface
S aperture stop

The invention claimed is:

1. A zoom optical system essentially consisting of a first lens group having a negative refractive power and a succeeding lens group, which are disposed on an optical axis in order from an object side, wherein
the succeeding lens group comprises three or more lens groups,
distances between adjacent lens groups change upon zooming from a wide angle end to a telephoto end,
the succeeding lens group includes a first focusing lens group having a positive refractive power and a second focusing lens group having a positive refractive power, in which the second focusing lens group is placed on an image side of the first lens group,
the first focusing lens group moves toward the object side and the second focusing lens group moves toward the image side upon focusing from infinity to a short distance, and
the following conditional expressions are satisfied:

$0.20 < ff1/ff2 < 1.40$ and $0.10 < (-f1)/ff2 < 0.53$ where,
f1: a focal length of the first lens group,
ff1: a focal length of the first focusing lens group, and
ff2: a focal length of the second focusing lens group.

2. The zoom optical system according to claim 1, wherein the following conditional expression is satisfied:

$0.01 < (-MVF1)/MVF2 < 30.0$ where,
MVF1: an amount of movement of the first focusing lens group upon focusing on an object from infinity to a short distance
MVF2: an amount of movement of the second focusing lens group upon focusing on an object from infinity to a short distance
where movement of the first and second focusing lens groups toward the image side is set as positive, and movement of the first and second focusing lens groups toward the object side is set as negative.

3. The zoom optical system according to claim 1, wherein the following conditional expression is satisfied:

$0.15 < (-f1)/ff1 < 1.30$.

4. The zoom optical system according to claim 1, wherein the second focusing lens group consists of one convex lens.

5. The zoom optical system according to claim 1, wherein the first focusing lens group consists of a cemented lens consisting of a convex lens and a concave lens.

6. The zoom optical system according to claim 1, wherein the succeeding lens group comprises a second lens group and a third lens group having a positive refractive power, disposed in order from the object side, and the following conditional expression is satisfied:

$0.10 < (-f1)/f2 < 1.20$ where,
f2: a focal length of the second lens group.

7. The zoom optical system according to claim 1, wherein the first lens group comprises three negative lenses disposed in order from the object side.

8. The zoom optical system according to claim 1, wherein the following conditional expression is satisfied:

$-0.80 < \beta WF1 < 0.80$ where,
$\beta WF1$: lateral magnification of the first focusing lens group upon focusing on an infinity object in a wide angle end state.

9. The zoom optical system according to claim 1, wherein the following conditional expression is satisfied:

$-0.80 < \beta WF2 < 0.80$ where,
$\beta WF2$: lateral magnification of the second focusing lens group upon focusing on an infinity object in a wide angle end state.

10. The zoom optical system according to claim 1, wherein the following conditional expression is satisfied:

$(\beta WF1 + (1/\beta WF1))^{-2} < 0.25$ where,
$\beta WF1$: lateral magnification of the first focusing lens group upon focusing on an infinity object in a wide angle end state.

11. The zoom optical system according to claim 1, wherein the following conditional expression is satisfied:

$(\beta WF2 + (1/\beta WF2))^{-2} < 0.25$ where,
$\beta WF2$: lateral magnification of the second focusing lens group upon focusing on an infinity object in a wide angle end state.

12. An optical apparatus comprising the zoom optical system according to claim 1.

13. A zoom optical system comprising a first lens group having a negative refractive power and a succeeding lens group, which are disposed on an optical axis in order from an object side, wherein
distances between the adjacent lens groups change upon zooming from a wide angle end to a telephoto end,
the succeeding lens group comprises a first focusing lens group having a positive refractive power and a second focusing lens group having a positive refractive power,
the first focusing lens group and the second focusing lens group move respectively along different loci, and the following conditional expressions are satisfied:

$$0.20 < ff1/ff2 < 1.40 \text{ and}$$

$$0.10 < (-f1)/ff2 < 0.53$$

where,
f1: a focal length of the first lens group,
ff1: a focal length of the first focusing lens group, and
ff2: a focal length of the second focusing lens group.

14. The zoom optical system according to claim 13, wherein the following conditional expression is satisfied:

$$0.15 < (-f1)/ff1 < 1.30.$$

15. The zoom optical system according to claim 13, wherein
the succeeding lens group comprises a second lens group and a third lens group having a positive refractive power, disposed in order from the object side, and
the following conditional expression is satisfied:

$$0.10 < (-f1)/f2 < 1.20$$

where,
f2: a focal length of the second lens group.

16. An optical apparatus comprising the zoom optical system according to claim 13.

17. A method for manufacturing a zoom optical system comprising:
arranging, in a lens barrel and on an optical axis in order from an object side, a first lens group having a negative refractive power and a succeeding lens group,
arranging the first lens group and the succeeding lens group so that a distances between adjacent lens groups change upon zooming from a wide angle end to a telephoto end,
configuring the succeeding lens group to comprise a first focusing lens group having a positive refractive power and a second focusing lens group having a positive refractive power,
the method further comprising one of the following features A or B,
the feature A including:
the zoom optical system essentially consisting of the first lens group and the succeeding lens group,
configuring the succeeding lens group to comprise three or more lens groups,
arranging the second focusing lens group to be on an image side of the first lens group,
arranging the first focusing lens group to move toward the object side and the second focusing lens group to move toward the image side upon focusing from infinity to a short distance, and
satisfying the following conditional expressions:

$$0.20 < ff1/ff2 < 1.40 \text{ and}$$

$$0.10 < (-f1)/ff2 < 0.53$$

where,
f1: a focal length of the first lens group,
ff1: a focal length of the first focusing lens group, and
ff2: a focal length of the second focusing lens group,
the feature B including:
arranging the first focusing lens group and the second focusing lens group to move respectively along different loci, and
satisfying the following conditional expressions:

$$0.20 < ff1/ff2 < 1.40 \text{ and}$$

$$0.10 < (-f1)/ff2 < 0.53$$

where,
f1: a focal length of the first lens group,
ff1: a focal length of the first focusing lens group, and
ff2: a focal length of the second focusing lens group.

* * * * *